(12) United States Patent
Riley et al.

(10) Patent No.: US 12,391,332 B2
(45) Date of Patent: *Aug. 19, 2025

(54) HYDRAULIC BRAKE SYSTEM AND APPARATUS

(71) Applicant: Syscend, Inc., Austin, TX (US)

(72) Inventors: Brian M. Riley, Austin, TX (US); Roger Tong, Berkeley, CA (US)

(73) Assignee: Syscend, Inc., Seymour, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,287

(22) Filed: Nov. 27, 2023

(65) Prior Publication Data

US 2024/0351661 A1  Oct. 24, 2024

Related U.S. Application Data

(63) Continuation of application No. 17/334,336, filed on May 28, 2021, now Pat. No. 11,866,124, which is a continuation of application No. 16/379,514, filed on Apr. 9, 2019, now Pat. No. 11,390,355, which is a continuation of application No. 14/612,166, filed on
(Continued)

(51) Int. Cl.
*B62L 3/08* (2006.01)
*B62L 1/10* (2006.01)
*B62L 3/02* (2006.01)

(52) U.S. Cl.
CPC ............... *B62L 3/08* (2013.01); *B62L 3/02* (2013.01); *B62L 1/10* (2013.01)

(58) Field of Classification Search
CPC ... B60T 8/42; B60T 8/52; B60T 8/261; B60T 8/3225; B60T 11/06; B60T 11/046; B60T 13/065; B62K 3/00; B62K 3/02; B62K 3/08; B62L 1/00; B62L 1/005; B62L 1/12; F16D 65/02; F16D 65/18; F16D 65/0068; F16D 65/0075; F16D 55/228; F16D 55/2245; F16D 55/2255; F16D 2055/002; F16D 2121/14; F16D 2125/36
USPC ... 188/17, 24.22, 24.11, 24.12, 24.16, 24.19, 188/140 R, 344, 24.14; 74/500.5, 502
See application file for complete search history.

(56) References Cited

U.S. PATENT DOCUMENTS 662,602 A  11/1900  Schmidt et al.
2,871,988 A  2/1959  Wilkerson
(Continued)

FOREIGN PATENT DOCUMENTS

DE  26 57 350 A1  7/1977
DE  41 22 491 A1  1/1993
(Continued)

OTHER PUBLICATIONS

International Search Report and Written Opinion in Application No. PCT/US2010/060411, mailed Feb. 22, 2011 in 8 pages.

*Primary Examiner* — Robert A. Siconolfi
*Assistant Examiner* — San M Aung
(74) *Attorney, Agent, or Firm* — Knobbe, Martens, Olson & Bear, LLP

(57) ABSTRACT

A braking system includes a vehicle having a front brake and a rear brake. The system includes a moveable structure connected to a rear brake. The rear brake may be a hydraulic brake. When the rear brake is actuated, the moveable structure moves. The movement of the structure pressurizes hydraulic fluid in a tube which actuates a front hydraulic brake.

20 Claims, 44 Drawing Sheets

Related U.S. Application Data

Feb. 2, 2015, now Pat. No. 10,252,770, which is a continuation-in-part of application No. 13/513,141, filed as application No. PCT/US2010/060411 on Dec. 15, 2010, now Pat. No. 10,215,243, which is a continuation-in-part of application No. 12/638,944, filed on Dec. 15, 2009, now Pat. No. 8,333,266.

(60) Provisional application No. 61/934,538, filed on Jan. 31, 2014, provisional application No. 61/411,405, filed on Nov. 8, 2010.

(56) References Cited

U.S. PATENT DOCUMENTS

| | | | |
|---|---|---|---|
| 3,173,517 A * | 3/1965 | Powlas | F16D 65/18 |
| | | | 188/72.2 |
| 3,547,229 A | 12/1970 | Pollinger et al. | |
| 3,842,946 A | 10/1974 | Blevens | |
| 3,882,971 A | 5/1975 | Peckham, Jr. | |
| 3,989,124 A | 11/1976 | Fujii | |
| 4,015,690 A | 4/1977 | Armstrong | |
| 4,020,925 A | 5/1977 | Ryan et al. | |
| 4,061,206 A | 12/1977 | Wood | |
| 4,102,439 A | 7/1978 | Calderazzo | |
| D281,874 S | 12/1985 | King | |
| D295,847 S | 5/1988 | Everett | |
| D310,199 S | 8/1990 | Herner | |
| 5,107,965 A | 4/1992 | Yates | |
| 5,364,250 A | 11/1994 | Aoki et al. | |
| 5,431,257 A | 7/1995 | Rocca et al. | |
| 5,501,301 A | 3/1996 | Nishimura | |
| 5,564,531 A | 10/1996 | Lumpkin | |
| 5,632,362 A * | 5/1997 | Leitner | B62L 1/00 |
| | | | 188/26 |
| 5,775,466 A | 7/1998 | Banyas et al. | |
| 5,813,501 A * | 9/1998 | Terry, Sr. | B60T 11/165 |
| | | | 188/24.11 |
| 5,927,442 A | 7/1999 | Liao | |
| 5,997,262 A | 12/1999 | Finkbeiner et al. | |
| 6,098,486 A | 8/2000 | Liao | |
| 6,164,153 A | 12/2000 | Scura | |
| D436,334 S | 1/2001 | Takizawa | |
| 6,386,328 B1 | 5/2002 | Chen | |
| 6,615,955 B2 * | 9/2003 | Jakovljevic | B60T 1/04 |
| | | | 188/344 |
| 6,634,467 B2 | 10/2003 | Liu | |
| D495,635 S | 9/2004 | Everett | |
| 6,884,049 B2 | 4/2005 | Hida et al. | |
| 6,899,202 B1 | 5/2005 | McIntyre | |
| 7,537,094 B1 | 5/2009 | Kato | |
| D603,766 S | 11/2009 | Huang | |
| D603,767 S | 11/2009 | Crippa et al. | |
| 8,230,984 B2 | 7/2012 | Moore | |
| 8,333,266 B2 | 12/2012 | Ouellet | |
| D688,996 S | 9/2013 | Arbesman et al. | |
| 8,960,378 B2 | 2/2015 | Moore | |
| 9,759,277 B2 | 9/2017 | Kobayashi et al. | |
| 10,215,243 B2 | 2/2019 | Riley et al. | |
| 10,252,770 B2 | 4/2019 | Riley et al. | |
| D879,687 S | 3/2020 | Remy et al. | |
| 10,780,736 B2 | 9/2020 | Madhaven | |
| 11,390,355 B1 | 7/2022 | Riley et al. | |
| 11,866,124 B2 | 1/2024 | Riley et al. | |
| 11,919,605 B1 | 3/2024 | Riley et al. | |
| 2002/0185349 A1 | 12/2002 | Jakovljevic | |
| 2005/0000756 A1 | 1/2005 | Biria | |
| 2007/0227834 A1 | 10/2007 | Mieze et al. | |
| 2007/0284203 A1 | 12/2007 | Tetsuka et al. | |
| 2009/0302565 A1 | 12/2009 | Ouellet | |
| 2010/0007112 A1 | 1/2010 | Ouellet | |
| 2010/0051394 A1 | 3/2010 | Tsai | |
| 2010/0230214 A1 | 9/2010 | Tseng | |
| 2011/0000749 A1 | 1/2011 | Yamashita et al. | |
| 2017/0151829 A1* | 6/2017 | Neutsch | B62M 6/40 |
| 2017/0283000 A1 | 10/2017 | Huang et al. | |

FOREIGN PATENT DOCUMENTS

| | | | |
|---|---|---|---|
| DE | 42 16 461 A1 | 11/1993 | |
| DE | 20309375 U1 | 8/2003 | |
| EP | 0 378 009 | 7/1990 | |
| EP | 0 533 950 | 3/1993 | |
| EP | 0 907 023 | 4/1999 | |
| EP | 1 266 820 | 12/2002 | |
| EP | 1 643 127 | 4/2006 | |
| GB | 2 003 563 | 3/1979 | |
| GB | 2003563 A * | 3/1979 | F16D 55/2255 |
| JP | H08-144964 A | 6/1996 | |
| JP | 2005-214140 A | 8/2005 | |
| JP | 2007-177735 A | 7/2007 | |
| JP | 2009-013832 A | 1/2009 | |
| JP | 3159551 U | 5/2010 | |
| WO | WO 2011/075502 | 6/2011 | |

* cited by examiner

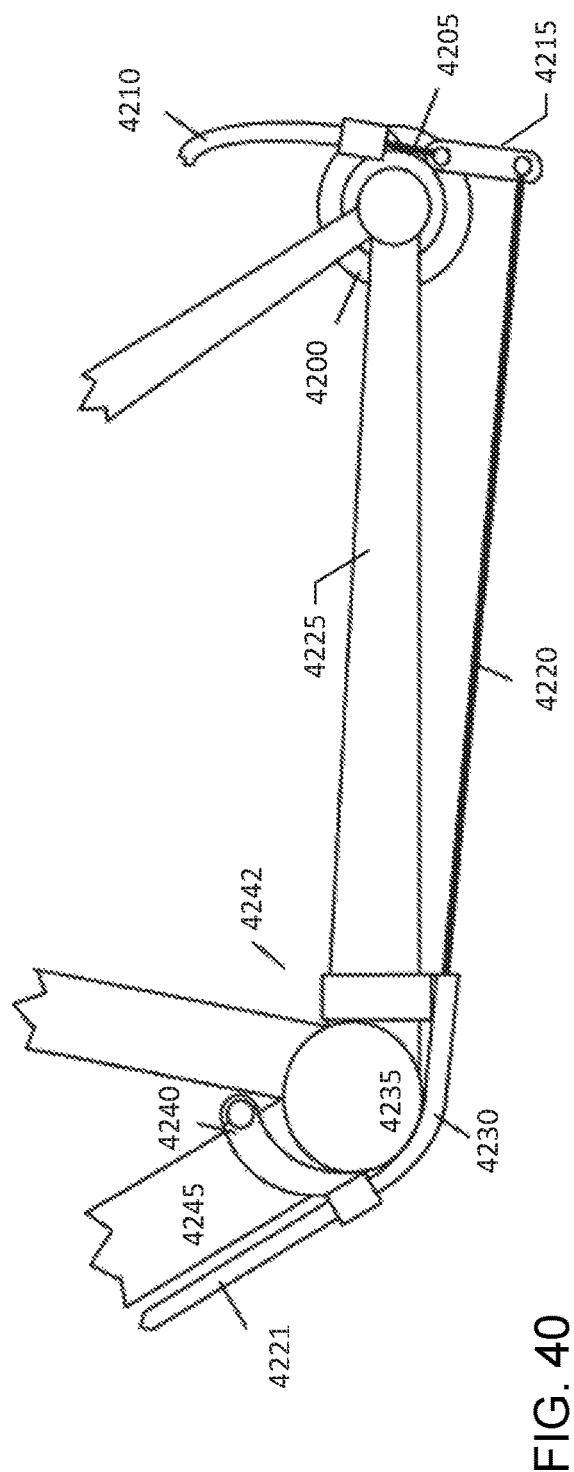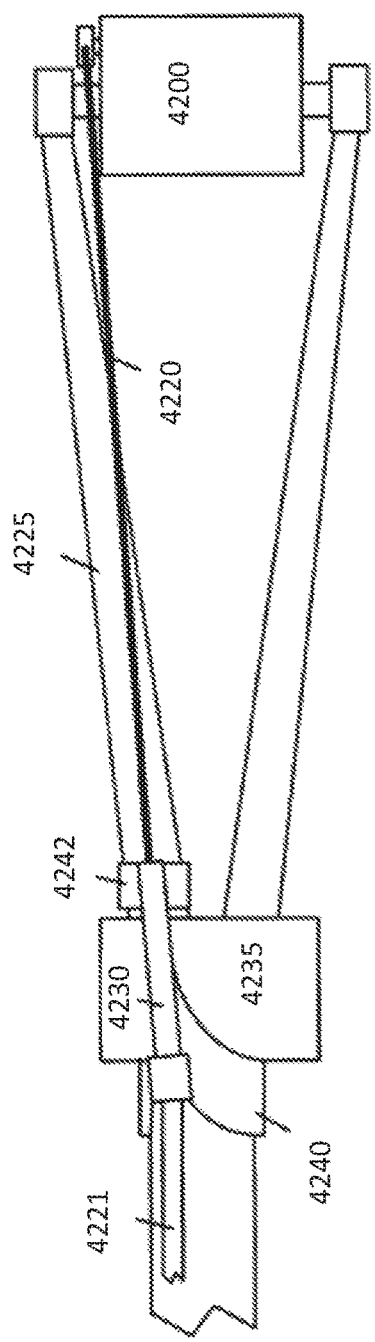
FIG. 40
FIG. 41

HYDRAULIC BRAKE SYSTEM AND APPARATUS

CROSS-REFERENCE TO RELATED APPLICATIONS

This patent application is continuation of U.S. patent application Ser. No. 17/334,336, filed May 28, 2021, which is a continuation of U.S. patent application Ser. No. 16/379,514, filed Apr. 9, 2019, now issued as U.S. Pat. No. 11,390,355 on Jul. 19, 2022, which is a continuation of U.S. patent application Ser. No. 14/612,166, filed Feb. 2, 2015, now issued as U.S. Pat. No. 10,252,770 on Apr. 9, 2019, which claims the benefit of U.S. Provisional Patent Application 61/934,538, filed Jan. 31, 2014, and is a continuation-in-part of pending U.S. patent application Ser. No. 13/513,141, filed Jul. 9, 2012, now issued as U.S. Pat. No. 10,215,243 on Feb. 26, 2019, which is a U.S. national phase application under 35 U.S.C. § 371 of International Patent Application No. PCT/US2010/060411, filed Dec. 15, 2010, which is a continuation-in-part of U.S. patent application Ser. No. 12/638,944, filed Dec. 15, 2009, now issued as U.S. Pat. No. 8,333,266 on Dec. 18, 2012, and International Patent Application No. PCT/US2010/060411 claims priority to U.S. Provisional Patent Application No. 61/411,405, filed Nov. 8, 2010, all of which are incorporated by reference in their entireties along with all other references cited in this application.

BACKGROUND

The present invention relates to a brake system and method. More particularly, the present invention relates to a brake system and method for a two-wheeled vehicle.

A two-wheeled vehicle is equipped with a brake system to slow or stop its moving by applying friction upon its wheels. A rider uses both hands to press two brake levers, fixed on the handlebar, to control a front and rear brake of the two-wheeled vehicle. However, it would be dangerous if the rider presses either one of the brake levers too hard to make the vehicle's wheel to be locked by the front or rear brake. It is uncontrollable and dangerous for a moving two-wheeled vehicle with one of its wheels being locked, e.g. the vehicle may skid on the ground. In the instance of a two-wheeled vehicle's tip over, the two-wheeled vehicle still moves with its front wheel being locked such that the rider may fall over beyond a handlebar of the two-wheeled vehicle when a rear wheel comes off the ground by a sufficient height. For the foregoing reasons, there is a need for preventing a moving two-wheeled vehicle from a tip-over or a wheel being locked.

BRIEF SUMMARY OF THE INVENTION

A braking system includes a moveable structure connected to a rear brake. The rear brake may be a hub brake or a disc brake. A cable to the front brake is connected to the moveable structure. When the rear brake is actuated, the moveable structure moves. The movement of the structure pulls the cable to actuate the front brake. The movement may include a translation, rotation, or both.

In a specific embodiment, an apparatus includes a lever coupled to a rear hub brake, a first cable clamp on the lever that secures an end of a rear brake cable, an opposite end of the rear brake cable being coupled to a rear brake lever, and a second cable clamp on the lever that secures an end of a front brake cable, an opposite end of the front brake cable being coupled to a front brake, wherein when the rear hub brake is actuated by the rear brake lever, the lever rotates to pull the front brake cable, thereby actuating the front brake.

In another specific embodiment, an apparatus includes a pivot point; a brake mount to attach a rear disc brake; and a lever arm extending away from the pivot point and comprising a cable clamp that secures an end of a front brake cable, an opposite end of the front brake cable being coupled to a front brake, wherein when the rear disc brake is actuated, the lever arm rotates about the pivot point to pull the front brake cable, thereby actuating the front brake.

In another specific embodiment, an apparatus includes a first link of a linkage and comprising a first joint, a second joint, and a front brake cable attachment end, wherein the second joint connects to a first tab on a bicycle frame and is between the first joint and the front brake cable attachment end; a second link of the linkage connected to the first joint and comprising a first mount, opposite the first joint, for a disc brake; and a third link of the linkage and comprising a fourth joint and a second mount, opposite the fourth joint, for the disc brake, wherein the fourth joint connects to a second tab on the bicycle frame.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 40 illustrates a side view of a rear hub brake used with an embodiment of the inventive braking system;

FIG. 41 illustrates a bottom view of a rear hub brake used with an embodiment of the inventive braking system;

DETAILED DESCRIPTION

Figure 1:
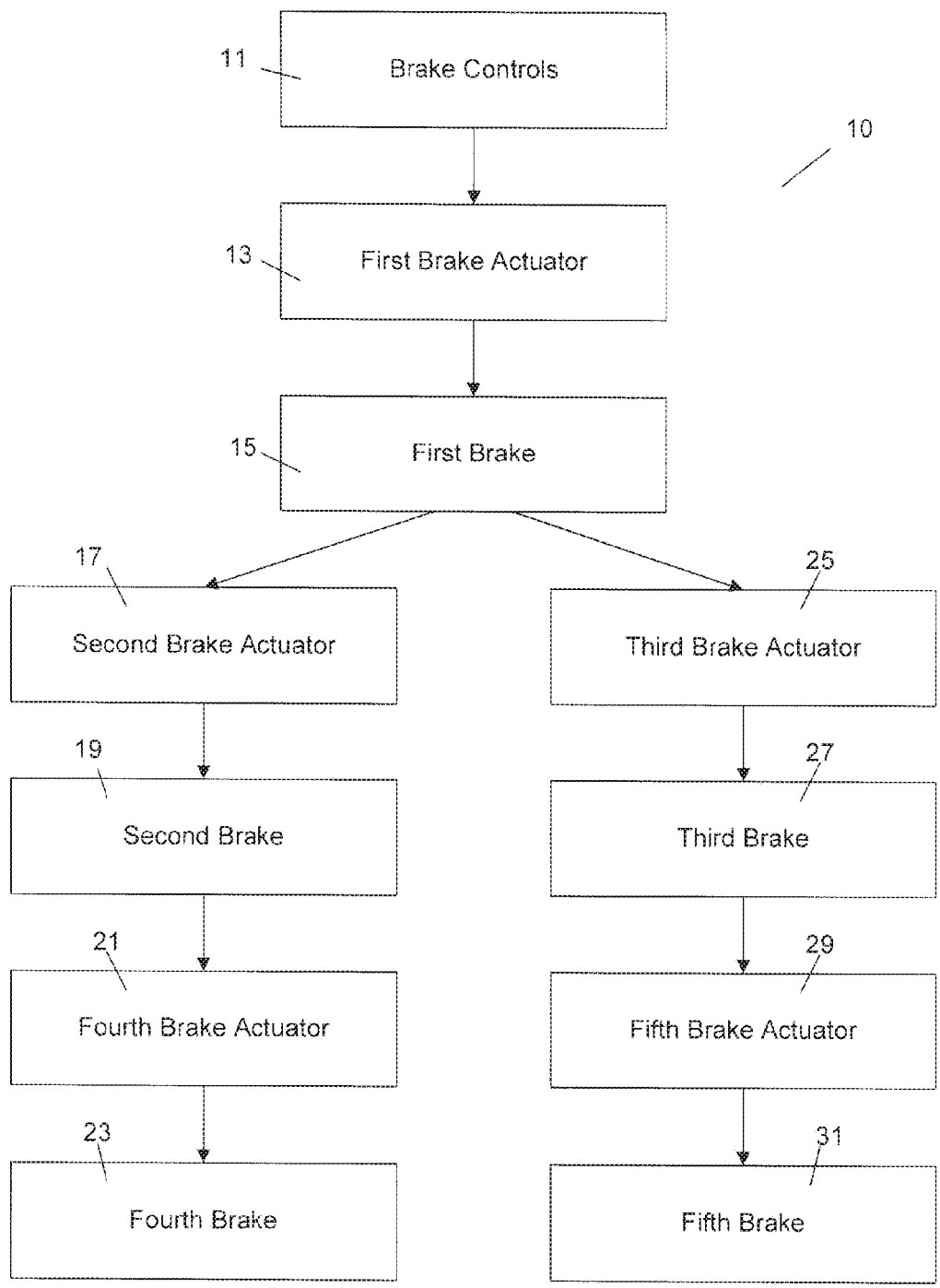
FIG. 1 illustrates a block diagram of an embodiment of the inventive braking system.

Reference will now be made in detail to the present embodiments of the invention, examples of which are illustrated in the accompanying drawings. Wherever possible, the same reference numbers are used in the drawings and the description to refer to the same or like parts. With reference to FIG. 1, the present invention is directed towards a brake system 10 that can be used for bicycles and other vehicles supported by multiple wheels. The inventive braking system 10 that can include two or more brake mechanisms 15, 19, 23, 27, 31 that are actuated by one or more brake controls 11, such as hand brake levers or foot brake pedals. When the user squeezes the one or more brake levers or steps on the foot brake pedal, a first brake actuator 13 actuates the first brake 15. The friction force of a brake pad in the first brake 15 against a rotating structure then actuates a second brake actuator 17 coupled to the second brake 19 so that both brakes 15, 19 are engaged to slow or stop the vehicle. The first brake 15 that is directly controlled by the brake controls 11 can be any brake on a vehicle.

The inventive brake system can be used on any wheel supported vehicle having multiple brakes. For example, a two wheeled vehicle can include a front brake and a rear brake. The brake system on a three wheeled vehicle can include a front center brake, a left rear brake and a right rear brake. Alternatively, a three wheeled vehicle can include a left front brake, a right front brake and a center rear brake. On a four wheeled vehicle, the brake system can include a front left brake, a front right brake, a left rear brake and a right rear brake.

These brakes can be sequentially coupled in any order. For example, if the first brake 15 is the front brake, the brake control 11 can be coupled to the front (first) brake 15 by a front (first) brake actuator 13 and the front (first) brake 15 can be coupled to the rear (second) brake 19 by a rear (second) brake actuator 17. Conversely, if the first brake 15 is the rear brake, the brake control 11 can be coupled to the rear (first) brake 15 by a rear (first) brake actuator 13 and the front (second) brake actuator 17 can be coupled between the rear (first) brake 15 and the front (second) brake 19. In other embodiments, the vehicle may have left and right brakes. The first brake 15 can be the right brake and the second brake 19 can be the left brake.

It is also possible for the first brake to control multiple brake actuators 17, 25. For example, a first (rear) brake 15 can be coupled to a second (front left) brake actuator 19 can control the second (front left) brake 19 and a third (front right) brake actuator 25 can control the third (front right) brake 27 of the vehicle. It is also possible to extend the number of sequential brakes. For example, the brake controls 11 can actuate the first brake actuator 13 which is coupled to the first brake 15. The braking friction of the first brake 15 can actuate a second brake actuator 17 coupled to the second brake 19. The braking friction of the second brake 19 can actuate a fourth brake actuator 21 coupled to a fourth brake 23. Similarly, the braking friction of the third brake 27 can actuate the fifth brake actuator 29 coupled to a fifth brake 31. This sequential brake actuator configuration can continue to three or more brakes.

The following description is primarily directed towards a two wheeled bicycle in which the first brake is the rear brake and the second brake is the front brake. However, these same designs and operating principles can be applied to any multiple wheeled vehicle and the scope of the application is intended to cover the inventive braking system applied to all multiple wheeled vehicle configurations.

Normal bicycle brakes include two hand levers which are used to individually control a front brake and a rear brake. A problem with existing brake systems is that the bicycle rider must be careful when applying the brakes because if the front brake is locked, the stopping force can flip the rider off of the bicycle. There are several techniques for efficient braking on a two-brake bicycle. The one most commonly taught is the 25-75 technique. This method entails supplying 75% of the stopping power to the front brake, and about 25% of the power to the rear. Since the bicycle's deceleration causes a transfer of weight to the front wheel, there is much more traction on the front wheel. However, excessive front braking force can cause skidding of the front tire which can cause the bike to flip forward over the front wheel and probably injury to the rider. Excessive rear braking force can cause skidding, but will not result in the bike flipping.

The present invention is directed towards a brake system and apparatus which allows the rider to quickly stop the bicycle or other vehicle very quickly, but prevents the front wheel from locking up or being slowed too quickly. The brake system is also compatible with existing brake designs and can be produced in a very economical manner so that bicycle riders will not have to pay a significant amount of money for these very important safety features. In an embodiment, the inventive brake system can be retrofitted onto existing bicycle brakes and in other embodiments, the inventive brake system can be incorporated into the designs of the brakes.

Figure 2:
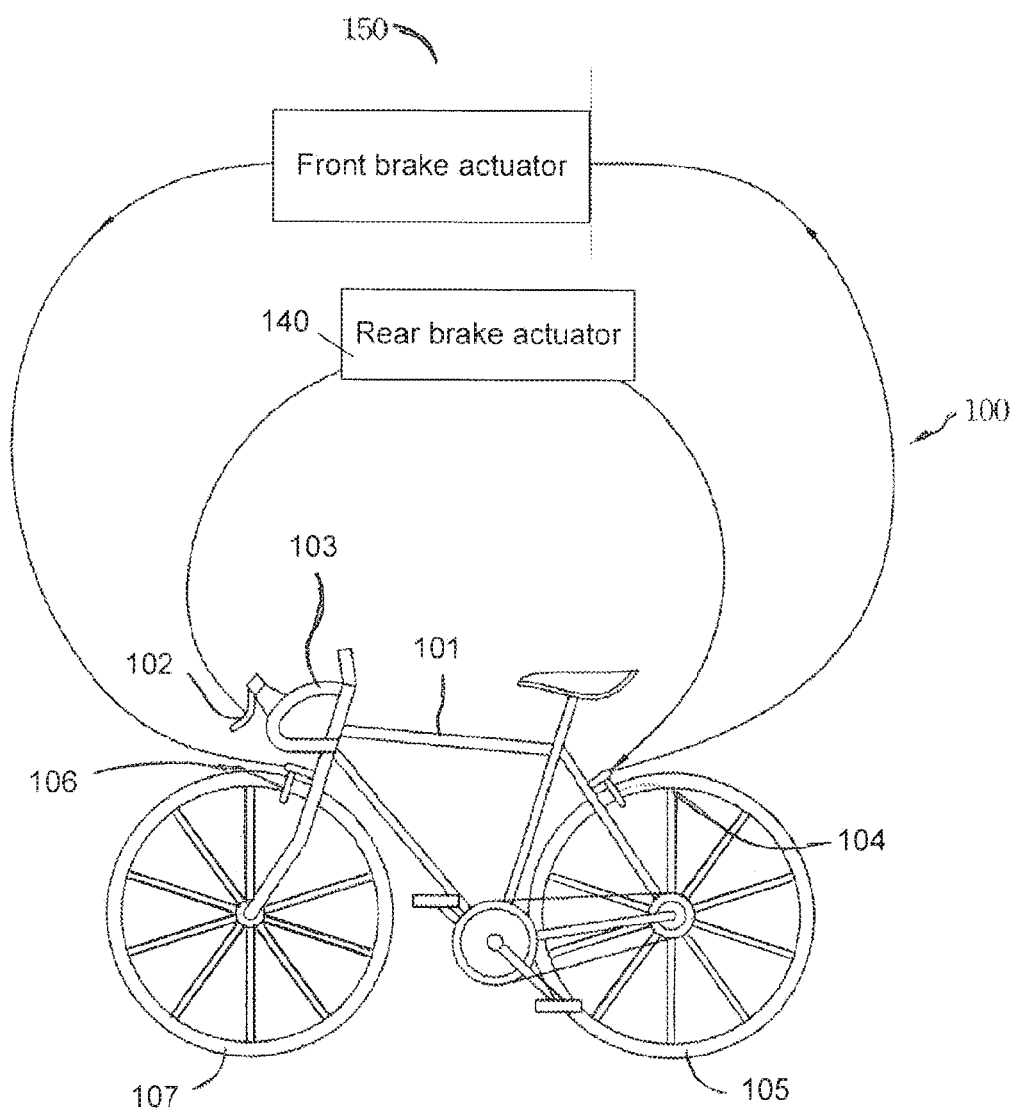
FIG. 2 illustrates bicycle having the inventive braking system according to an embodiment of the invention.

With reference to FIG. 2, a bicycle having the inventive braking system is illustrated. The bicycle 100 has a frame 101 on which a front wheel 107 and a rear wheel 105 are rotatably mounted. In an embodiment, one or two brake levers 102 are fastened on a handlebar 103 and the lever(s) 102 are connected to a rear brake actuator 140 which is coupled to a rear brake 104. A front brake actuator 150 is coupled between the front brake 106 and the rear brake 104. The rear brake 104 can include one or two inventive brake pad assemblies. When the rear brake 104 is actuated by the brake lever(s) 102 a portion of the rotating rear wheel 105 (or other braking surface) is compressed between two or more brake pads and the friction generated by the direct contact of the brake pad with the rotating braking surface slows the rotational velocity of the rear wheel. One or more of the brake pads in the rear brake 104 can include an inventive brake pad assembly. In response to the direct contact between the brake pads with the rotating braking surface, inventive brake pad assembly actuates the front brake actuator 150 which causes the front brake 106 to be applied to the front wheel 107 or other front wheel braking surface. When the rear brake 104 is released, the brake pad assembly is pulled away from the rear wheel 105 and the brake pad assembly releases the front brake actuator 150 which releases the front brake 106.

If the braking occurs quickly, the weight of the rider can shift forward and the deceleration force applied by the front wheel 107 at the point of contact with the ground can cause the rear wheel 105 to be lifted from the ground. This loss of surface contact will reduce or eliminate the rotational force applied by the ground to the rear wheel 105. Because the actuation force applied to the front brake 106 is proportional to the rotational force of the rear wheel 105, the braking force applied to the front wheel 107 will also be reduced until the rear wheel 105 regains contact with the ground. The contact will generate a rotational force to the rear wheel 105 and the inventive brake pad assembly will be actuated again and apply more force to the front brake 106. By automatically detecting the rotational force applied to the rear wheel 105 and adjusting the front brake 106 force proportionally, the inventive braking system and brake pad assembly prevents the front wheel 106 from skidding which allows the rider to remain in control of the bicycle even if excessive braking forces are applied. Since the front brake 106 force is controlled to the rear wheel rotational force 105, a rider can increase the braking force by moving as much body weight over the rear wheel 105 as possible during braking. However, even if the rider shifts his or her weight forward while riding, hard braking will not cause the bicycle to stop in a manner that would flip the bicycle over the front wheel 107.

Figure 3:
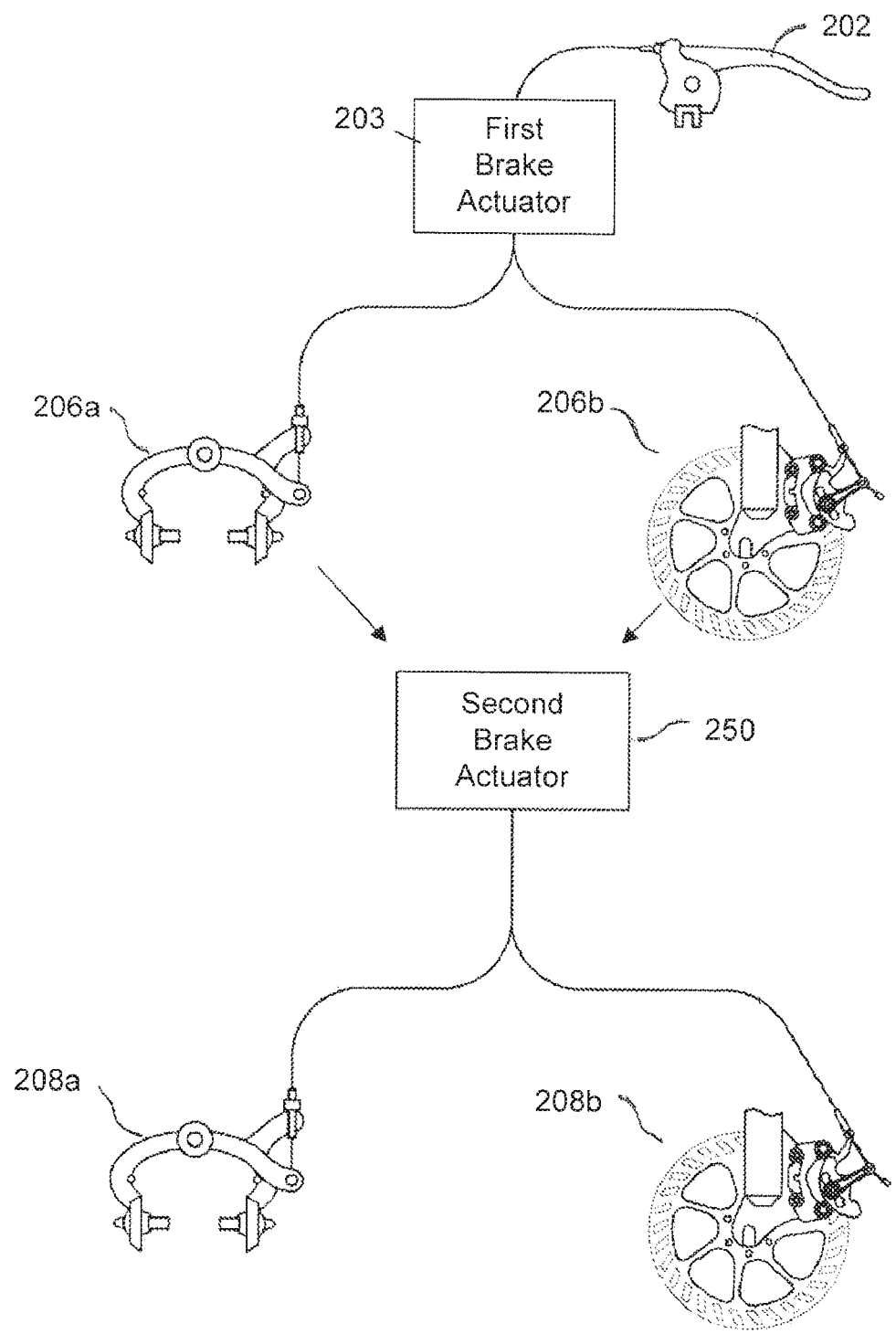
FIG. 3 illustrates a brake system according to an embodiment of the invention.

FIG. 3 illustrates a brake system according to one embodiment of this invention. The brake system can include a brake lever(s) 202, a first brake actuator 203, a first brake which can be a rim brake 206a, a disk brake 206b or other type of brake, a second brake actuator 250 and a second brake which can be a rim brake 206a, a disc brake 206b or any other brake mechanism. When the brake lever 202 is squeezed, it transfers a braking force to the first brake actuator 203 which applies the first brake 206a or 206b. The friction force of the brake pad assembly in the first brake 206a, 206b transmits a braking force to the second brake actuator which actuate the second brake 208a or 208b.

Figure 4:
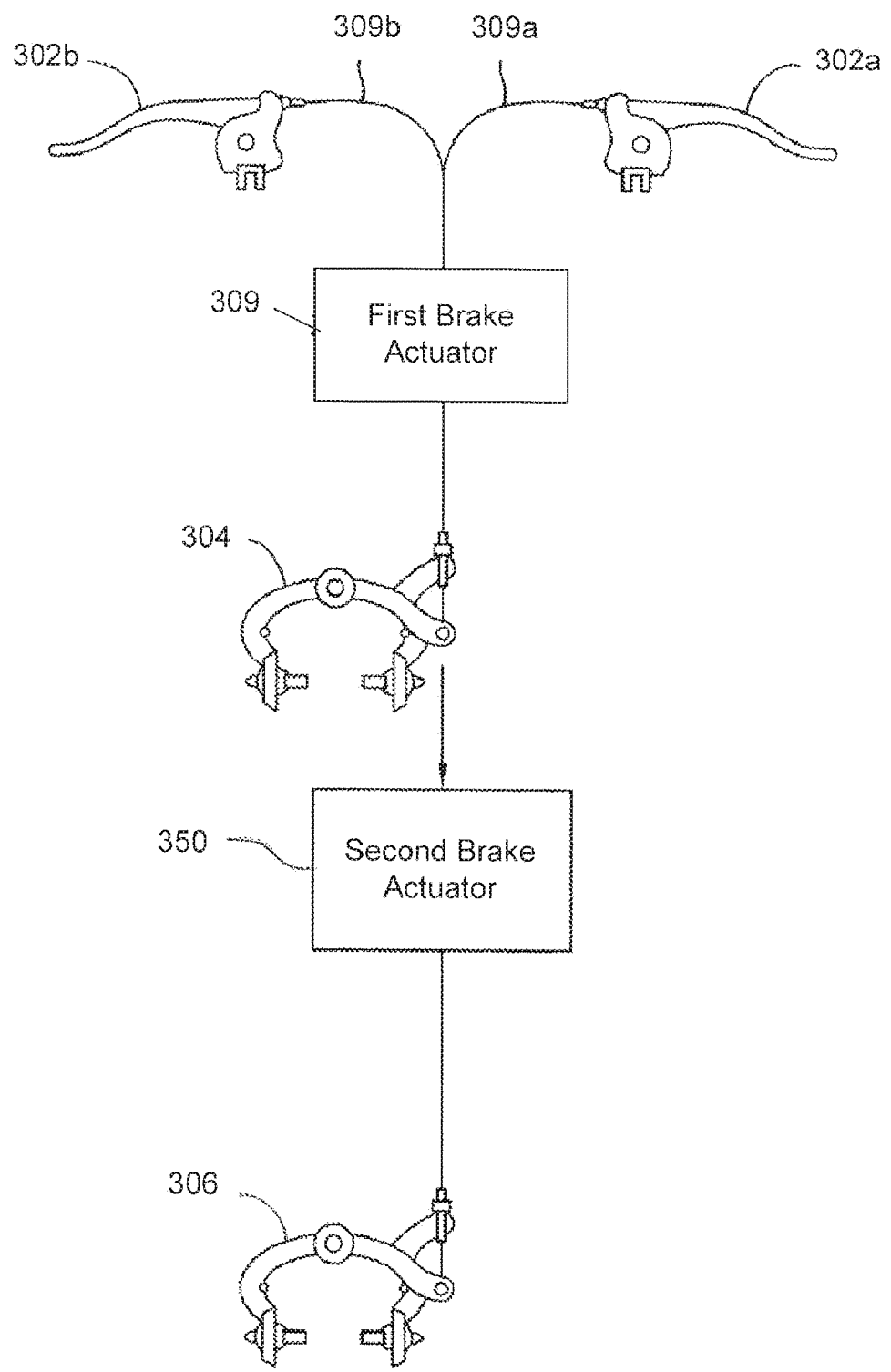
FIG. 4 illustrates a brake system according to another embodiment of the invention.

FIG. 4 illustrates a brake system according to another embodiment of this invention. The brake system may include two brake levers 302a, 302b, a first brake actuator 309, a first brake 304, a second brake actuator 350 and a second brake 306. In this embodiment, two brake levers 302a, 302b are used to actuate the first brake 304. In an embodiment, the first brake actuator 309 can be a cable that can be split into a first brake cable 309a and a second brake cable 309b. This configuration divides the first brake actuation force between the first brake cable 309a and the second brake cable 309b which are respectively pulled by a first brake lever 302a and a second brake lever 302b. In this configuration, a rider may use both hands to apply brake forces on the two brake levers 302a, 302b to actuate the rear brake 304.

However, the operator can still use either one of the two brake levers 302a, 302b alone and individually to actuate the first brake 304. When the first brake is actuated, the movement of one or more of the brake pads in the inventive brake pad assembly will actuate the second brake actuator 350 which transfers a brake force to the second brake 306. Although, caliper brakes 304, 306 are illustrated, any other type of brake can be used.

Figure 5:
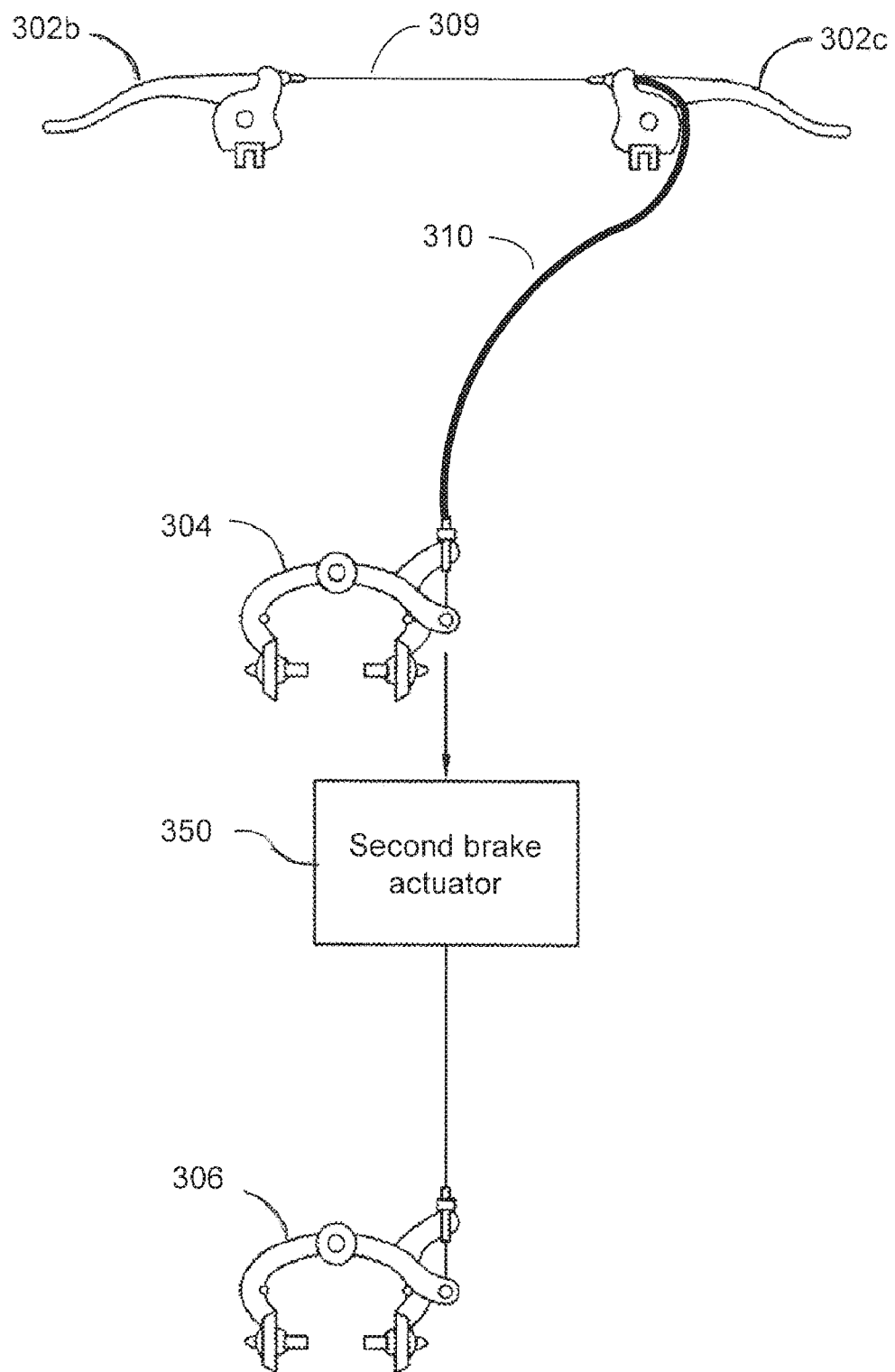
FIG. 5 illustrates a brake system according to another embodiment of the invention.

In some embodiments, the brake actuators can be brake cables surrounded by brake cable housings. The brake actuators can be actuated by pulling the cables through the brake cable housing, such that the brake cable is under tension and the brake cable housing is under compression. The brakes can be actuated by either pulling the brake cables away from the brake or pushing the brake cable housing towards the brake. With reference to FIG. 5, in an embodiment, two brake levers 302a and 302c can be coupled to a first brake actuator that includes a brake cable 309 and a brake cable housing 310 that surrounds a portion of the brake cable 309. The brake lever 302a, can be coupled to the brake cable 309 such that when actuated, the brake cable 309 is pulled towards the brake lever 302*a* and away from the first brake 304. The brake lever 302*c* is coupled to the brake cable housing 310. When the brake lever 302*c* is actuated, the brake cable housing 310 is pushed towards the first brake 304. Again, the brake levers 302*a*, 302*c* can be operated independently to actuate the rear brake 304. The friction force against one or more of the rear brake pads can actuate the second brake actuator 350 which transmits a brake force to the second brake 306 helping to stop the vehicle.

Figure 6:
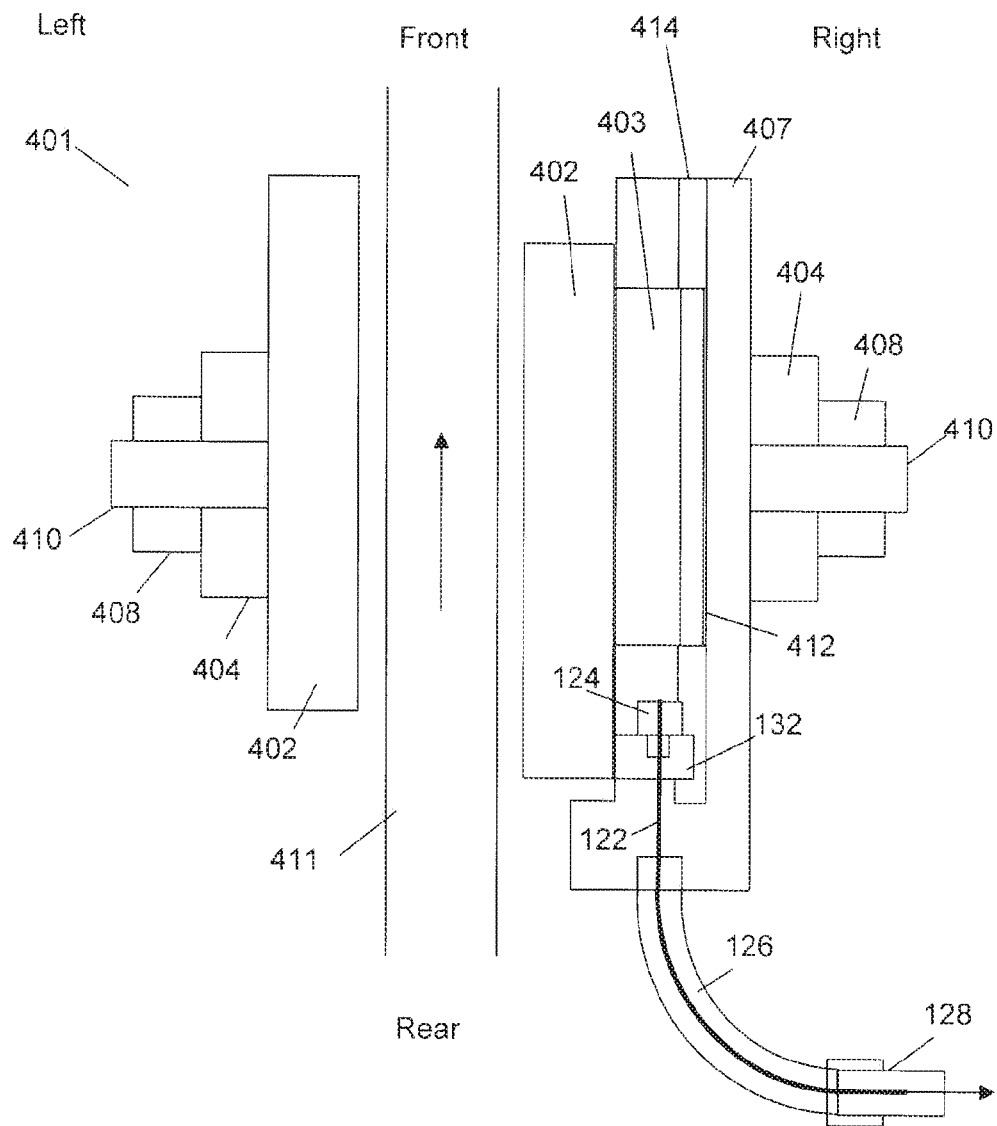
FIGS. 6 and 7 illustrate top views of a brake according to an embodiment of the invention.

With reference to FIG. 6, a top cross sectional view of an embodiment of a first brake 401 having the inventive brake assembly 414 is illustrated. The brake 401 can include a slider assembly 403 and a guide 407 that are coupled to an arm 404 of the first brake 401. The brake pad assembly 414 can include a slider assembly 403 that can slide within the guide 407. The brake 401 can be mounted around a portion of the first wheel with the brake pads 402 aligned on opposite sides of a first wheel rim 411. When the vehicle moves forward, the upper portion of the rim 411 also moves forward. The brake 401 can have two brake pads 402. In an embodiment, the brake pad 402 on the right side is coupled to a slider assembly 403 that moves within a guide 407. The guide 407 can be coupled to a mounting rod 410 which is secured to the brake arm 404. The slider assembly 403 can include a brake pad 402 which can be compressed against the rotating rim 411. The brake pad assembly 403 can also include a layer of lubricious material 412 such as Nylatron, Teflon, graphite or other low coefficient of friction and high compression strength materials. Alternatively, the brake assembly 403 components can be made of these low friction materials.

The orientation of the slider assembly 403, brake pad 402 and guide 407 on the bicycle can depend upon the position of the brake 401 on the wheel. If the brake 401 is located on the upper half of the rim 411, the described and illustrated positions are correct. However, if the brake is on the lower half of the rim 411, the "front" and "back" of the bicycle can be reversed.

The slider assembly 403 can also be coupled to a second brake actuator. In an embodiment, the second brake actuator can be a cable 122 having an end fitting 124 which can have a stepped cylindrical design with a first smaller diameter and a larger end diameter. The fitting 124 can engage an open hole coupling mechanism 132 on the slider 403. The hole in the coupling mechanism 132 can be slightly larger than the first smaller diameter and smaller than the larger end diameter so that the fitting 124 is securely connected to the coupling mechanism 132.

The guide 407 can have a feature that engages the end of a brake cable "noodle" 126 which is rigid section of tubing that functions as a low friction guide for the brake cable 122. In an embodiment, the guide 407 can have a counter bored recess which has an inner diameter that is slightly larger than the outer diameter of the end of the noodle 126. In other embodiments, the end of the noodle 126 can be inserted into a ferrule that can be a metal or plastic piece that surrounds the outer diameter and end of the noodle 126 and has a hole for the brake cable 126 to protrude through.

The guide can also have a threaded mechanism that allows the brake pads 402 of the second brake to be adjusted in the released state by effectively controlling the length of the second brake cable housing 128. In an embodiment, the brake cable housing 128 includes a barrel adjuster which allows the user to effectively adjust the length of the cable housing 128. If the brake is too tight and additional clearance is required, the barrel adjuster is adjusted to effectively shorten the cable housing 128 length. Conversely, if the second brake is too loose, the barrel adjuster can be adjusted to effectively lengthen the cable housing 128 length. The barrel adjuster can be located at any portion of the brake cable housing 128, including at the intersection with the inventive brake pad assembly. The brake pads 402 will rest close to the second rim if the cable housing 128 is lengthened and conversely, if the brake cable 126 is shortened, the brake pads 402 on the second brake will rest farther away from the rim 411 in the normal open position.

The other end of the noodle 126 opposite the side in contact with the guide 407 can be connected to an end of the brake cable housing 128. The end of the noodle 126 can include an outer sleeve that surrounds the outer diameter of the cable housing 128 and an inner edge that engages the end of the brake cable housing 128. The noodle 126 can allow the brake cable 126 to bend so that the brake cable can be directed in any desired direction, preferably towards the second brake. In an embodiment, another noodle can be coupled to the second brake and used to direct the brake cable 128 in the desired direction. The end of the brake cable 128 can be secured to the second brake with a "pinch bolt" mechanism which surrounds and secures the brake cable 128 to the second brake. In other embodiments, noodles may not be necessary and the brake cable housing 128 may be in direct contact with the first brake guide 407 and/or the second brake. The cable housing 128 can extend the entire length of the brake cable 126 or only be used over one or more sections of the brake cable 126. For example, in many bicycles, the cable housing 128 may be secured to stationary stops coupled to the ends of the top tube and the bare brake cable 128 may extend along or inside the top tube. If the second brake cable 128 is used to actuate a mechanical front disk brake, the second brake cable 128 can extend down an arm of the front fork.

The brake pad 402 on the left side of the rim 411 can be a normal brake pad. In an embodiment, the brake pad 402 is coupled to a threaded mounting rod 410 that extends away from the braking surface. The brake pad 402 can be secured to the brake arm 404 by tightening a nut 408 that is screwed onto the mounting rod 410. In this configuration, the brake pad 402 coupled directly to the threaded mounting rod 401 remains stationary relative to the arm 404 when the rear brake 401 is actuated. When the brake 401 is not actuated, the brake pads 402 are pulled away from the rim 411 by springs in the brake 401. In other embodiments, the brake pads can both have the inventive brake pad 414 assemblies.

Figure 7:
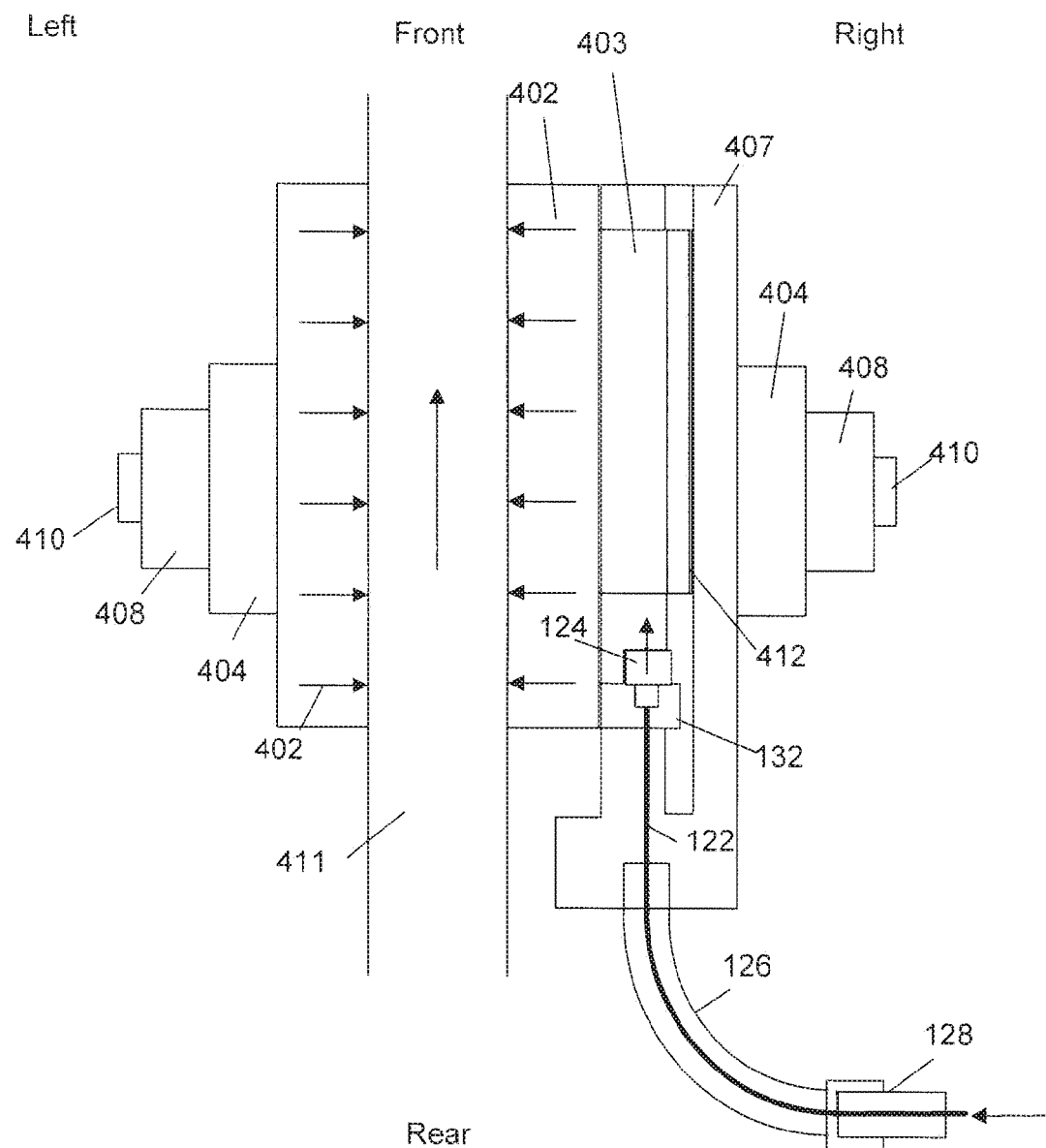

With reference to FIG. 7, the first brake 401 is coupled to a brake actuator which can be a brake lever(s). When the lever(s) is actuated, the inventive brake pad assembly 414 is pressed against the rim 411 of the wheel (or a rotating disk brake) coupled to the wheel to slow or stop the rotation. The rim brake pad 402 of the inventive brake pad assembly 414 can have an elongated shape like a normal brake pad. The slider assembly 403 and guide 407 are aligned with the brake pad 402 and rim 411 so that the movement of the slider 403 and brake pad 402 are also aligned with the rim 411 of the wheel.

When the first brake 401 is actuated, the slider assembly 403 and brake pad 402 are pressed against the rotating rim 411 and the movement of the rim 411 causes the slider assembly 403 and brake pad 402 to slide forward in the guide 407 towards the front of the bicycle. The coupling mechanism 132 is connected to the fitting 124 on the end of the brake cable 122. The movement of the slider assembly 403 will be greater than the spring force of the second brake and will cause the brake cable 122 to be pulled in tension. The noodle 126 is coupled to the guide 407 and the tension on the brake cable 122 will result in compression of the noodle 126 and the brake cable housing 128. The brake cable 122 and housing 128 are also coupled to the second brake. The movement of the brake cable 122 within the housing 128 will actuate the second brake.

The brake cable 122 tension force can be proportional to the friction force of the brake pad 402 against the moving rim 411. A higher braking force applied to the first brake will result in a higher braking force applied to the second brake through the brake cable 122.

However, if the rim 411 loses traction with the road, the rim 411 may stop rotating and the friction force that creates the force that pulls on the brake cable 122 and the brake force applied to the second brake are reduced until the rim 411 regains traction and begins to rotate again. Since the rim 411 may lose traction when excessive braking is applied to the front brake the rear wheel is starting to lift off the ground, this system effectively functions as an anti-locking brake system.

Figure 8:
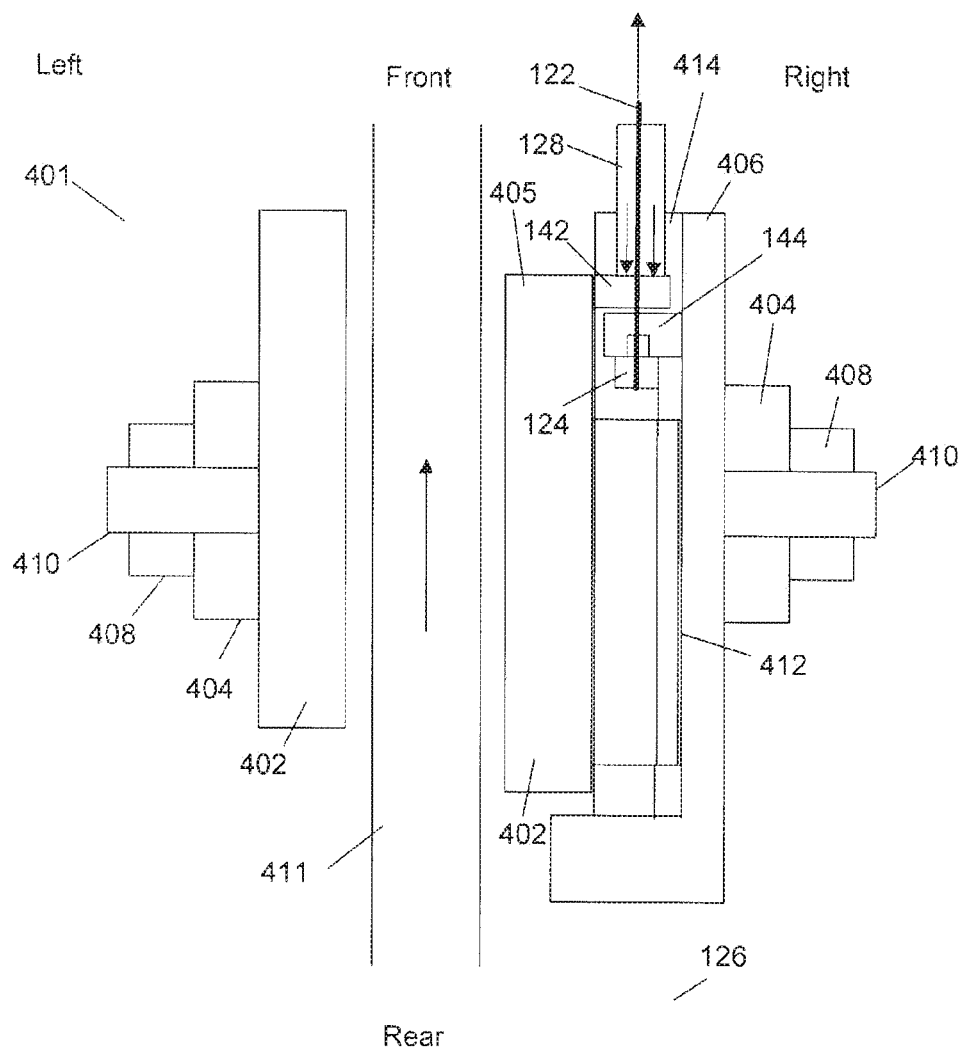
FIGS. 8 and 9 illustrate top views of another brake according to an embodiment of the invention.

With reference to FIG. 8, in an embodiment, the second brake actuator can be brake cable 122 in a brake cable housing 128. The brake cable 122 can have an end fitting 124 which is attached to the guide 406 at a coupling mechanism 144. The end of the brake cable housing 128 can butt up against a tab 142 coupled to the slider assembly 405. This is similar to the brake pad assembly illustrated in FIGS. 6 and 7. However, the action is reversed since the brake cable 122 can be coupled to the guide 406 and the brake cable housing 128 can be coupled to the slide assembly 405. The compression of the brake cable housing holds the brake pad assembly towards the back of the guide while the brake is in the open position.

Figure 9:
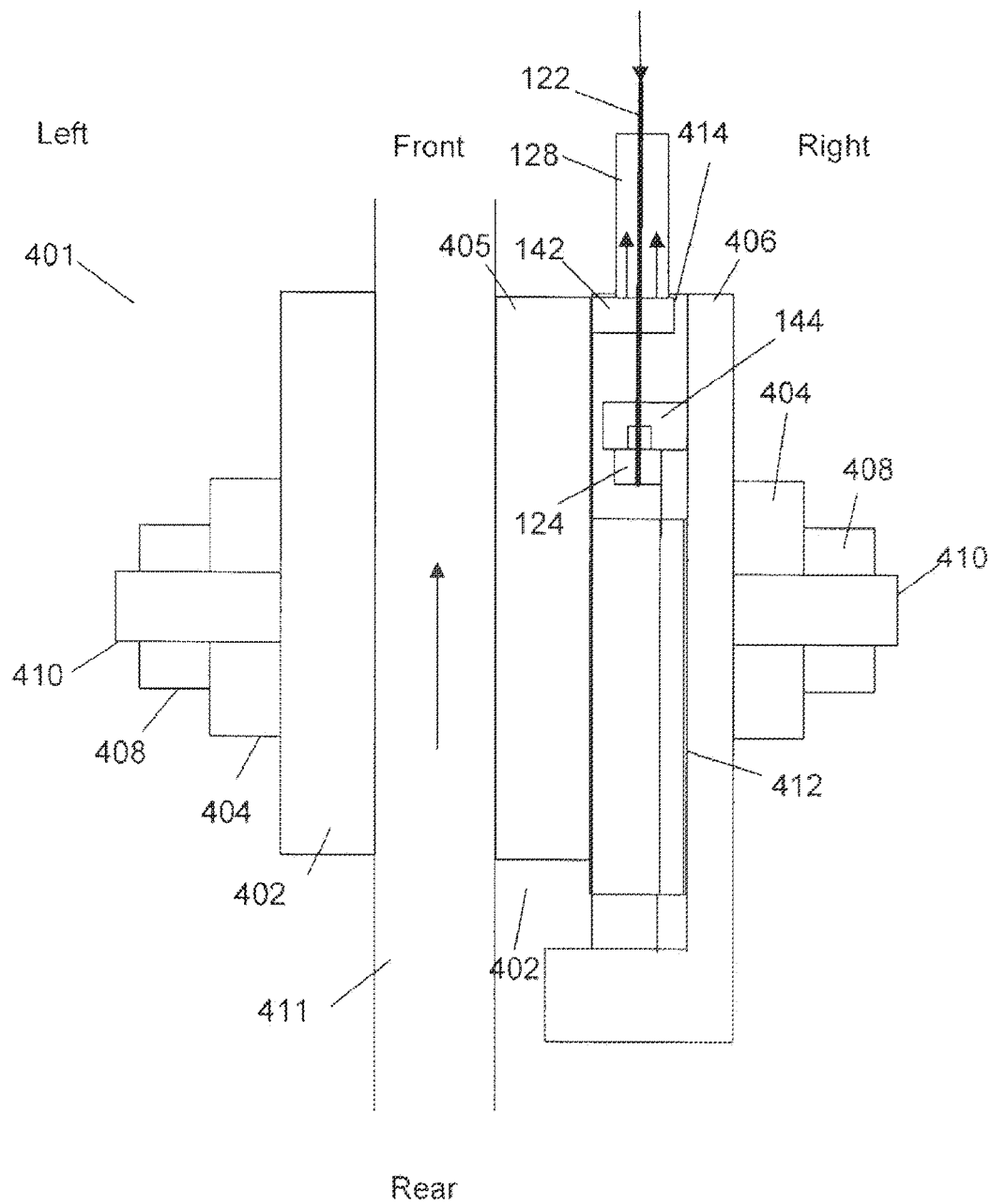

With reference to FIG. 9, when the first brake is actuated, the brake pad assembly 405 is pressed against the moving rim 411 and the friction force causes the brake pad assembly 405 to move forward. This movement causes the brake cable housing 128 to be compressed. Although the guide 406 and brake cable 128 may not move, the movement of the brake cable housing 128 results in tension in the brake cable 122 which actuates the second brake. The pushing force on the brake cable housing 128 due to the braking friction is greater than the front brake spring force, the brake cable housing 128 is compressed and the front brake cable 122 is pulled in tension. If the rim 411 stops rotating due to a lack of contact with the road, the slider 405 and brake cable housing 128 will no longer be pushed forward. This reduced force in the brake cable 122 and brake cable housing 128 will reduce the braking force on the second brake until the rim 411 regains traction on the road and starts rotating again. The brake configuration illustrated in FIGS. 8 and 9 may not require a noodle to direct the second brake cable 122 from the rear brake to the front brake.

Figure 10:
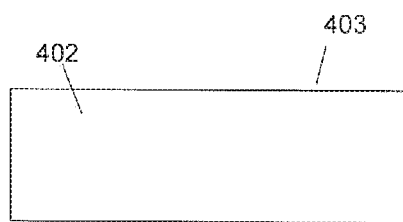
FIGS. 10-14 illustrate views of a slider assembly according to an embodiment of the invention.
Figure 11:
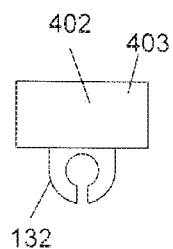
Figure 12:
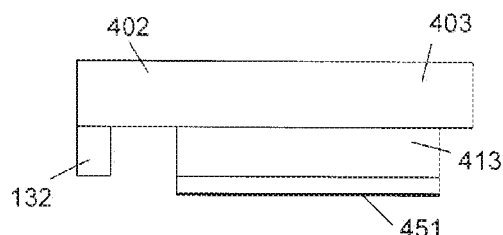
Figure 13:
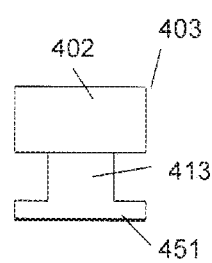
Figure 14:
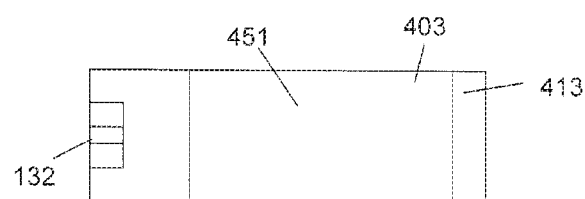

In an embodiment, the inventive brake pad mechanism assemblies can be a direct replacement for the existing brake pads. The brake pad can be very similar to the known brake pads. FIGS. 10-14 illustrate different views of an embodiment of the slider assembly 403. FIG. 10 illustrates an inner side view, FIG. 11 illustrates a back view, FIG. 12 illustrates a top view, FIG. 13 illustrates a front view and FIG. 14 illustrates an outer side view of the slider assembly 403. Rather than being molded around a brake support structure or placed in a brake shoe, the brake pad 402 can be molded around a slider 403 which slides within a guide. In other embodiments, the brake pad 402 can be inserted into a brake shoe that holds the brake pad in the required position on the slider assembly 403.

The slider assembly 403 can include a slide portion 413 that engages a corresponding slot in the guide. In this embodiment, the slide portion 413 can have a "T" shape. In other embodiments, the slide portion 413 can be any other shape that can be held in a corresponding slot. The slider assembly can also include an open hole coupling mechanism 132 that can be securely connected to the brake actuator. Because the slide portion 413 is in physical contact with the guide, a film or sheet or the entire slider can be made of a lubricious material such as: Nylatron, Teflon, graphite or other low coefficient of friction and high compression strength materials can be attached to the sliding 451 surface(s) of the slider 403 and/or guide. In other embodiments, the entire slide portion 413 or the slider assembly 403 can be made of a lubricious material.

The coefficient of friction of the brake pad 402 sliding against the rim can depend upon the brake pad 402 and rim materials. The rim can be made of aluminum, carbon fiber, plastic, titanium, steel, and other alloys. The brake pad 402 can be a plastic, rubber or other high coefficient of friction material that can molded around a slider 403 or attached in any other suitable manner to a brake support structure. The brake support structure prevents the brake pad 402 from deforming while it is compressed against the rim. The slider brake support structure and brake pad 402 can also be configured to apply uniform pressure to the contact areas where the brake pads contact the rim or other braking surface such as a disk brake.

Figure 15:
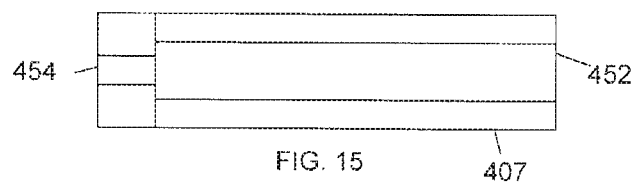
FIGS. 15-19 illustrate views of a guide according to an embodiment of the invention.
Figure 16:
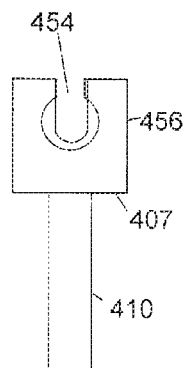
Figure 17:
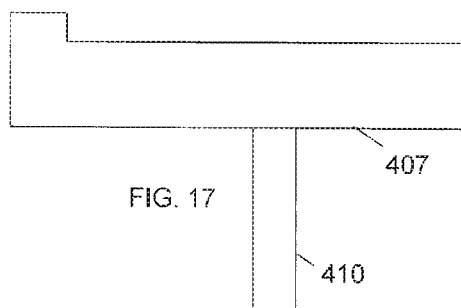
Figure 18:
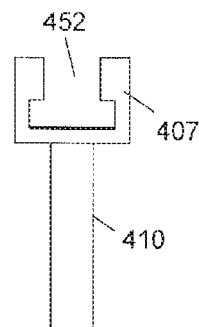
Figure 19:
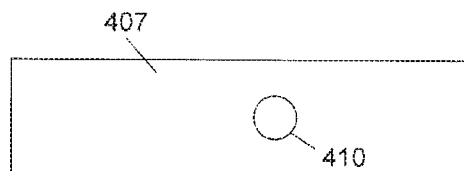

Different views of an embodiment of the guide 407 are illustrated in FIGS. 15-19. FIG. 15 illustrates an inner side view, FIG. 16 illustrates a back view, FIG. 17 illustrates a top view, FIG. 18 illustrates a front view and FIG. 19 illustrates an outer side view of the guide 407. The guide also has a groove 452 that the sliding portion of the slider assembly moves within. The rear end of the guide 407 can include a slot 454 and a recessed area 456 for holding an end of a noodle or a brake cable housing. The guide 407 can include a mounting rod 410 to secure the guide 407 to a brake arm. The rod 410 can be cylindrical and have a smooth surface. In other embodiments, the outer diameter of the rod 410 may be threaded. In other embodiments, any other type of attachment mechanism can be used to secure the brake to the guide. For example, the guide 407 may have a threaded hole which allows a bolt to be screwed into the hole to secure the guide to the brake. The assembled brake pad assembly with the slider assembly 403 and the guide 407 can be similar in size to a conventional brake pad.

Figure 20:
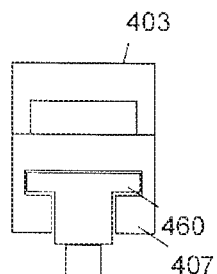
FIGS. 20-22 illustrate cross section views of the slider assembly and guide according to different embodiments of the invention.
Figure 21:
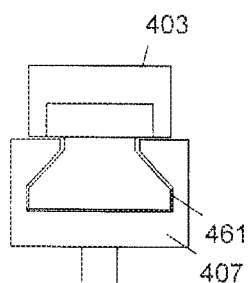
Figure 22:
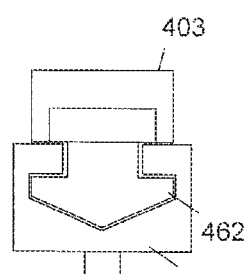

FIGS. 2-19 illustrate the slider as having an inverted "T" portion which slides within a corresponding inverted T shaped groove formed in the guide. The sliding portions can be the lower flat portion of the inverted T as well as the surfaces of the guide that are closest to the slider. Each of these sliding surfaces can be used with a lubricious material to minimize the sliding friction. In other embodiments, any other sets of sliding surfaces can be used as shown in the exemplary cross section illustrations. Various other configurations are available for the slider and guide as shown in FIGS. 20-22. FIG. 20 illustrates a cross section of an embodiment of the brake pad assembly having a guide with a "T" cross section groove 460 and a slider assembly having a corresponding "T" shaped groove 465. FIG. 21 illustrates a guide 407 having a tapered groove 461 and a slider assembly having a corresponding sliding portion 466. FIG. 22 illustrates a guide having a "V" groove 462 and a slider assembly having a corresponding slider portion. Various other slider groove combinations are contemplated.

Figure 23:
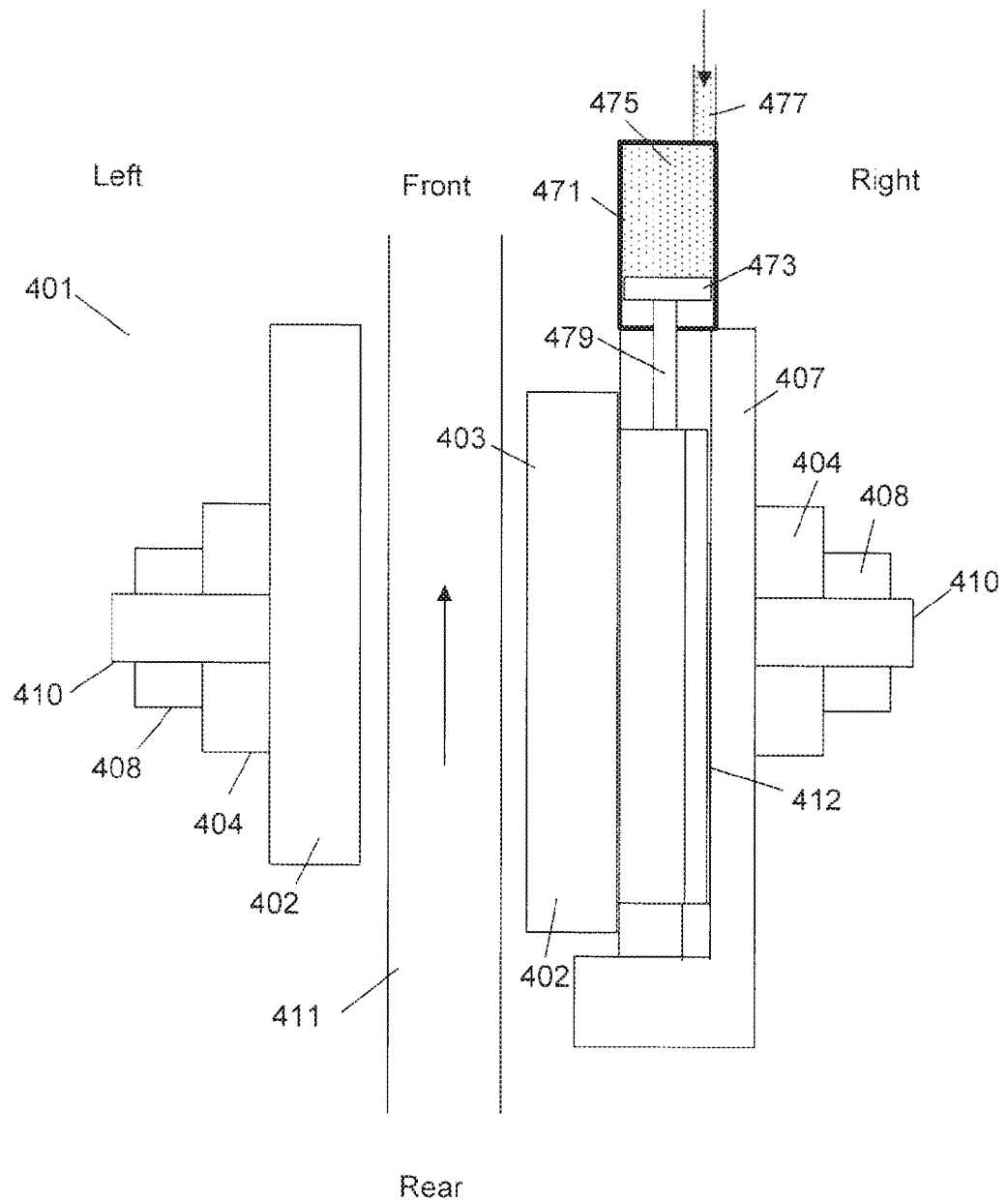
FIGS. 23 and 24 illustrate top views of another brake according to an embodiment of the invention.
Figure 24:
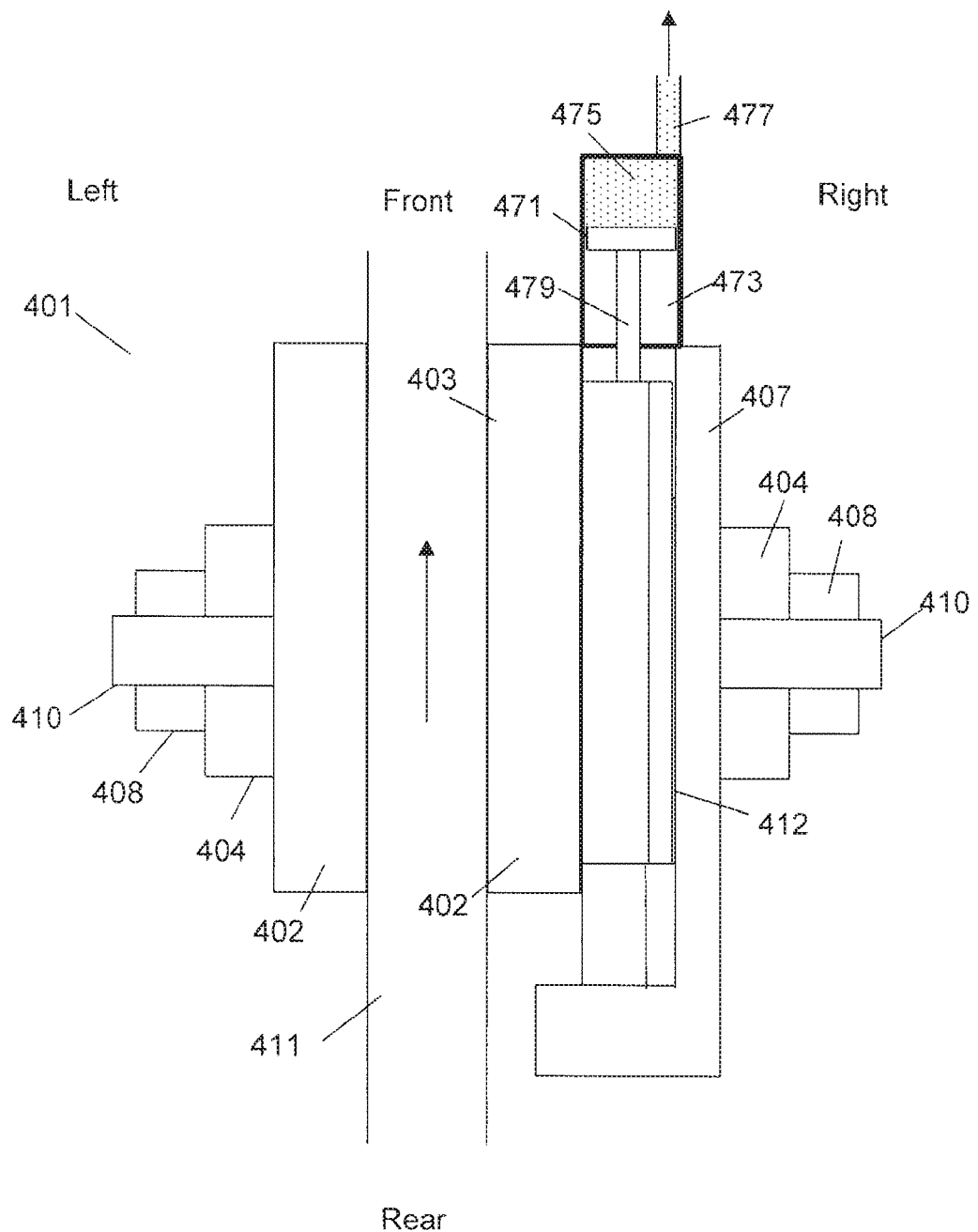

With reference to FIGS. 23 and 24, in other embodiments, it is also possible to apply the described rear brake assembly to a hydraulic brake system. Rather than a cable pulling system, the rear brake assembly can be coupled to a hydraulic cylinder 471 filled with hydraulic fluid 475. The cylinder 471 can be coupled to the guide 407 and the slide assembly 403 can be coupled to a piston rod 479 that is attached to a piston 473 that can move within the cylinder 471. One end of the brake hydraulic tubing 477 is coupled to a cylinder 471 and the opposite end is coupled to the second brake. With reference to FIG. 23, a spring in the second brake pressurizes the hydraulic fluid 475 pressing the piston 473 towards the back of the cylinder 471. The hydraulic brake system can be a disc brake or a rim brake (cantilever, V-brake, etc.) In the normal position, the brake shoe 402 is not in contact with the rim 411 or disk brake.

With reference to FIG. 24, in the braking position the brake pads 402 are pressed against the moving rear rim 411 or disk brake. The slider 403 moves forward due to the friction of the brake pad 402 against the rim 411. The slider 403 pushes the rod 479 and the piston 471 within the cylinder 471 pressuring the hydraulic fluid 475. The pressurized hydraulic fluid 475 exits the cylinder 471 and flows through the hydraulic tubing 477 to actuate the second hydraulic brake. If the rim 411 stops rotating due to a lack of contact with the road, the friction force and the force moving the slider 403 forward will decrease. The forces on the piston 473 will decrease and the hydraulic fluid 475 pressure will also decrease. This reduced hydraulic fluid 475 pressure in the hydraulic tubing 477 will reduce the braking force on the second brake until the rim 411 regains traction on the road and starts rotating again.

Figure 25:
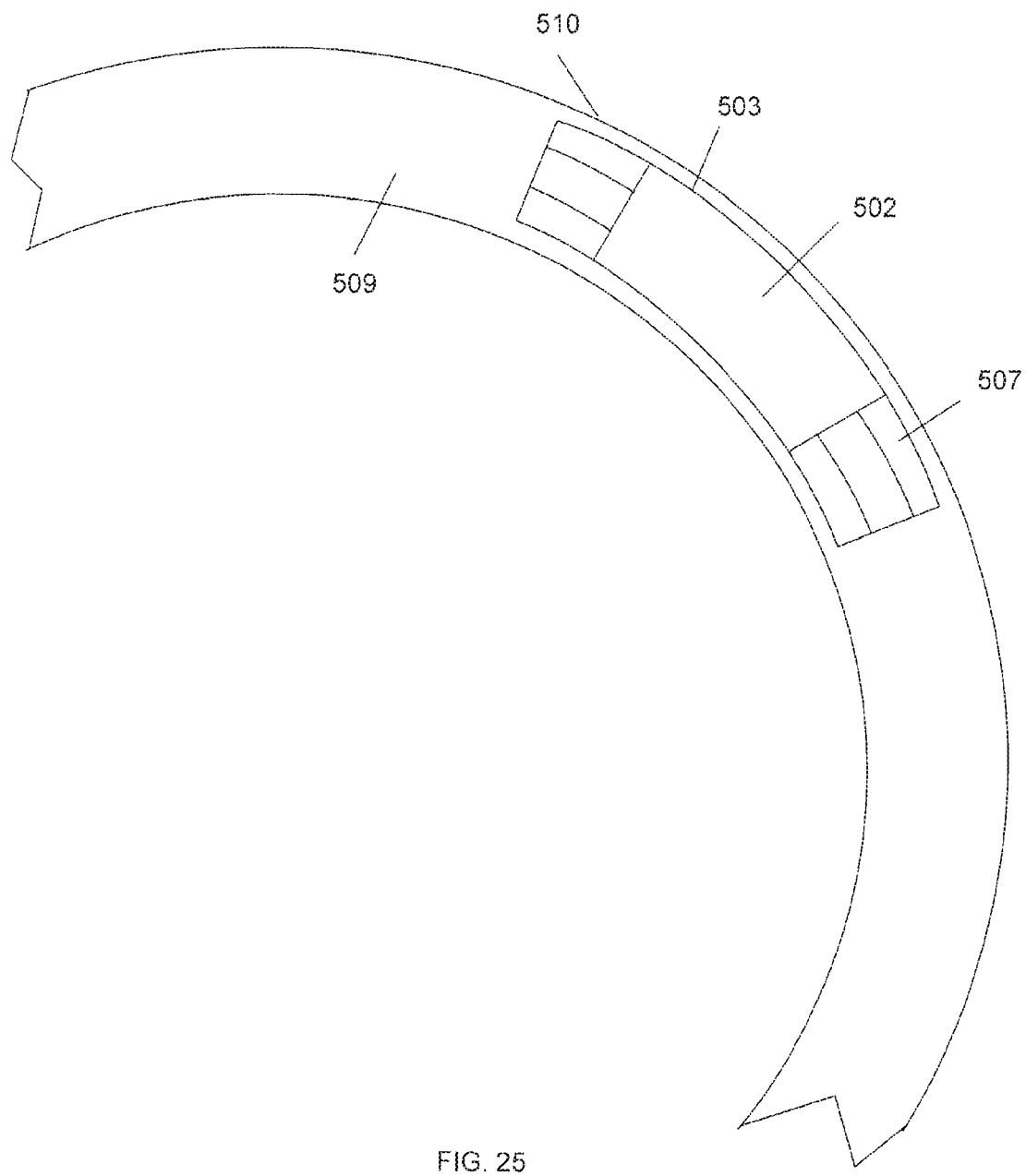
FIG. 25 illustrates a side view of the slider assembly and guide according to a disk brake embodiment of the invention.

With reference to FIG. 25 an embodiment of the brake pad assembly 510 is illustrated. In many bicycles, hydraulic systems are used with disk brakes. Because the disk brakes use a disk rotor 509 rather than a rim as the braking surface, the brake pad 502 can be any geometric shape that provides sufficient surface area to stop the rotation of the disk rotor 509. Because the disk brake pad 502 is located much closer to the center of rotation, the radial position of the disk brake pad 502 may shift as the slider 503 moves within the guide 507 if the path is linear. In an embodiment, the slider assembly 503 and guide 507 can be configured with an arched path that matches the disk rotor. This configuration may allow the disk brake pad 502 to maintain a constant radial position against the brake rotor 509 regardless of the position of the slider assembly 503 within the guide 507. In the disk brake embodiment, the second brake actuator can be a brake cable in a brake cable housing, a hydraulic system or any other braking mechanism that can be actuated by the movement of the slider assembly 503 in the guide 507.

In other embodiments, the brake shoe slider assembly structure can be used for various other purposes. For example, the brake shoe slider assemblies can be coupled to springs which can provide smoother braking actuation. In this embodiment, both brake shoes of a brake mechanism can have brake shoe/slider assemblies that move within guides on opposite sides of the rim. In the normal open position, the springs are fully extended and the sliders are towards the back of the guides. When the brake is actuated, the brake pads are compressed on opposite sides of the rim and the brake pad/slider assemblies are moved in the guides to compress the springs. This spring motion can provide more uniform braking. If there are rough spots on the rim, the brake pad will have a higher coefficient of friction and tend to compress the spring more. If there are smoother sections of the rim, the coefficient of friction will decrease and the spring can expand. The compression of the spring will tend to absorb the braking force and the spring extension will tend to release the braking force. The overall effect is a smoother braking feel for the rider.

Figure 26:
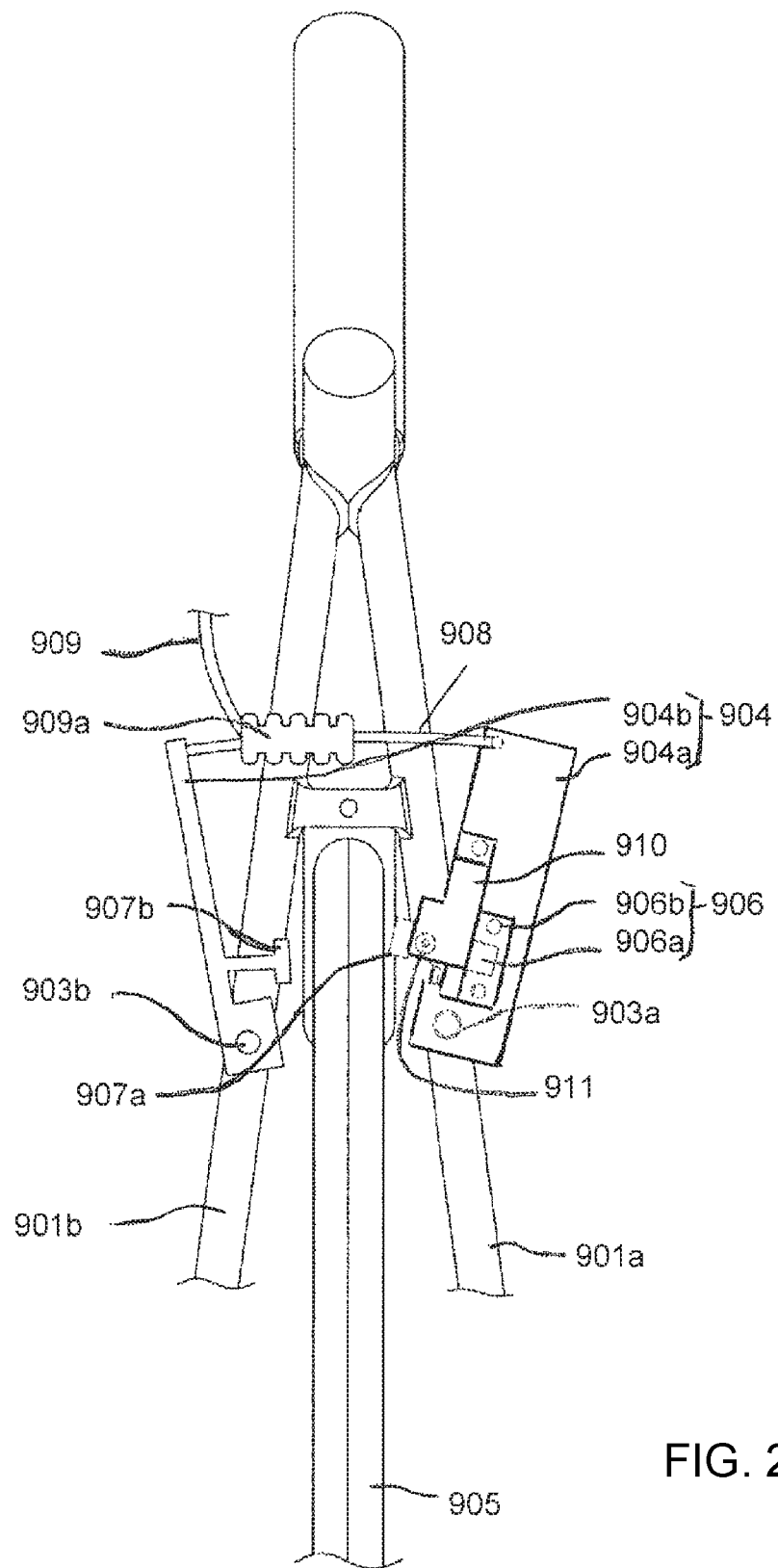
FIG. 26 illustrates a rear view of a released brake and a second brake actuator.
Figure 28:
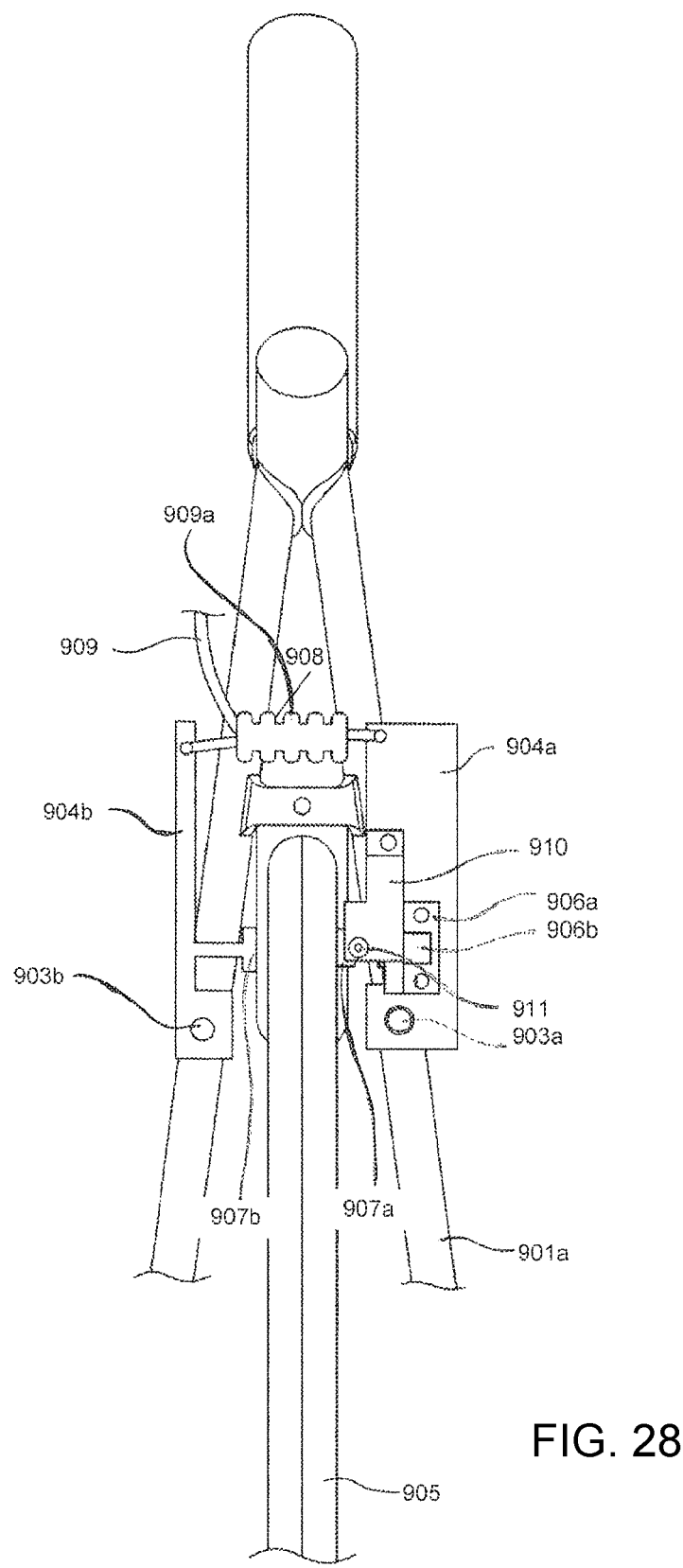
FIG. 28 illustrates the rear view of the actuated brake and second brake actuator.

FIGS. 26 and 28 respectively illustrate a rear cantilever brake and a transmission device according to another embodiment of this invention. FIG. 26 illustrates the rear view of a cantilever brake in the open position with the brake pads 907a, 907b away from the wheel 905. FIG. 28 illustrates the rear cantilever brake in the actuated position with the brake pads 907a, 907b against the wheel 905. In this embodiment, a transmission device is also integrated into the cantilever type brake. A rear cantilever brake 904 can include two brake arms 904a, 904b and the second brake actuator brake assembly 906 can be integrated into either one or both of the two brake arms 904a, 904b. The brake arm 904a can be pivotally connected with a seat stay 901a which is part of the bicycle frame and the brake arm 904a can rotate about a pivot axis 903a. The brake arm 904b can be pivotally connected with a seat stay 901b and the lower end can rotate about a pivot axis 903b. A first brake actuator can be a first brake cable 908 that slides within a noodle 909. The first brake cable 908 can be coupled to the first brake arm 904a and the noodle 909 can be coupled to the second brake arm 904b by a bracket 909a. When actuated, the brake arms 904a, 904b are squeezed towards each other and this inward rotation actuates their respective brake pads (907a, 907b) to be pressed against the rear wheel 905. The brake arms 904a, 904b can each be coupled to springs which rotate the brake arms 904a, 904b away from the wheel 905 as illustrated in FIG. 26 when the first brake cable 908 is not actuated by a brake lever.

With reference to FIG. 28, when the first cantilever brake 904 is actuated, the two brake arms 904a, 904b are pulled towards each other by the movement of the brake cable 908 and the noodle 909, such that their respective brake pads 907a, 907b are pressed against the wheel 905 to slow the rotation of the wheel 905. The second brake actuator device 906 can consist of a guide 906a and a slider 906b. The friction force of the brake pad 907a against the rotating wheel 905 causes the slider 906b to move within the guide 906a to move the second brake actuator. When the brake lever is released, the two brake arms 904a, 904b of the first cantilever brake 904 return to their respective open positions as illustrated in FIG. 26 by the torsion spring force.

Figure 27:
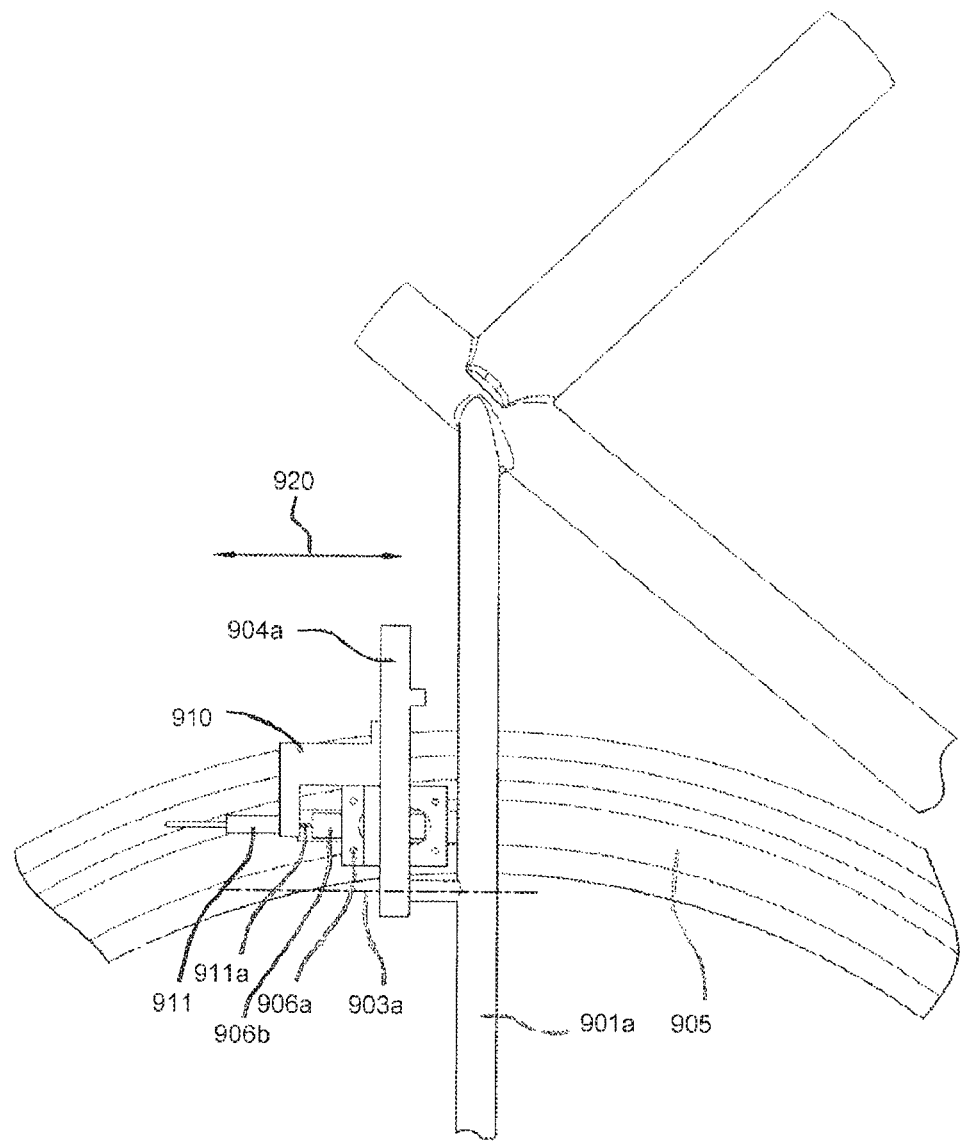
FIG. 27 illustrates a side view of the released brake and the second brake actuator.
Figure 29:
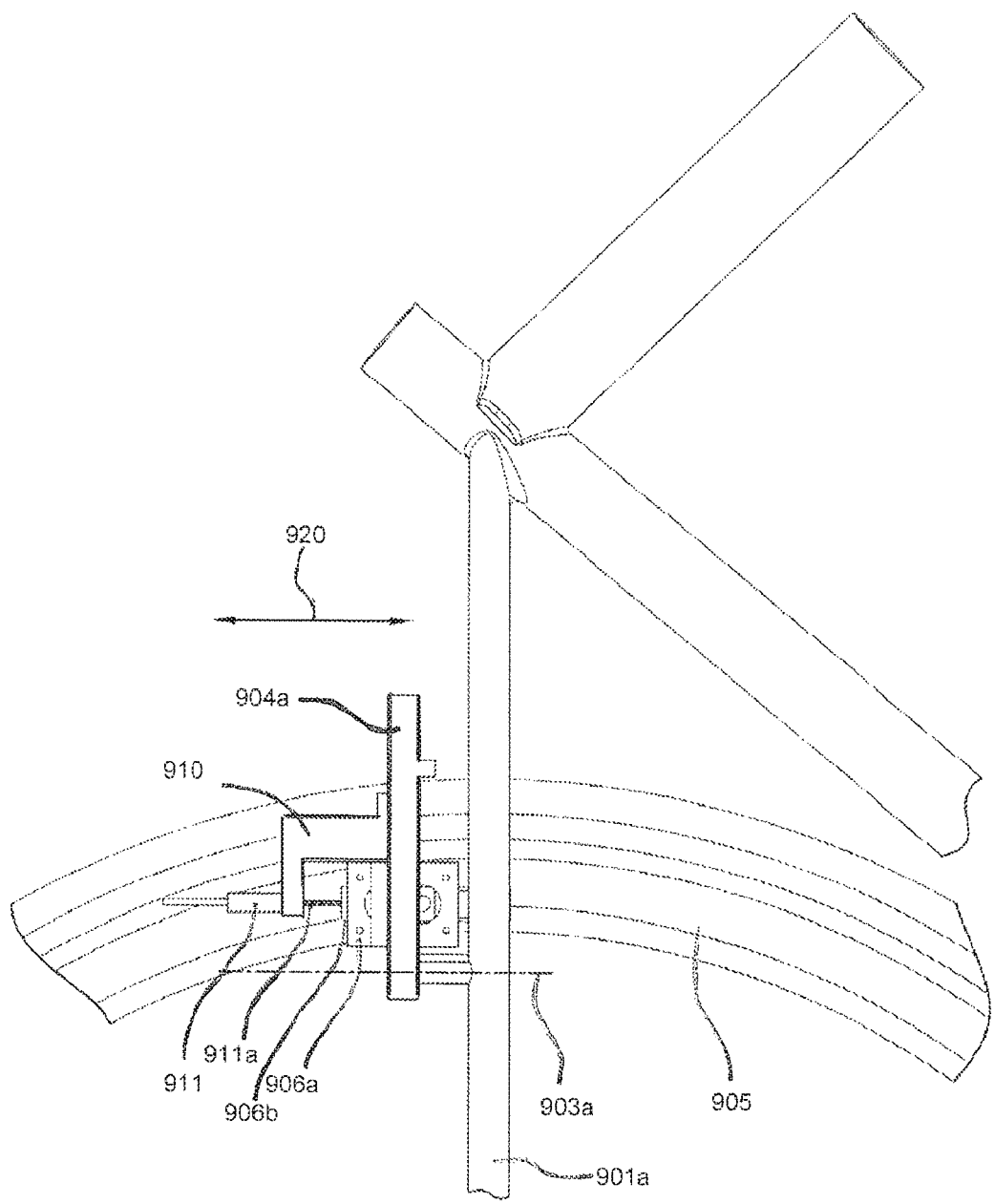
FIG. 29 illustrates a side view of the actuated brake and second brake actuator.

FIG. 27 illustrates a side view of the rear cantilever brake and the transmission device as illustrated in FIGS. 26 and 29 illustrates side views of the first brake and the second brake actuator as illustrated in FIG. 28. An operation mechanism of the rear cantilever brake's right half is further described below with reference to FIGS. 27 and 29. In the illustrated embodiment, an L-shaped bracket 910 can be secured to the brake arm 904a and an opposite end of the bracket 910 can be coupled to the second brake actuator which can be a brake cable housing 911 which surrounds the brake cable 911a. The brake cable 911a can be coupled to the slider assembly 906b and the brake pad 907a can be a component of the slider assembly 906b. The slider assembly 906b can be slidably connected to the guide 906a which allows the slider assembly 906b to slide along a direction 920. The direction 920 is generally in parallel with the pivot axis 903a.

When the second brake actuator 906 is not actuated as illustrated in FIG. 27, the brake pad 907a is not in contact with the wheel 905 and the brake cable 911a is not pulled by the slider assembly 906b to actuate a second brake. In an embodiment, the first bake can be the rear brake and the second brake can be the front brake 106 of a bicycle as illustrated in FIG. 2.

With reference to FIG. 29, when the second brake actuator 906 is actuated, the second brake cable 911*a* is pulled by the slider assembly 906*b* due to the friction of the brake pad 907*a* against the wheel 905. The second brake cable 911*a* can be coupled to a second brake which is actuated by the pulling of the second brake cable. When the first brake is released and the second brake actuator 906 is released, the slider assembly 906*b* is pulled by the brake cable 911*a* towards the brake cable housing 911 and the second brake actuator returns to an original position as illustrated in FIG. 27.

Figure 30:
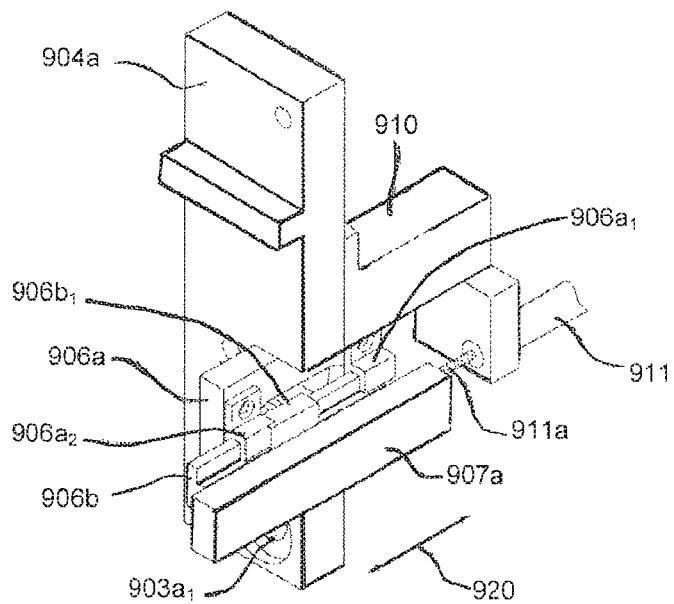
FIG. 30 illustrates a perspective view of the cantilever brake arm, slider assembly and guide.
Figure 31:
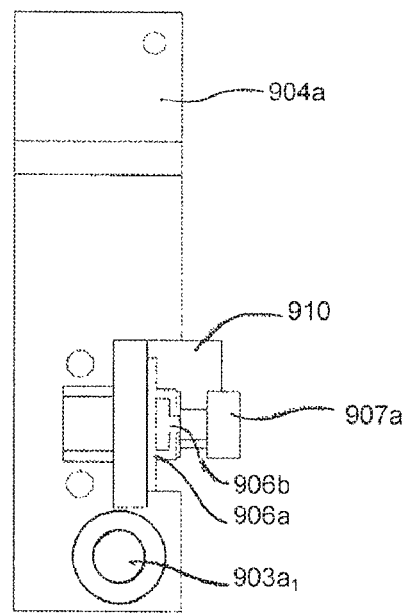
FIG. 31 illustrates a rear view of the cantilever brake arm, slider assembly and guide.

FIG. 30 illustrates a perspective view of a slider assembly 906*b*, guide 906*a* and brake arm 904*a* and FIG. 31 illustrates a front view of the slider assembly 906*b*, guide 906*a* and brake arm 904*a*. As shown in FIG. 31, the brake pad 907*a* is secured to the slider assembly 906*b* and the guide 906*a* is fastened to the brake arm 904*a*. The slider assembly 906*b* and brake pad 907*a* are slidably connected with the slider guide 906*a*. The guide 906*a* can have two stop members (906*a*1 and 906*a*2) that restrict the movement of an extension member 906*b*1 of the slider assembly 906*b* such that the slider assembly 906*b* may only slide back and forth along the direction 920 within a limited region of the guide 906*a*. With this limited movement region, the slider assembly 906*b* may not overly pull the brake cable 911*a* beyond a predetermined range of motion.

The guide 906*a* and slider assembly 906*b* can be made from metallic materials, which could provide low friction sliding surfaces. In an embodiment, the slider assembly 906*b* is made from brass or other alloy of copper, and the slider guide 906*a* is made from bronze or other alloy of copper. The guide 906*a* may be oil-impregnated such that the slider assembly 906*b* can be slid along the slider guide 906*a* with an even low friction. In other embodiments, the guide 906*a* and slider assembly 906*b* can be made from high strength lubricious plastic materials.

Figure 32:
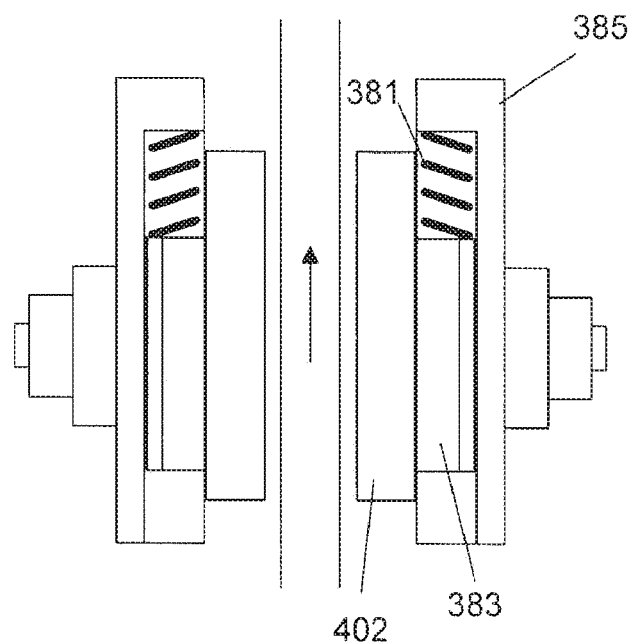
FIGS. 32-33 illustrate top views of a brake according to an embodiment of the invention.
Figure 33:
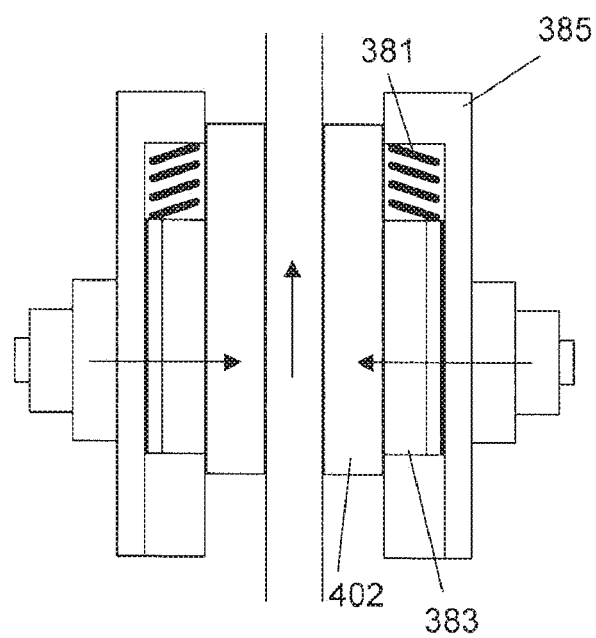

In other embodiments, various other functional mechanisms can be coupled to the inventive brake pad, slider and guide assemblies. With reference to FIGS. 32 and 33, an embodiment of the brake pad assembly includes springs 381 that resist the movement of the slider assemblies 383 in the guides 385 during braking. FIG. 32 illustrates the brake 380 in the open position with brake pads 402 pulled away from the rotating rim 411. FIG. 33 illustrates the brake 380 in the braking position with the brake pads 402 pressed against the rotating rim 411. The friction force of the brake pads 402 against the rim 411 causes the springs 381 to be compressed. The spring movement can prevent the brake 380 from locking up the rotating rim 411 if the rider actuates the brake 380 with too much force. The compression of the springs 381 can smooth the braking forces applied to the rim 411.

In still other embodiments, the inventive system can be used for other purposes. For example, with reference to FIGS. 34 and 35, the system can be a component of an electrical system. A piezoelectric mechanism 391 can be coupled to the slider assembly 393 and guide 395. The piezoelectric mechanism 391 can produce electricity when compressed. An LED 397 can be coupled to the piezoelectric mechanism 391 by electrical conductors 396 such as wires. In the open position illustrated in FIG. 34, the brake pads 402 are away from the rim 411 or disk and the piezoelectric mechanism 391 does not produce electricity and the LED 397 is not illuminated. With reference to FIG. 35, the slider assembly 393 compresses the piezoelectric mechanism 391 which generates electricity which can be coupled to the LED 397. The LEDs 397 may face towards the back of the bicycle so that when the bicycle brakes are applied, the illuminated red LEDs can indicate that the bicycle brakes are applied.

Figure 34:
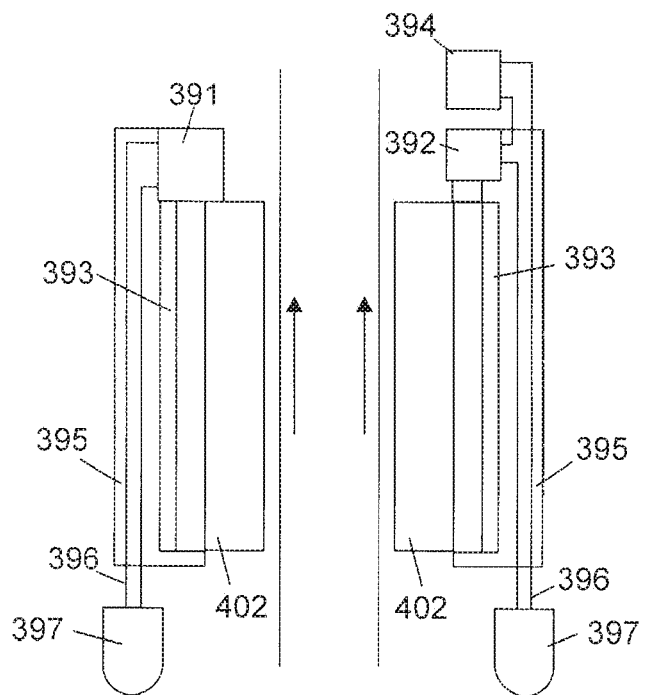
FIGS. 34-35 illustrate top views of a brake coupled to LEDs according to another embodiment of the invention.
Figure 35:
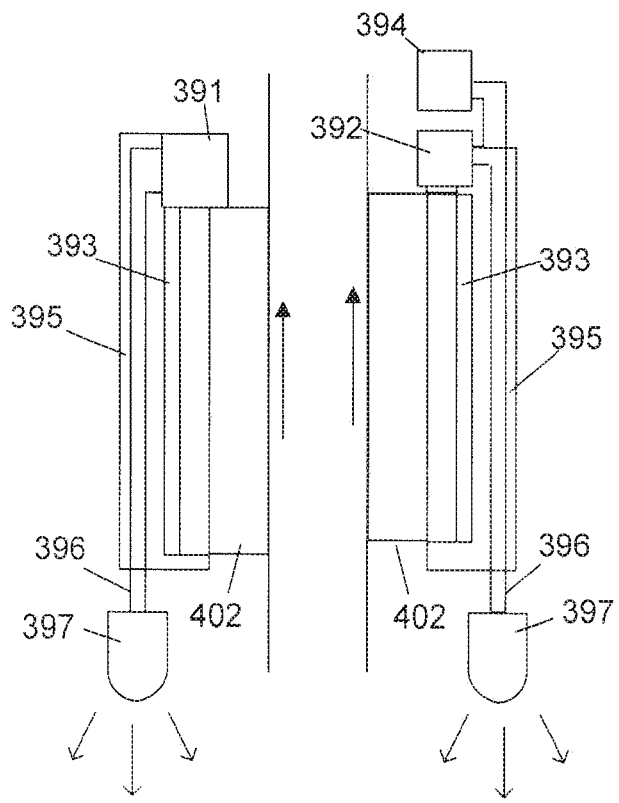

With reference to FIG. 34, in other embodiments, the slider 393 can be coupled to a switch 392 and a battery 394. When the brake is open, the switch 605 can be open and the battery 394 can be disconnected from the LED 397 which will not be illuminated. With reference to FIG. 35, when the brake is actuated, the braking can cause the brake pad 402 to close the switch 392 which can connect the battery 394 to the LED 397 which then produces light. In an embodiment, the LEDs 397 can be red in color and may be facing the back so they are visible to people behind the bicycle. The illuminated red LEDS can indicate that the bicycle is braking. In other embodiments, the LED can be white or any other color and can be pointed in any direction. The system can be used as a supplemental power source for the headlight. When the brakes are applied, the piezoelectric switch can increase the power output of a headlight. Thus, when riding normally, the lights can be lower and when the brakes are applied, the light power can be increased for higher visibility at a stop sign or during braking.

Figure 36:
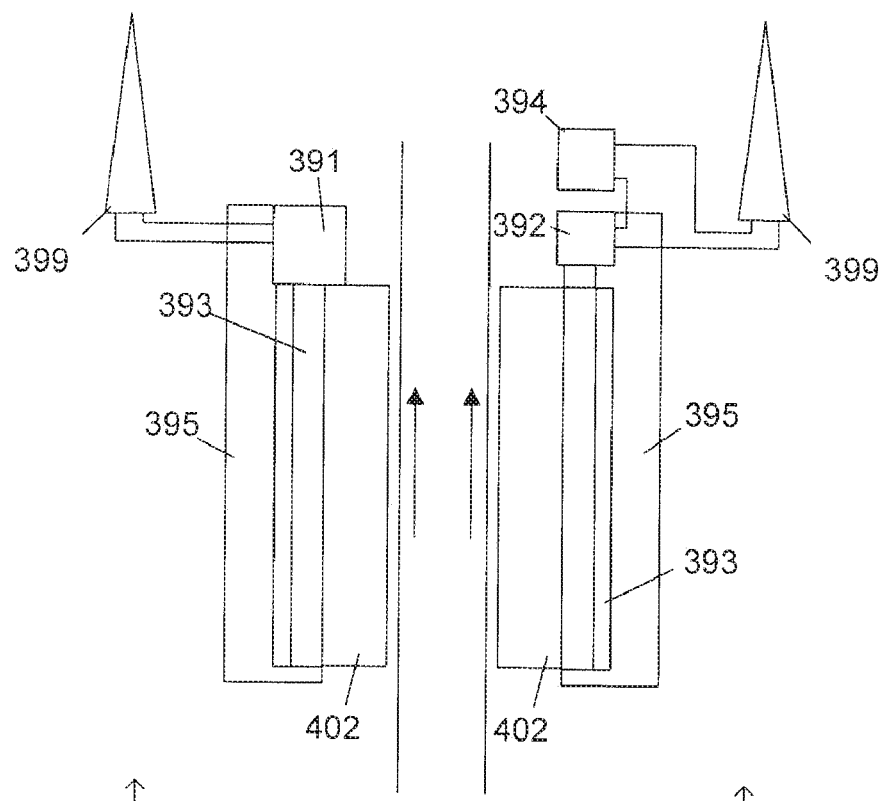
FIGS. 36-37 illustrate top views of a brake coupled to brake signal transmitters according to another embodiment of the invention.
Figure 37:
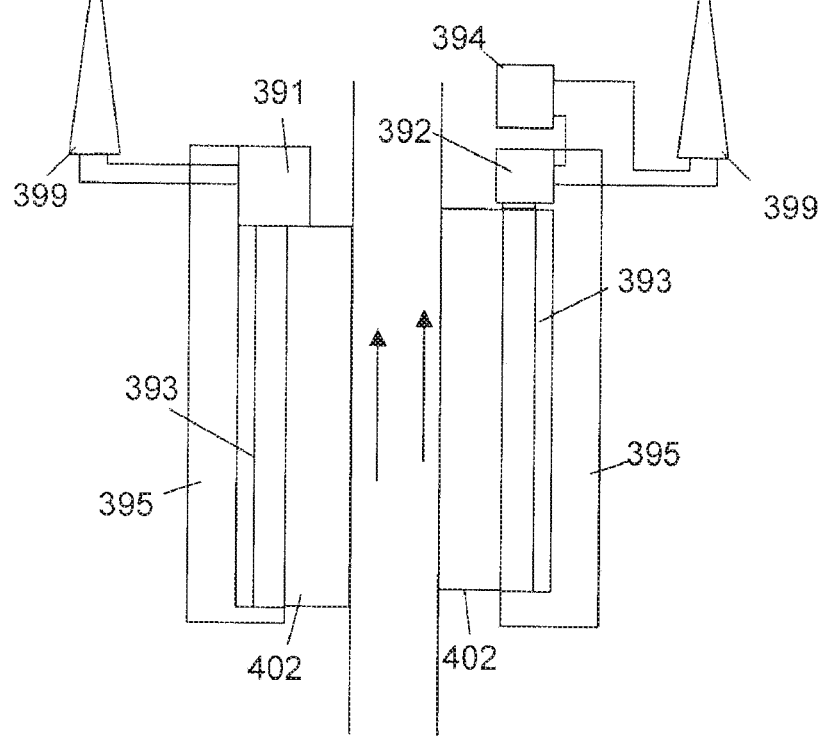
Figure 38:
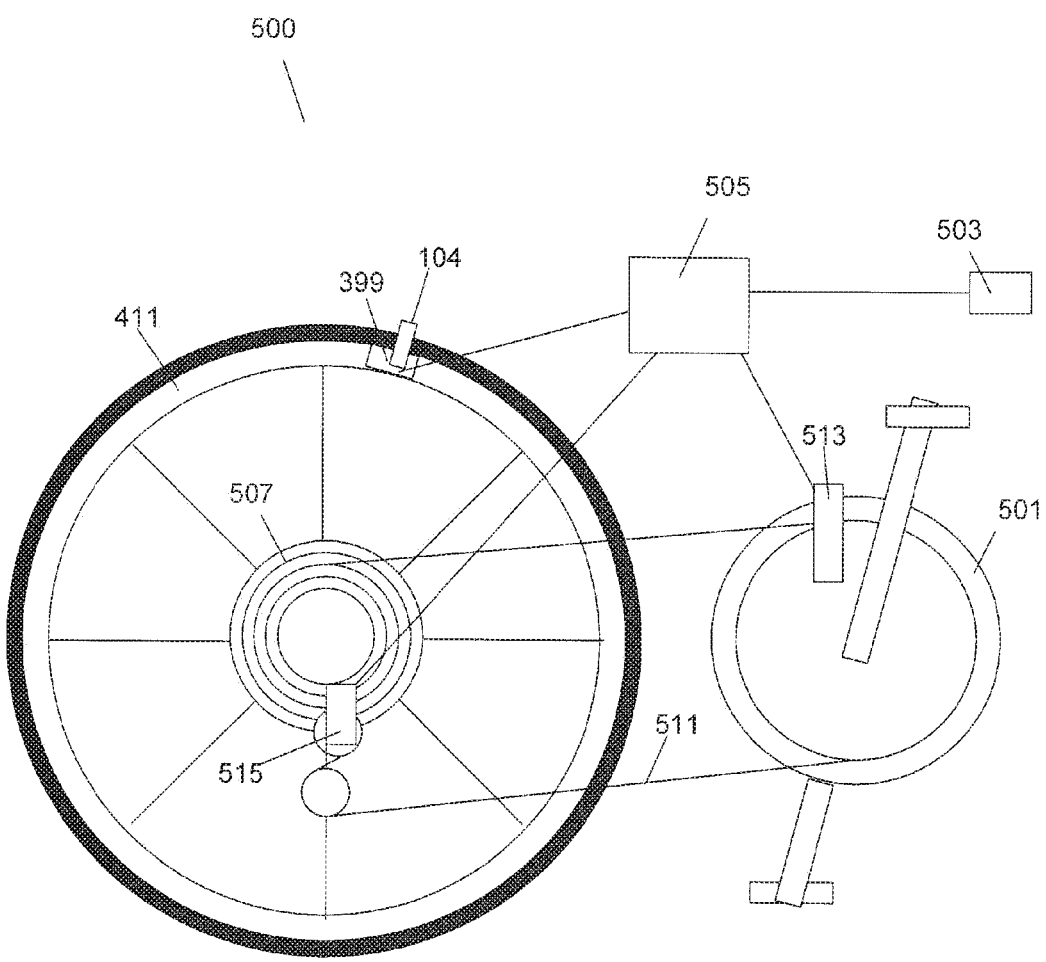
FIG. 38 illustrates a side view of a brake signal transmitter and an electronic shifting system.
Figure 39:
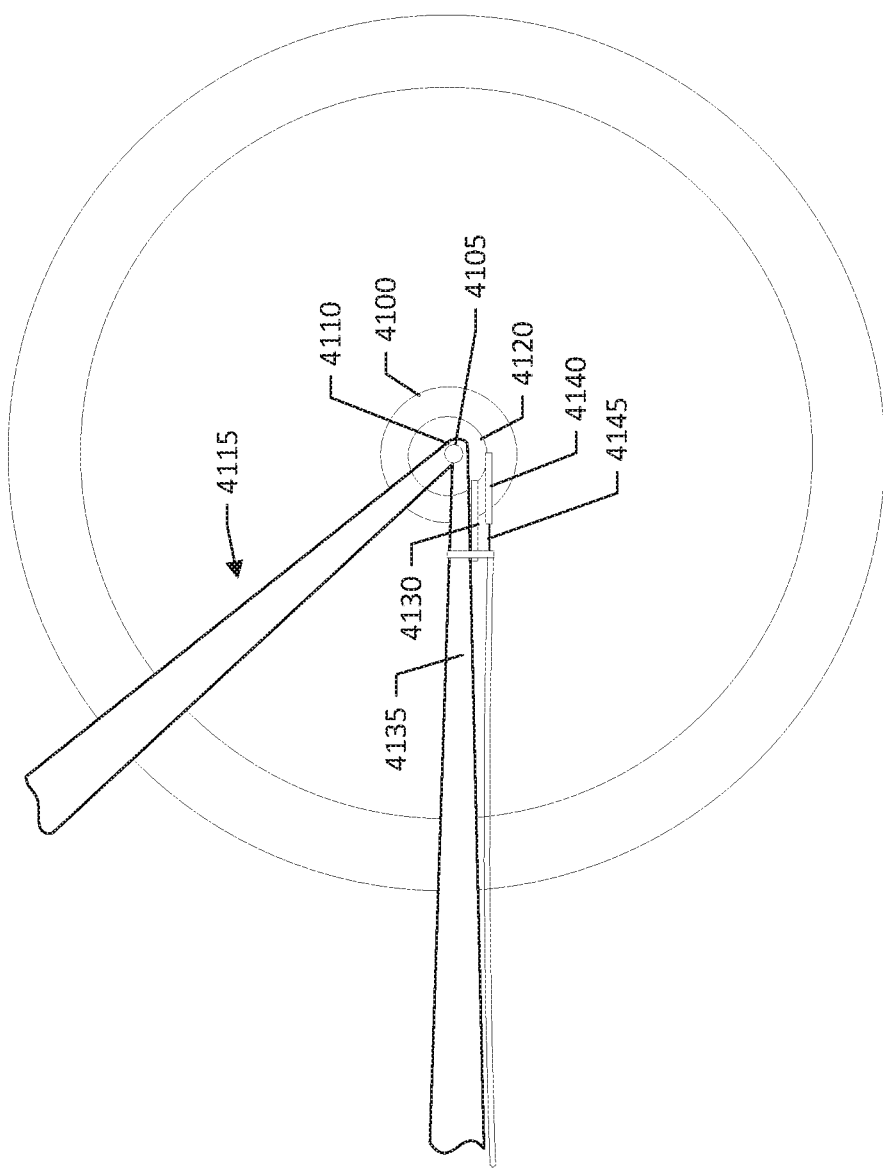
FIG. 39 illustrates a side view of a rear hub brake.

In an embodiment with reference to FIGS. 36 and 37, the inventive brake system can be coupled to a brake signal transmitter 399. The piezoelectric mechanism 391 can be coupled to a brake signal transmitter 399. With reference to FIG. 38, when the brake is open, the piezoelectric mechanism 391 does not produce electricity and the brake signal transmitter 399 may not transmit an output signal. With reference to FIG. 39, when the brakes are applied, the piezoelectric mechanism 391 can be compressed and emit an electrical signal which is used by the brake signal transmitter 399 to emit a brake signal.

In other embodiments, the brake signal transmitter 399 can be connected to an electrical switch 392, a power supply 394 and brake signal transmitter 399 which can be an RF transmitter or any other signal output device. With reference to FIG. 36, when the brake is open, the electrical switch 392 is disengaged and the electrical power is not transmitted from the power supply 394 which can be a battery to the brake signal transmitter 399. With reference to FIG. 37, when the brakes are actuated, the brake pad 402 can actuate the switch 392 causing electrical power to be transmitted from the power supply 394 to the brake signal transmitter 399.

In other embodiments, the brake signal can be coupled to an electronic gear shifting system. With reference to FIG. 38, a bicycle gearing system 500 is illustrated. Bicycles typically include multiple gears that control the ratio of pedal rotation of a crank 501 to rear wheel 411 rotation. Lower gears provide lower rotation of the rear wheel 411 per each crank 501 rotation and higher gears provide a higher rotation of the rear wheel 411 per crank 501 rotation. The number of gears available is typically the number of gears on a rear cluster 507 that is coupled to the rear wheel 411 times the number of gears 509 on a front crank 501. For example, in the illustrated embodiment, the rear cluster 507 can have 5-11 gears and the front crank 501 can have 2 or 3 gears. A bicycle having a 5 gear rear cluster 507 and a three gear crank 501 will have a total of 15 gears. A chain 511 can run over any combination of the front and rear gears to provide different gearing to the bike. By changing the position of the chain 511 on the rear cluster 507 and the crank 501, the rider can change the rotational ratio of the cranks and the rear wheel. In an embodiment, the rider can select a gear through a shift controller 503 and the electronic system 505 will shift the chain 511 to the selected gears by adjusting a front derailleur 513 and a rear derailleur 515. However, in order to properly shift gears, the rider must be pedaling since shifting of the chain 511 cannot occur when the crank 501 is not rotating.

The rider is typically not pedaling when the brakes 104 are applied. The brake can be coupled to a brake signal transmitter 399 which can transmit a brake signal to the electronic system 505 when the brakes are applied. The brake actuation signal can indicate that the crank 501 is not rotating and the electronic system 505 should not attempt to shift the gears by controlling the front derailleur 513 or the rear derailleur 515. In an embodiment, the electronic system 505 can delay the shift until the brakes have been released and the brake signal transmitter 399 does not emit the brake signal.

In other embodiments, the inventive braking system 500 can be used with an electronic gear shifting system that can be configured to adjust the gearing ratio lower for hills and slower riding speeds and increase gearing ratio for descents and faster riding speeds. The application of the brakes can be used as a gear shift signal to automatically make adjustments to the gear ratio. For example, when a rider is braking on a flat section and the rider applies the brakes, this braking is usually in response to a stop sign or light. If the rider slows his or her speed significantly, the electronic shifting system can adjust the gearing to be lowered so that the rider will be able to pedal the bicycle from a stopped position. It can be very difficult to start moving a bicycle that is in a high gear when the bicycle is stationary.

In an embodiment, it may be possible to shift gears based upon the actuation and duration of the braking. If the brakes are applied the system may downshift and the number of gears shifted may be proportional to the force and duration of the braking. A long and hard braking can cause the gears to shift to a lower gear so that the rider can be in a low gear when pedaling resumes. Thus, a short and light brake actuation may result in a single lower gear shift. In contrast, a longer and harder brake actuation may result in a multiple gear shift to a significantly lower gear. In an embodiment, it may be possible to transmit signals to the shift mechanism through the brake levers. For example, the decrease in the gear shift can be indicated by the number of brake taps, two taps of the brake lever can result in downshifting by two gears. Similarly, five taps of the brake lever can result in a five gear downshift.

After the inventive brake pad assemblies have been used for a significant period of time, the brake pads will need to be replaced. In an embodiment, the present invention can be directed towards the repair kit for the brake pad assembly 403 illustrated in FIGS. 10-14. If the only worn component is the brake pad 402, a basic repair kit may only include the brake pad 402. The user can remove the worn brake pad 402 from the slider assembly 403 and attach the new brake pad 402 to the slider assembly 403. In some embodiments, a fastener such as a screw may be used to secure the brake pad 402 to the slider assembly 403.

In other embodiments, the brake pad 402 may be integrated into the slider assembly 403 and when the brake pad 402 needs to be replaced, the slider assembly 403 may also be replaced. In this embodiment, the repair kit may include the slider assembly 403 that includes the brake pad 402. If the actuation of the brake pad assembly 403 has worn the sliding portions of the guide 407 (illustrated in FIGS. 15-19), a repair kit can include both the slider assembly 403 and the guide 407. It is also possible that the lubricious material may need to be replaced periodically. The brake pad assembly may include some spare sliding surface materials which can be used as replacement parts.

FIGS. 39-52 show various specific embodiments of a hub and disk brake system and apparatus. The inventive brake system and apparatus are related to an anti-locking system for bicycles and other wheeled vehicles such as motorcycles. In an embodiment, the brake system includes a rear wheel hub type brake. With reference to FIG. 39, a rear hub brake 4100 is illustrated that can include an axle 4105 that extends through the rear brake hub and secures the rear hub to the rear drop outs 4110 of the bicycle frame 4115, a hub brake mechanism 4120 that is at the center of the rear wheel that rotates around the rear axle, a brake arm 4130 on the left side of the hub brake that does not rotate and is coupled to the left chain stay 4135 of the bike frame and a brake actuator 4140 which is coupled to a rear brake cable 4145. When the rear brake cable is tensioned, the actuator is pulled forward and the hub brake is actuated.

As discussed in copending patent applications assigned to the applicant, the basic principle of the anti-locking brake system is that the user only actuates the rear brake and a front brake actuator is coupled directly between the rear brake and the front brake. Thus, the user does not have the ability to independently actuate the front brake. When the rear brake is actuated, the friction force between the rear tire and the ground actuates the front brake actuator which causes the front brake to stop or slow the front wheel.

With reference to FIG. 40 a side view of a rear hub brake 4200 used with the inventive system is illustrated. The rear brake cable 4205 and rear brake cable housing 4210 are coupled to a rear brake actuator 4215 such that when the rear brake cable is tensioned, the rear brake is actuated. However in this embodiment, the rear hub lever is connected to the front brake cable 4220 having front brake cable housing 4221 but is not connected to the left rear chain stay 4225. Thus, the friction force of the rear brake causes the rear brake hub to rotate counter clockwise and the movement of the rear brake lever tensions the front brake cable. If the rear tire skids, tension on the front brake cable will be reduced which will release the tension on the front brake cable preventing the front brake from locking.

In the embodiment illustrated in FIGS. 40 and 41, the rear brake cable extends through a noodle 4230 that is attached to the bottom of the bottom bracket 4235. The noodle is attached to a load bearing strap 4240 which is secured around the down tube 4245 so that tension on the front brake cable will not cause the noodle to move relative the frame and bottom bracket. The noodle may also be attached to the left chain stay so that the back portion of the noodle is held in alignment with the rear brake lever and away from the rear tire and wheel. There can be an alignment strap 4242 to facilitate the alignment with the rear brake lever.

Figure 42:
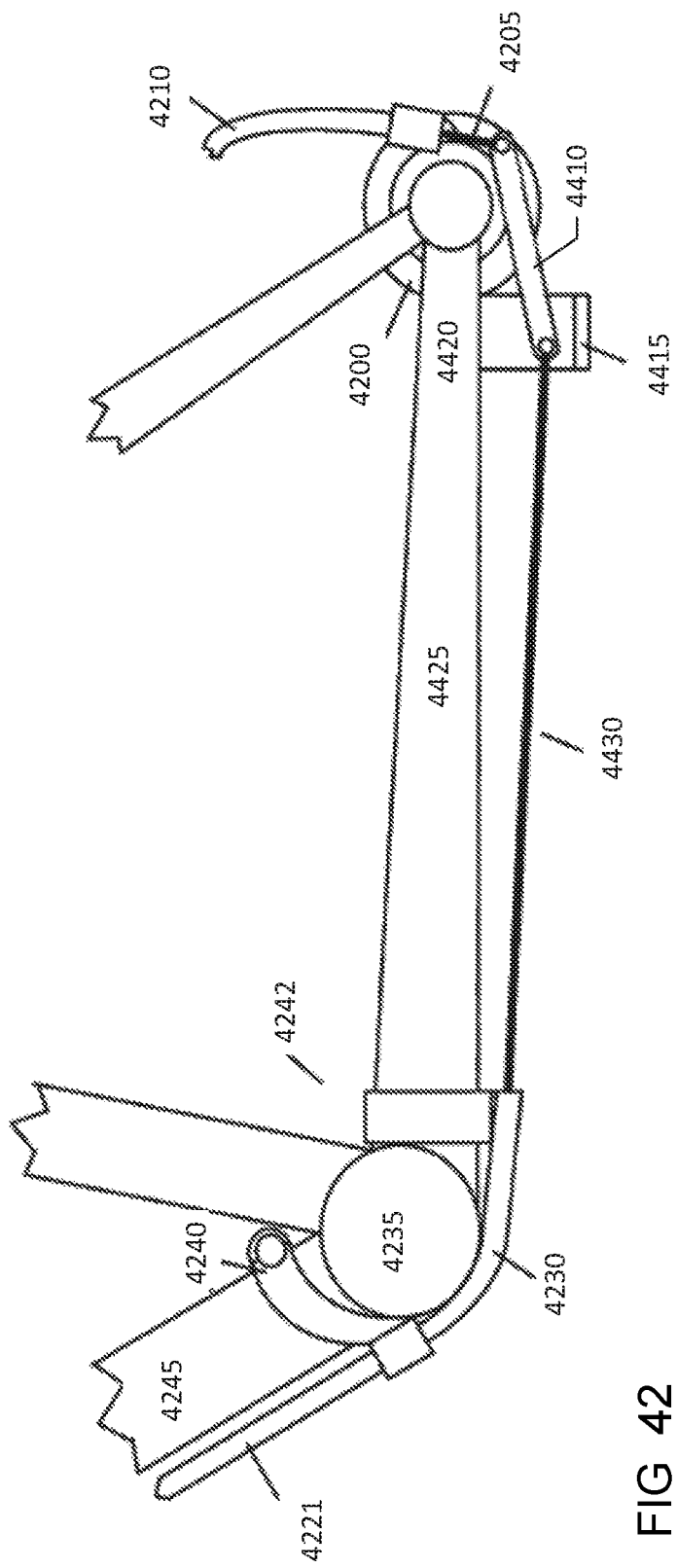
FIG. 42 illustrates a side view of a rear hub brake used with another embodiment of the inventive braking system.

In another embodiment shown in FIG. 42, the rear brake lever 4410 will rotate within a limited range. If the rear brake lever rotates too far, it will hit a stop 4415 that will prevent further rotation. The stop can be a structure coupled to the rear portion 4420 of the left chain stay 4425. If the front brake cable 4430 breaks, the rear hub may continue to rotate counter clockwise and the rear brake may no longer function. Thus, the stop prevents the failure of both the front and rear brakes in the event that the front brake cable breaks or becomes disconnected from the front brake.

Figure 43:
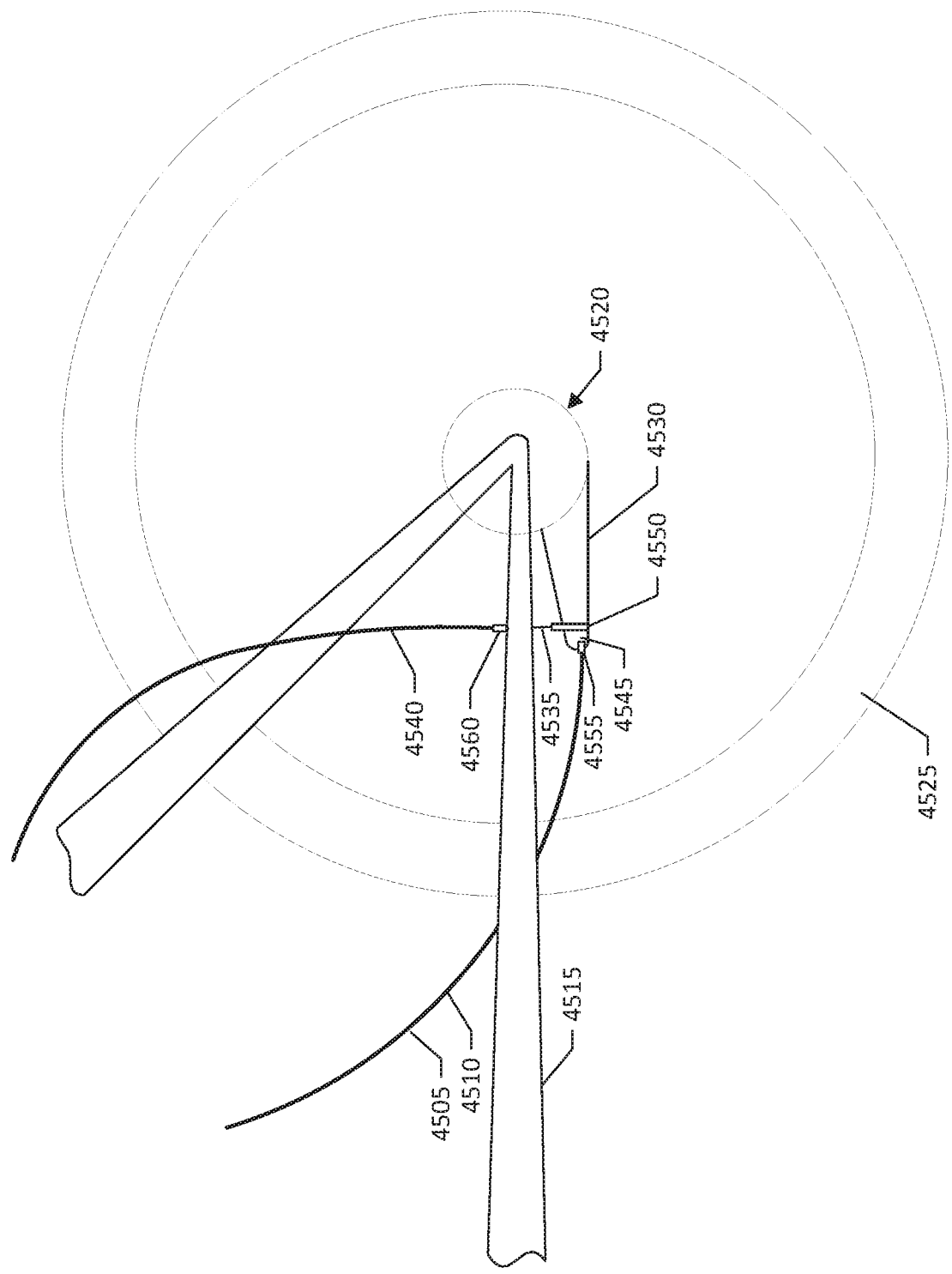
FIG. 43 illustrates a side view of a rear hub brake used with another embodiment of the inventive braking system.

FIG. 43 illustrates another embodiment of the rear hub brake system. The rear brake cable 4505 and housing 4510 extend under the left rear chain stay 4515 and actuates the rear hub brake 4520. When the rear brake is actuated the friction of the rear tire 4525 against the ground causes the rear hub brake lever 4530 to rotate counter clockwise. The front brake cable 4535 is coupled to the hub brake lever and the front brake housing 4540 is coupled to the left chain stay. The front brake cable and front brake cable housing may be approximately perpendicular to the chain stay. The movement of the hub lever tensions the front brake cable and compresses the front brake cable housing which actuates the front brake 4605 shown in FIG. 44.

In the hub brake embodiment, the rear hub lever must rotate within a limited range. This component may normally be rigidly coupled to the rear dropouts of the frame. The rear hub may need to be modified with a thrust bearings or bushings that allow for low friction rotation between the dropouts and the hub brake.

In a specific embodiment, there is a lever or rear hub brake lever. The lever is connected to the rear hub brake. There is a first cable clamp 4545 on or at an end the lever that secures an end of the rear brake cable. An opposite end of the rear brake cable is connected to a rear brake lever. This specific embodiment further includes a second cable clamp 4550 on the lever. The second cable clamp secures an end of the front brake cable. An opposite end of the front brake cable is connected to a front brake. When the rear hub brake is actuated by the rear brake lever, the lever rotates to pull the front brake cable, thereby actuating the front brake.

There can be a first cable stop 4555 on the lever. The first cable stop may include a socket, and an opening. The socket receives an end of a rear brake cable housing for the rear brake cable, and the rear brake cable passes through the opening to the first cable clamp.

There can be a second cable stop 4560 connected to the left chain stay of the bicycle having the rear hub brake. The second cable stop includes a socket, and an opening. The socket receives an end of a front brake cable housing, and the front brake cable passes through the opening to the second cable clamp.

The lever may be permitted to rotate about the rear hub brake to actuate the front brake. The lever may be permitted to rotate within a limited range to actuate the front brake. The lever may rotate in a counter clockwise direction to pull the front brake cable. The front brake may include a disc brake.

Figure 45:
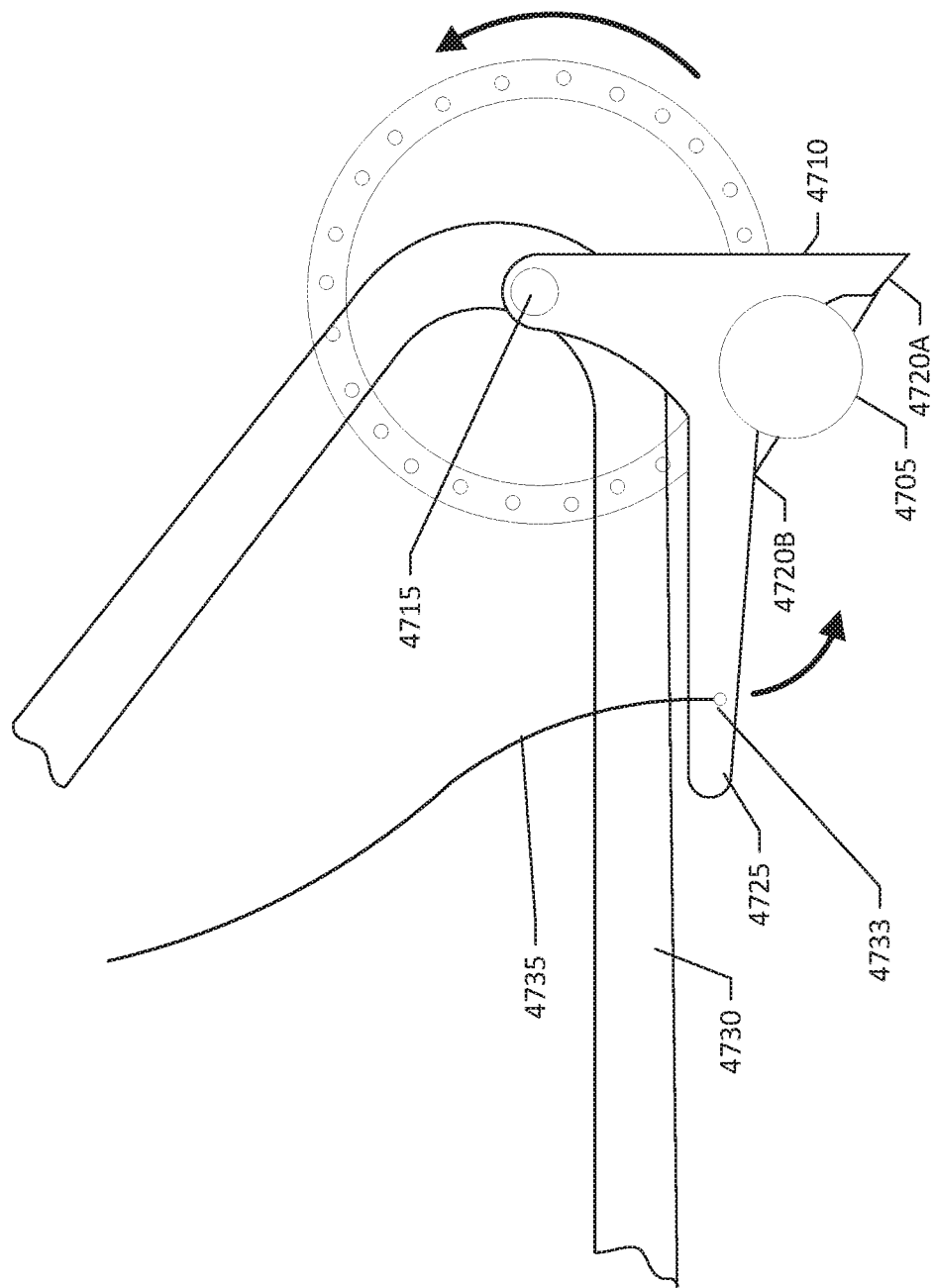
FIG. 45 illustrates a side view of a rear hub disc brake used with another embodiment of the inventive braking system.
Figure 46:
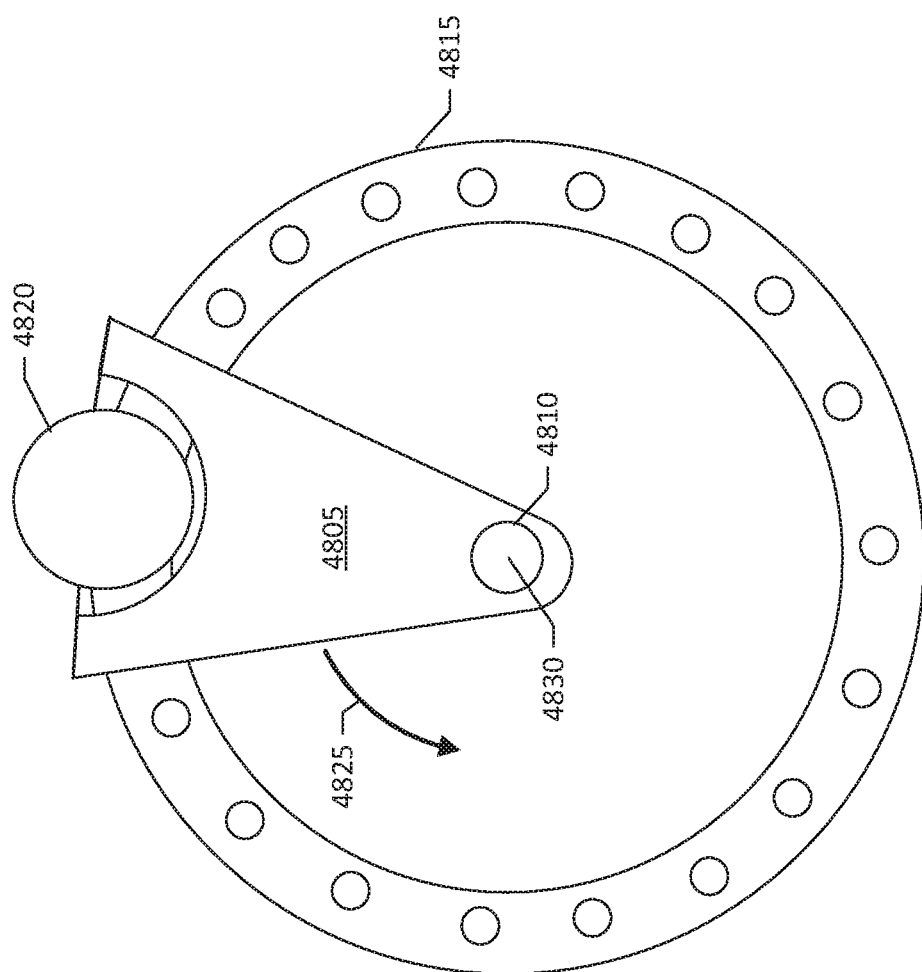
FIG. 46 illustrates a side view of a rear hub disc brake used with another embodiment of the inventive braking system.

In other embodiments, a similar anti-locking braking system can be used in a disk brake configuration. With reference to FIG. 45, a rear portion of a bike is illustrated with a rear disk brake 4705. The rear disk brake is mounted on a rear brake structure 4710 that rotates about a pivot point 4715 around the rear hub so that any counter clockwise rotation will keep the brake in proper alignment with the rear disk. The rear brake structure can include threaded mounting holes 4720A and 4720B for the rear disk brake and a lever arm 4725 that can extend under the left rear chain stay 4730. FIG. 46 illustrates a more detailed view an embodiment of the rear brake structure 4805, rear hub 4810, rotor 4815, and rear disk brake 4820. The front brake cable can be coupled to the lever arm and the front brake housing can be coupled to the chain stay or other portion of the frame. When the brakes are not actuated the lever arm can be close to the rear chain stay and the front brake cable is not tensioned. When the rear brake is actuated, the rear brake structure will rotate counter clockwise 4825 relative to the frame about a pivot point 4830 and the lever arm will move away from the chain stay. This rotation of the lever will tension the front brake cable and compress the front brake cable housing. The front brake tension will actuate the front brake. If the rear wheel loses contact with the ground, the rear brake structure will be able to rotate clockwise and the front cable tension will be relieved which will prevent the front brake from locking the front wheel.

In a specific embodiment, a braking device includes a pivot point, a brake mount to attach a rear disc brake, and a lever arm extending away from the pivot point. The lever arm includes a cable clamp 4733. The cable clamp secures an end of a front brake cable 4735. An opposite end of the front brake cable is connected to a front brake. When the rear disc brake is actuated, the lever arm rotates about the pivot point to pull the front brake cable, thereby actuating the front brake. There can be a cable stop connected to a left chain stay of a bicycle. The cable stop may include a socket, and an opening. The socket receives an end of a front brake cable housing, and the front brake cable passes through the opening to the cable clamp.

When the rear disc brake is actuated, the rear disc brake rotates about the pivot point. In a specific embodiment, the pivot point is in-line or concentric with a center axis of a rear hub. In another specific embodiment, as shown for example in FIG. 47A and discussed below, the pivot point is away or offset from a center axis of a rear hub. The rear disc brake may include a hydraulic disc brake. Alternatively, the rear disc brake may include a cable-actuated disc brake.

Figure 47A:
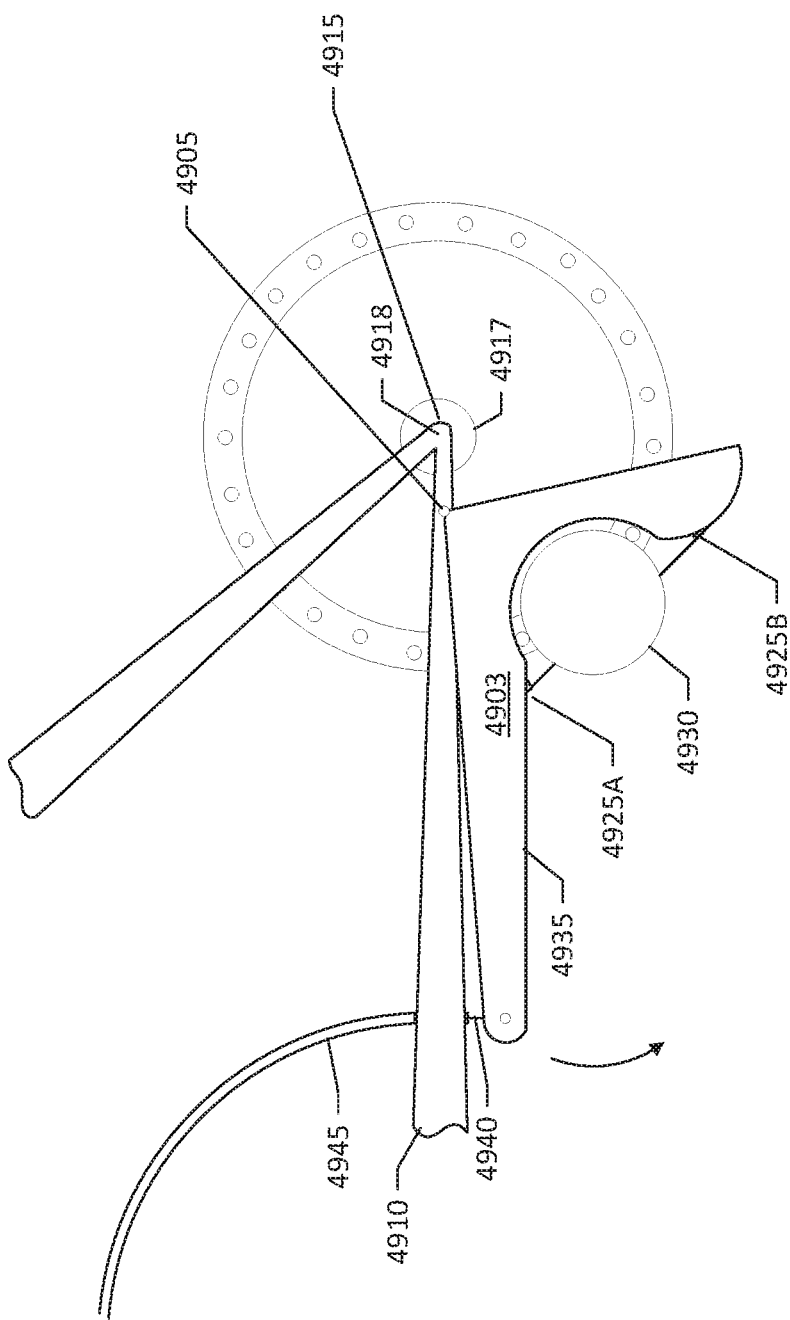
FIG. 47A illustrates a side view of a rear hub disc brake used with another embodiment of the inventive braking system.

FIG. 47A illustrates another embodiment of the rear disk brake system. In this embodiment, the rear brake structure 4903 is coupled to a pivot point 4905 on the left chain stay 4910 which is away from the center axis 4915 of the rear hub 4917 and may be a less complicated rotational bearing. The pivot point may be brazed or welded-on. The rear hub is secured in the frame dropouts 4918 which may be horizontal dropouts or vertical dropouts. The rear brake structure 4903 can include threaded mounting holes 4925A and 4925B for the rear disc brake 4930 and a lever arm 4935 that can extend under the left rear chain stay. An adjustable mechanical advantage can be provided based on, for example, a length of the lever arm. The rear disc brake may be a conventional hydraulic or mechanical disc brake. The front brake mechanism and front brake actuation can be substantially the same as described above with reference to FIG. 45.

The rear brake can be actuated by either cable tension, hydraulic fluid pressure or any other suitable actuation means. Friction between the ground and the rear wheel can tension the front brake cable 4940 and compress the front brake cable housing 4945 which can actuate the front brake. However, it is also possible for the rear brake structures to be coupled to a hydraulic cylinder so that counter clockwise movement of the rear wheel from the friction between the ground and the rear wheel can increase the front brake hydraulic brake pressure to actuate the front brake as illustrated in FIGS. 23 and 24 of International Application Publication No. WO2011075502 which is hereby incorporated by reference.

Figure 44:
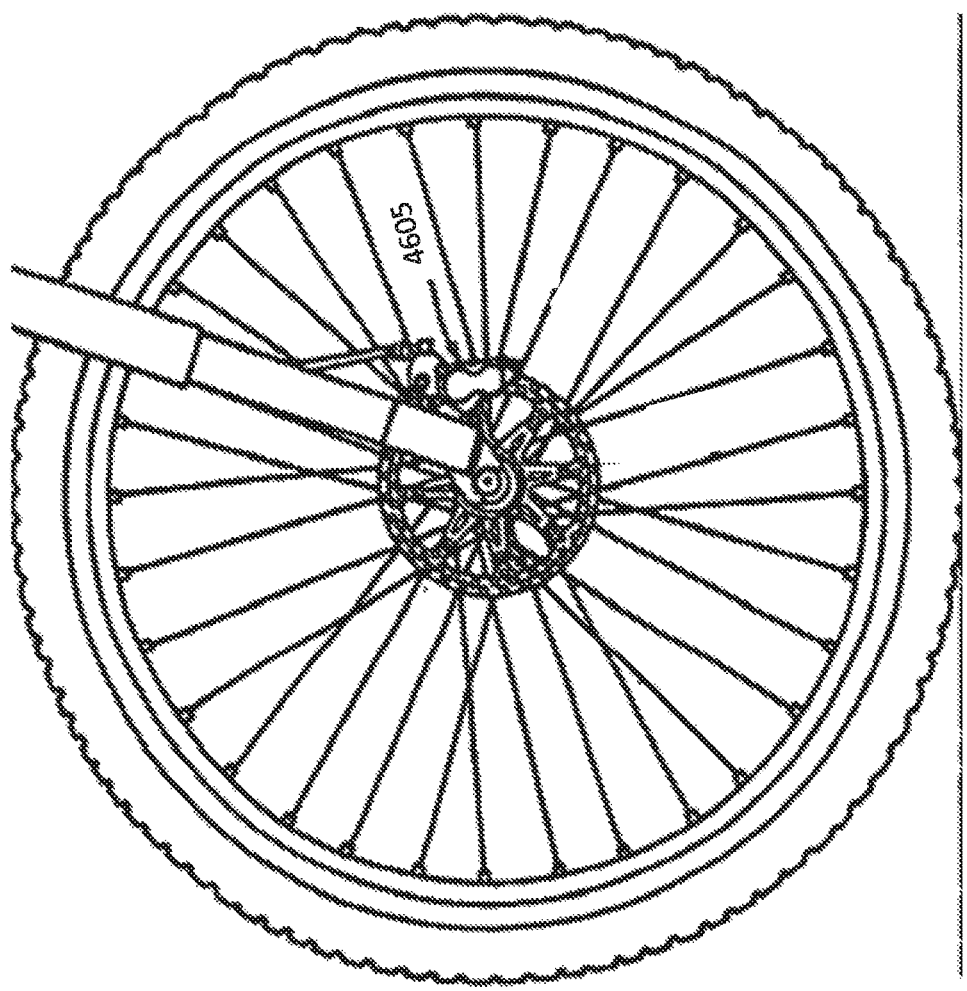
FIG. 44 illustrates a side view of front disc brake being actuated in an embodiment of the inventive braking system.

Although the front brake is only illustrated in FIG. 44 as a disk brake, it can be any type of cable actuated brake including: hub, cantilever, caliper, disk, or any other brake that is actuated by the tensioning of a front brake cable and the compression of the front brake cable housing.

Figure 47B:
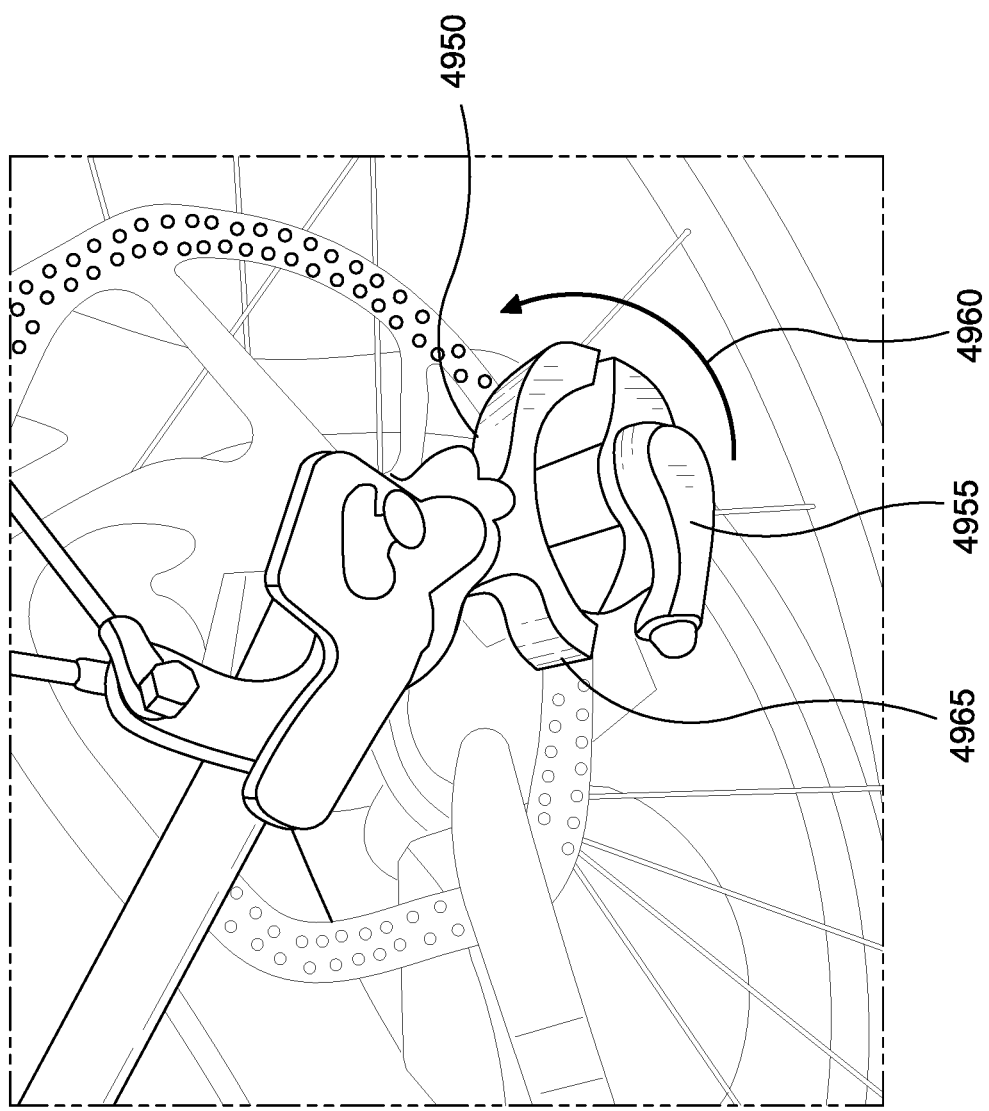
FIG. 47B illustrates a side view of a rear hub disc brake used with another embodiment of the inventive braking system.

FIG. 47B illustrates another embodiment of the rear disk brake system. In this embodiment, a rear brake structure 4950 is connected to a center axis of the rear hub. A disc brake caliper 4955 is mounted to the rear brake structure. The rear brake structure is permitted to rotate about the center axis. For example, when the rear brake is actuated to reduce the bicycle's speed, the rear disc caliper will rotate (along with the rear brake structure) in a counter clockwise direction as shown by an arrow 4960. An end of a front brake cable may be connected to a portion 4965 of the rear brake structure to actuate the front brake.

Figure 48B:
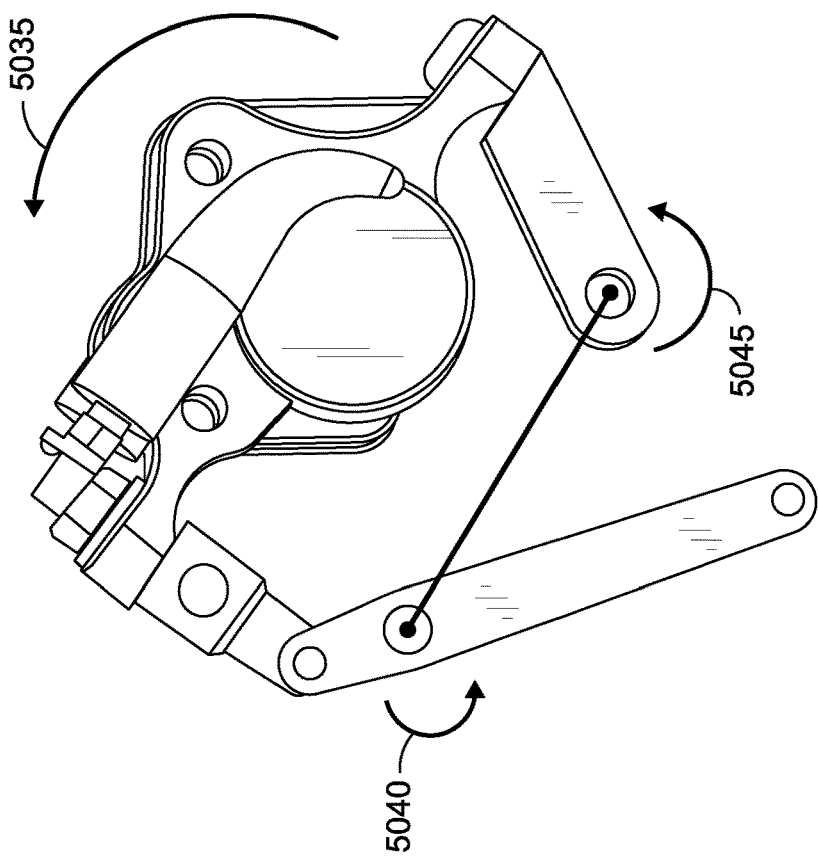
FIG. 48B shows a side view of the rear disc brake caliper of FIG. 48A in a second position of the sequence.
Figure 48A:
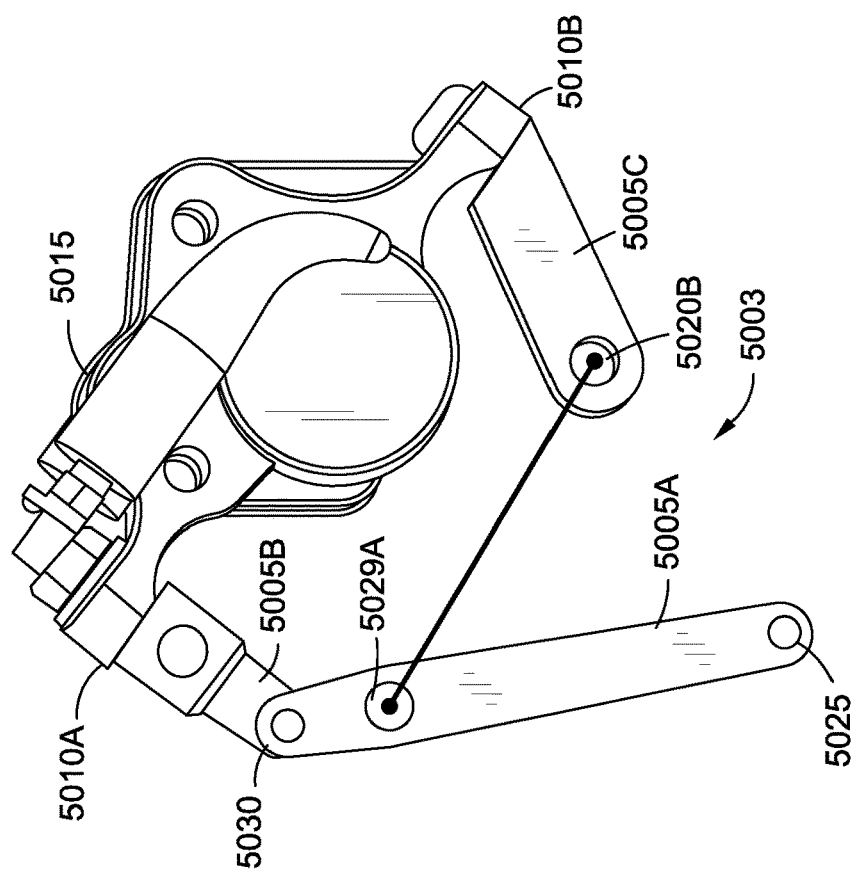
FIG. 48A shows a side view of a rear disc brake caliper in a first position of a sequence in an embodiment of the inventive braking system.
Figure 48C:
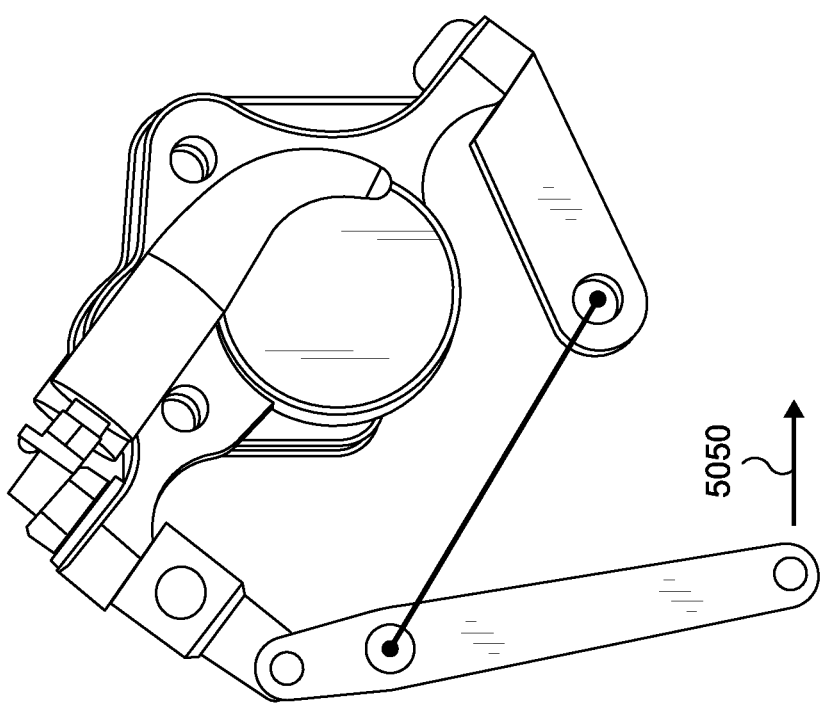
FIG. 48C shows a side view of the rear disc brake caliper of FIG. 48A in a third position of the sequence.

FIGS. 48A-48C show a sequence of side views of a rear disc braking system having a mechanical linkage 5003 in another specific embodiment. The mechanical linkage includes an assembly of bodies connected to manage forces and movement. In a specific embodiment, these forces and movements are from the actuation of the rear brake and result in the actuation of the front brake.

More particularly, FIG. 48A shows the linkage in a first position. FIG. 48B shows the linkage in a second position. FIG. 48C shows the linkage in a third position. As shown in FIG. 48C, in this specific embodiment, the linkage includes first, second, and third links 5005A, 5005B, and 5005C. The second and third links include disc brake mounts 5010A and 5010B upon which a disc brake 5015 can be attached. The first and third links include joints 5020A and 5020B, respectively, which may be used to secure the linkage to the bicycle frame. An end 5025 of the first link may be connected to an end of a front brake cable. An opposite end 5030 of the first link is connected an end of the second link.

In a specific embodiment, the actuation of the rear brake causes the disc caliper to move in a counter clockwise direction as indicated by an arrow 5035 (FIG. 48B). In particular, the first link rotates 5040 about joint 5020A and the third link rotates 5045 about joint 5020B. As shown in FIG. 48C, end 5025 of the first link then moves in a direction 5050 which actuates the front brake such as by pulling the front brake cable connected to end 5025.

In a specific embodiment, a device includes a first link of a linkage and including a first joint, a second joint, and a front brake cable attachment end. The second joint connects to a first tab on a bicycle frame and is between the first joint and the front brake cable attachment end. There is a second link of the linkage connected to the first joint and including a first mount, opposite the first joint, for a disc brake. There is a third link of the linkage and including a fourth joint and a second mount, opposite the fourth joint, for the disc brake. The fourth joint connects to a second tab on the bicycle frame.

Figure 49A:
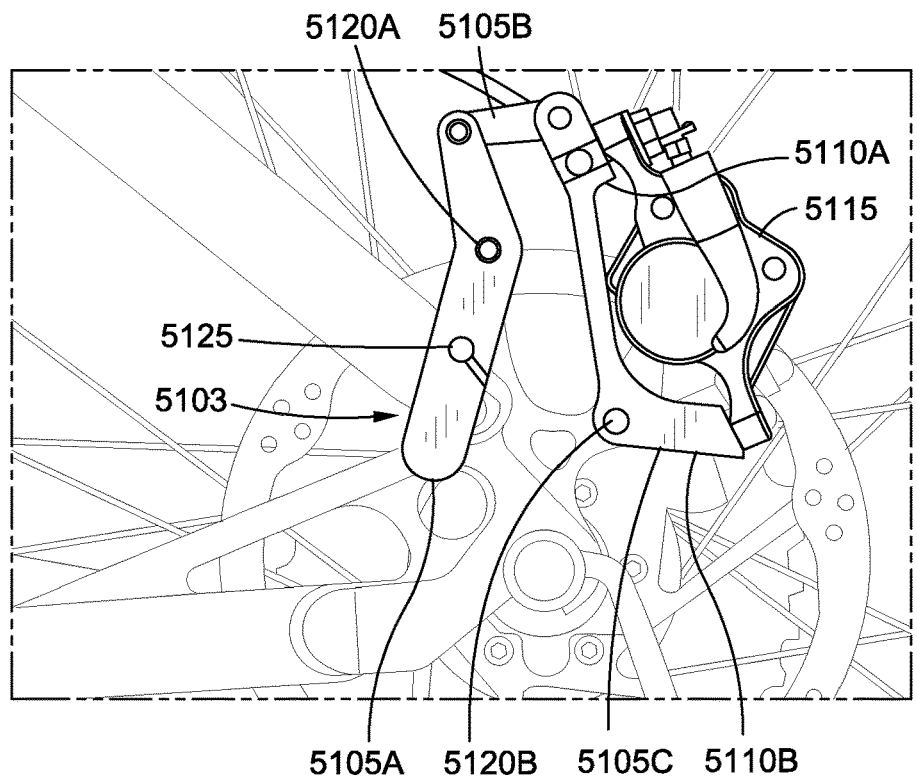
FIG. 49A shows a side view of a rear disc brake caliper in a first position of a sequence in another specific embodiment of the inventive braking system.
Figure 49B:
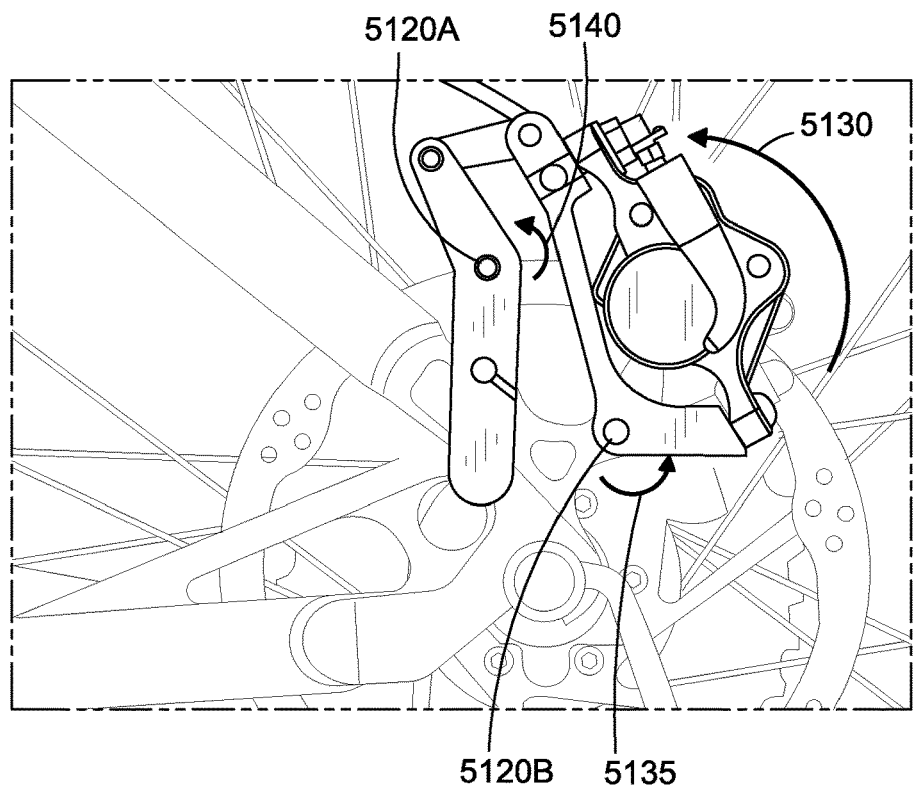
FIG. 49B shows a side view of the rear disc brake caliper of FIG. 49A in a second position of the sequence.
Figure 49C:
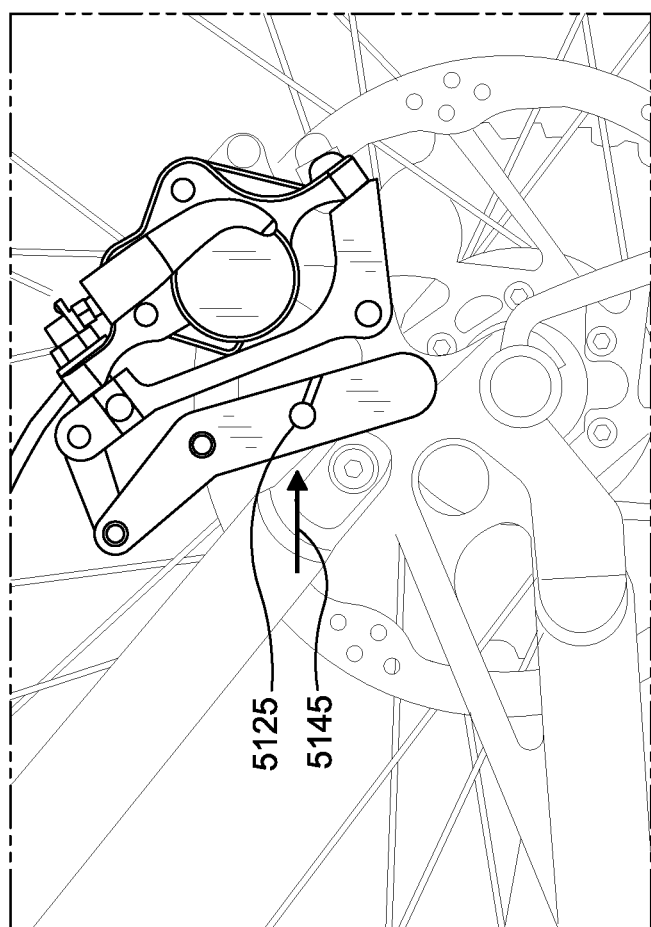
FIG. 49C shows a side view of the rear disc brake caliper of FIG. 49A in a third position of the sequence.

FIGS. 49A-49C show a sequence of side views of a rear disc braking system having a mechanical linkage 5103 in another specific embodiment. FIG. 49A shows the linkage in a first position. FIG. 49B shows the linkage in a second position. FIG. 49C shows the linkage in a third position. As shown in FIG. 49A, in this specific embodiment, the linkage includes a first link 5105A, a second link 5105B, and a third link 5105C. The second link is connected between the first and third links. The third link includes disc mounts 5110A and 5110B for attaching a disc brake 5115. A joint 5120A on the first link is connects the linkage to a first disc tab on the bicycle frame. A joint 5120B on the third link connects the linkage to a second disc tab on the frame. An end of a front brake cable may be connected at a point 5125 on the first link.

In a specific embodiment, the actuation of the rear brake causes the disc caliper to move in a counter clockwise direction as indicated by an arrow 5130 (FIG. 49B). In particular, the third link rotates 5135 (FIG. 49B) about joint 5120B and the first link rotates 5140 about joint 5120A. As shown in FIG. 49C, point 5125 on the first link at which the end of a front brake cable may be secured moves in a direction 5145 to actuate the front brake such as by pulling the connected front brake cable.

In a specific embodiment, a device includes a first link of a linkage and including a first joint, a second joint, and a front brake cable attachment point. The second joint is between the first joint and the front brake cable attachment end, and connects to a first tab on a bicycle frame. There is a second link of the linkage connected to the first joint. There is a third link of the linkage and including a third joint, a fourth joint, and a set of disc mounts for mounting a disc brake. The third joint is connected to the second link, and the fourth joint connects to a second tab on the bicycle frame.

Figure 50B:
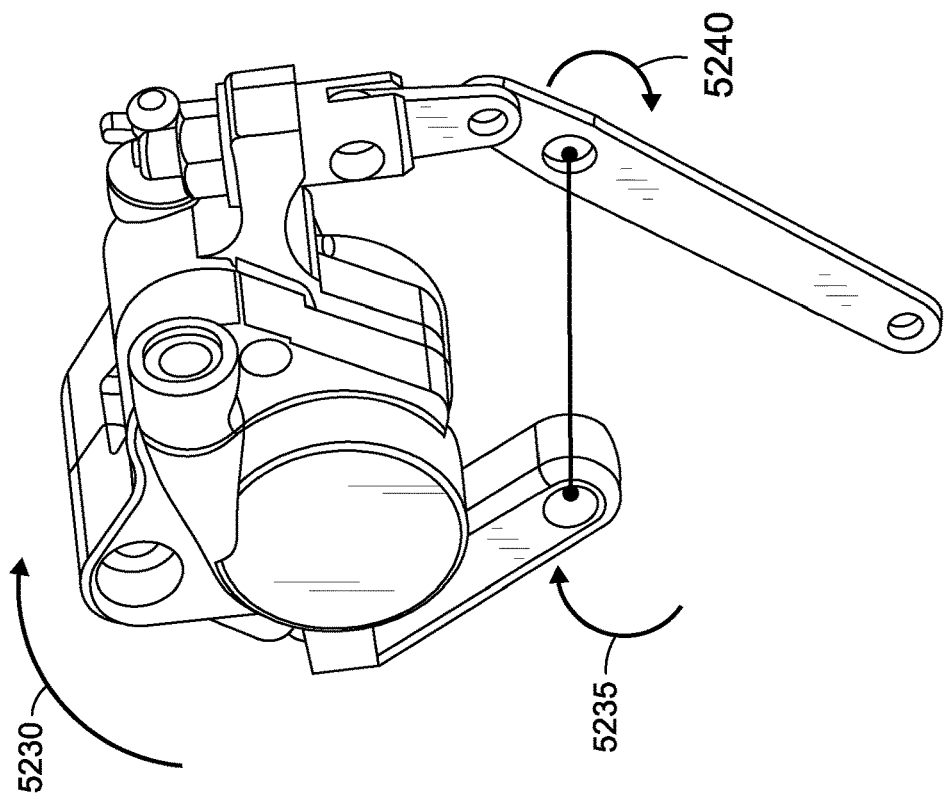
FIG. 50B shows a side view of the rear disc brake caliper of FIG. 50A in a second position of the sequence.
Figure 50A:
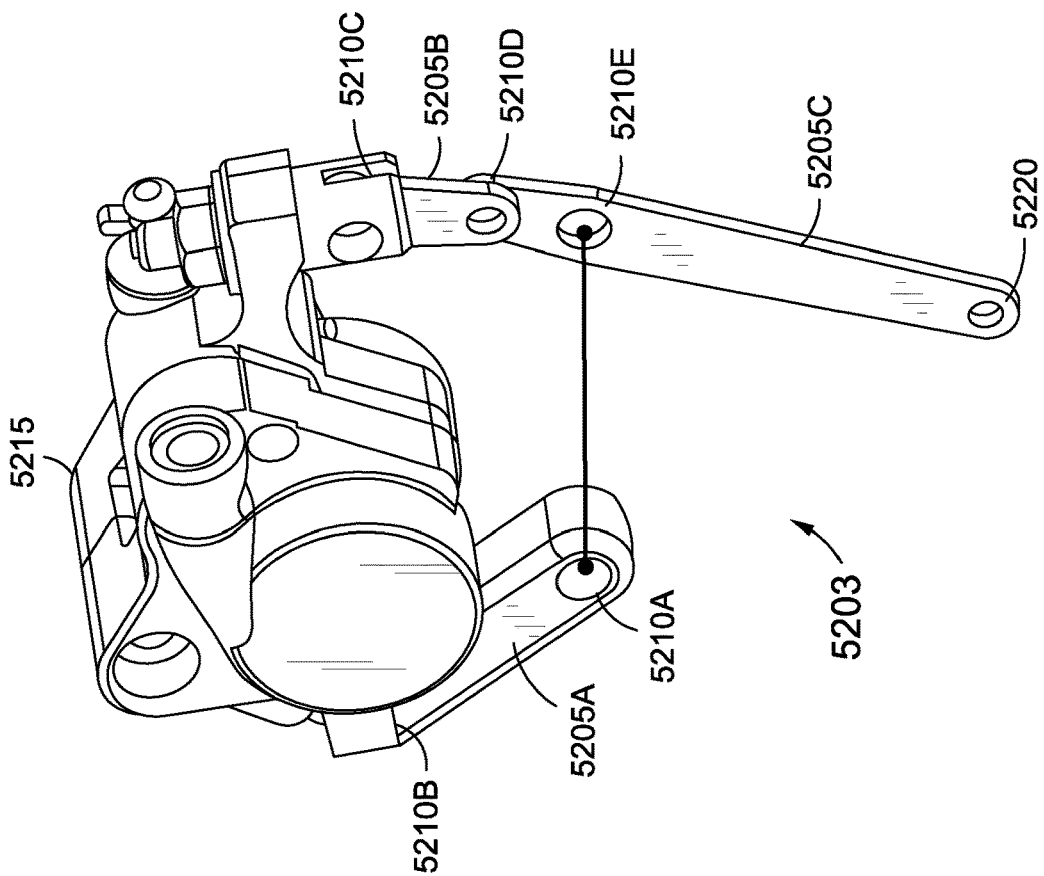
FIG. 50A shows a side view of a rear disc brake caliper in a first position of a sequence in another specific embodiment of the inventive braking system.
Figure 50C:
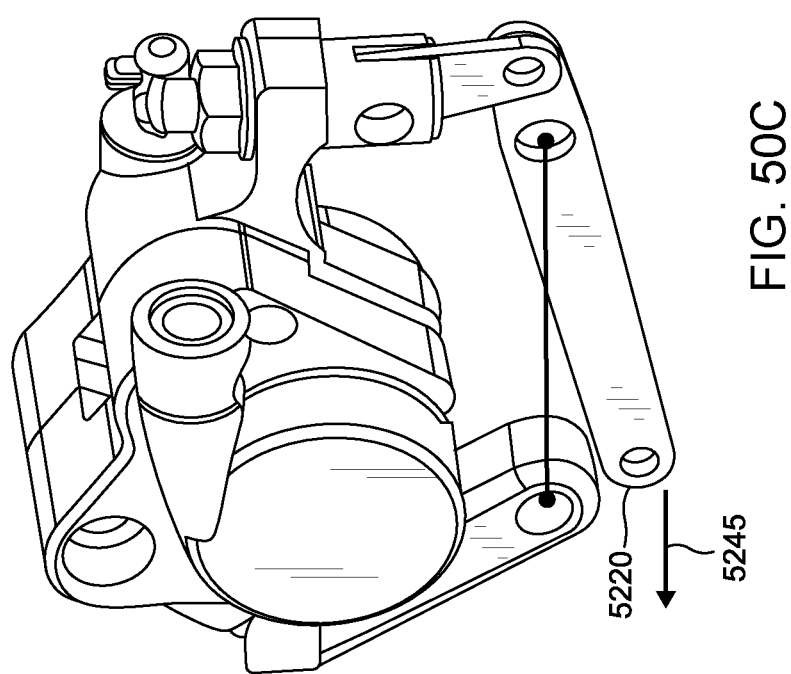
FIG. 50C shows a side view of the rear disc brake caliper of FIG. 50A in a third position of the sequence.

FIGS. 50A-50C show a sequence of side views of a rear disc braking system having a mechanical linkage 5203 in another specific embodiment. FIG. 50A shows the linkage in a first position. FIG. 50B shows the linkage in a second position. FIG. 50C shows the linkage in a third position. As shown in FIG. 50A, in this specific embodiment, the linkage includes a first link 5205A, a second link 5205B, and a third link 5205C. The first link includes a joint 5210A and a joint 5210B, opposite joint 5210A, and including mount for attaching a disc brake caliper 5215. Joint 5210A may be connected to the bicycle frame. The second link includes a joint 5210C and a joint 5210D, opposite joint 5210C and connecting the third link. Joint 5210C may include a mount for attaching the disc brake caliper. The third link includes a joint 5210E and an end 5220. Joint 5210E may be connected to the bicycle frame. End 5220 of the third link may be connected to an end of a front brake cable.

In a specific embodiment, the actuation of the rear brake causes the disc caliper to move as indicated by arrow 5230 (FIG. 52B). In particular, the first link rotates 5235 about joint 5210A. The third link rotates 5240 about joint 5210E. As shown in FIG. 50C, end 5220 on the third link at which an end of the front brake cable may be secured moves in a direction 5245 to actuate the front brake such as by pulling the connected front brake cable.

In a specific embodiment, a device includes a first link of a linkage and including a first joint and a first disc mount, opposite the first joint, to mount a disc brake. The first joint connects to a first tab on a bicycle frame. There is a second link of the linkage and including a second joint, and a third joint, opposite the second joint. The second joint includes a second disc mount to mount the disc brake, and the third joint connects to a second tab on the bicycle frame. There is a third link of the linkage connected to the third joint and includes a fourth joint and a front brake cable attachment end. The fourth joint connects to a second tab on the bicycle frame.

Figure 51B:
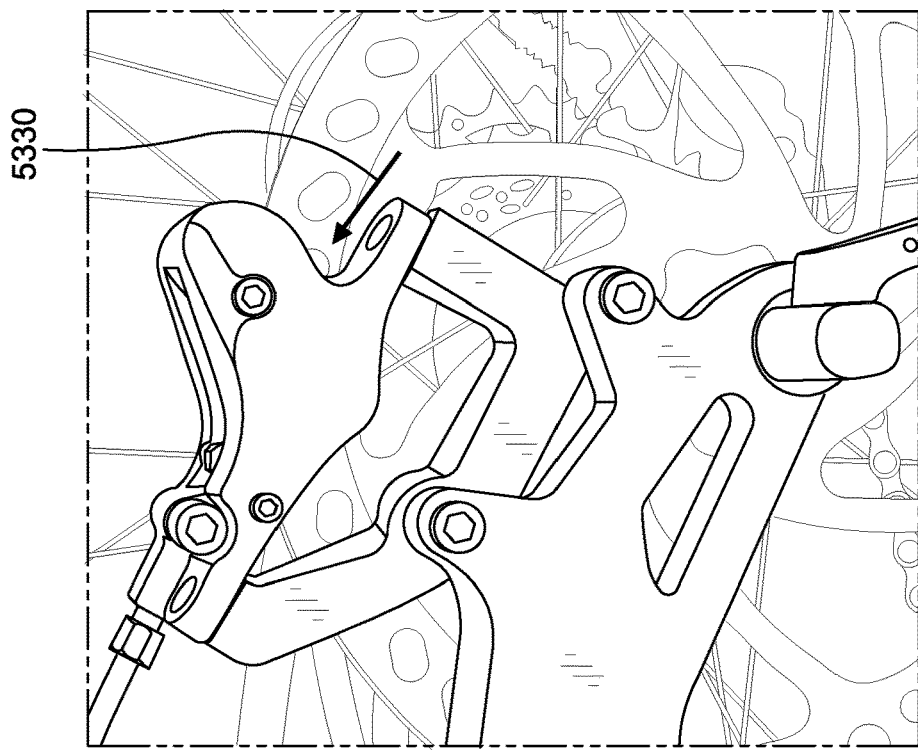
FIG. 51B shows a side view of the rear disc brake caliper of FIG. 51A in a second position of the sequence.
Figure 51A:
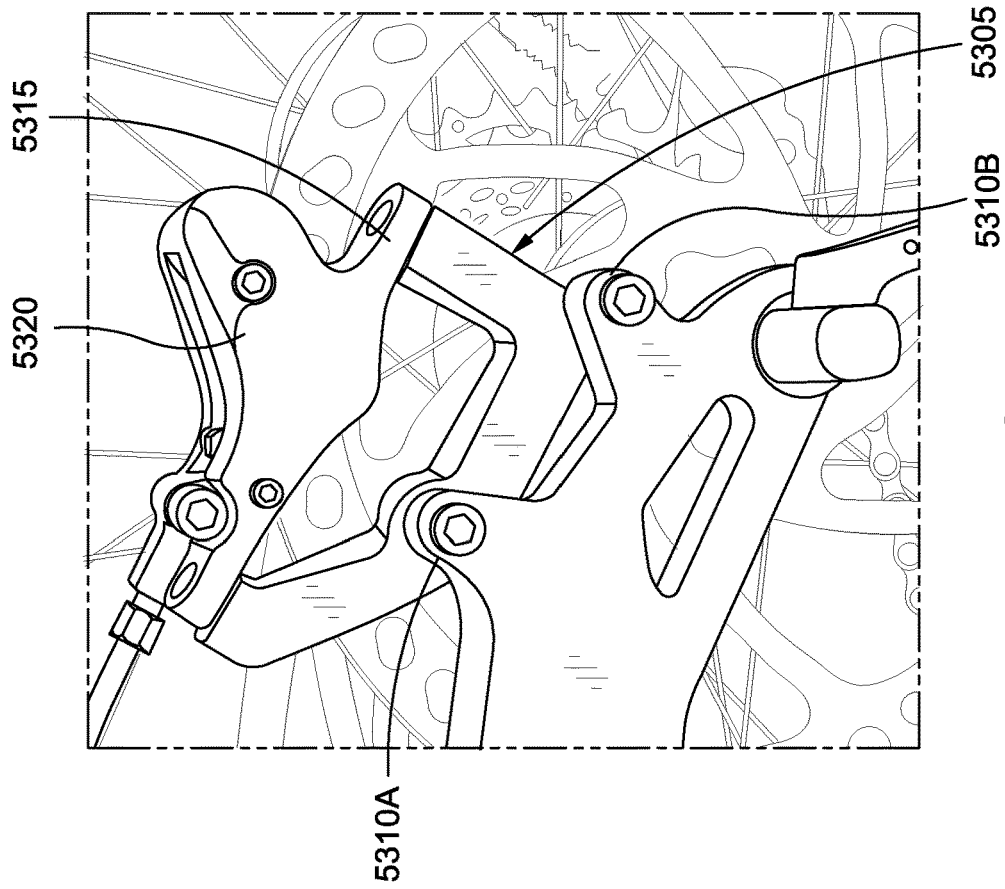
FIG. 51A shows a side view of a rear disc brake caliper in a first position of a sequence in another specific embodiment of the inventive braking system.
Figure 51C:
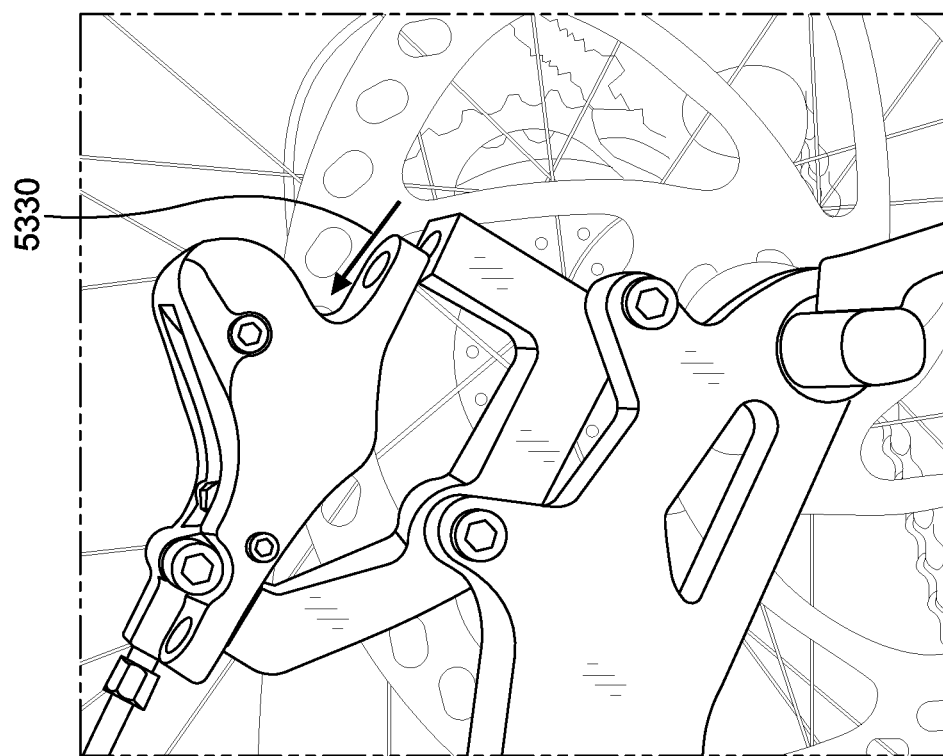
FIG. 51C shows a side view of the rear disc brake caliper of FIG. 51A in a third position of the sequence.

FIGS. 51A-51C show a sequence of side views of a rear disc braking system having a braking assembly or system 5303 that allows the disc caliper to move in a linear direction in another specific embodiment. FIG. 51A shows the system in a first position. FIG. 51B shows the system in a second position. FIG. 51C shows the system in a third position. As shown in FIG. 51A, in this specific embodiment, a braking assembly 5305 includes a set of disc mounts 5310A and 5310B for attaching the assembly to disc tabs of the bicycle frame. The assembly further includes a sliding carrier 5315 upon which a disc brake caliper 5320 is mounted. The sliding carrier may travel along a track or rail of the braking assembly.

In a specific embodiment, the actuation of the rear brake causes the disc caliper to move in a linear direction as indicated by arrow 5330 (FIGS. 51B and C). An end of the front brake cable may be attached an end portion of the sliding carrier so that the front brake cable can be pulled by the sliding carrier, thus actuating the front brake.

In a specific embodiment, a device includes a first set of mounts for attaching to a bicycle frame, and a carrier including a second set of mounts for attaching a rear disc brake caliper. The carrier translates or slides in linear direction from a first position to a second position to actuate a front brake when the rear disc brake caliper is actuated.

Figure 52:
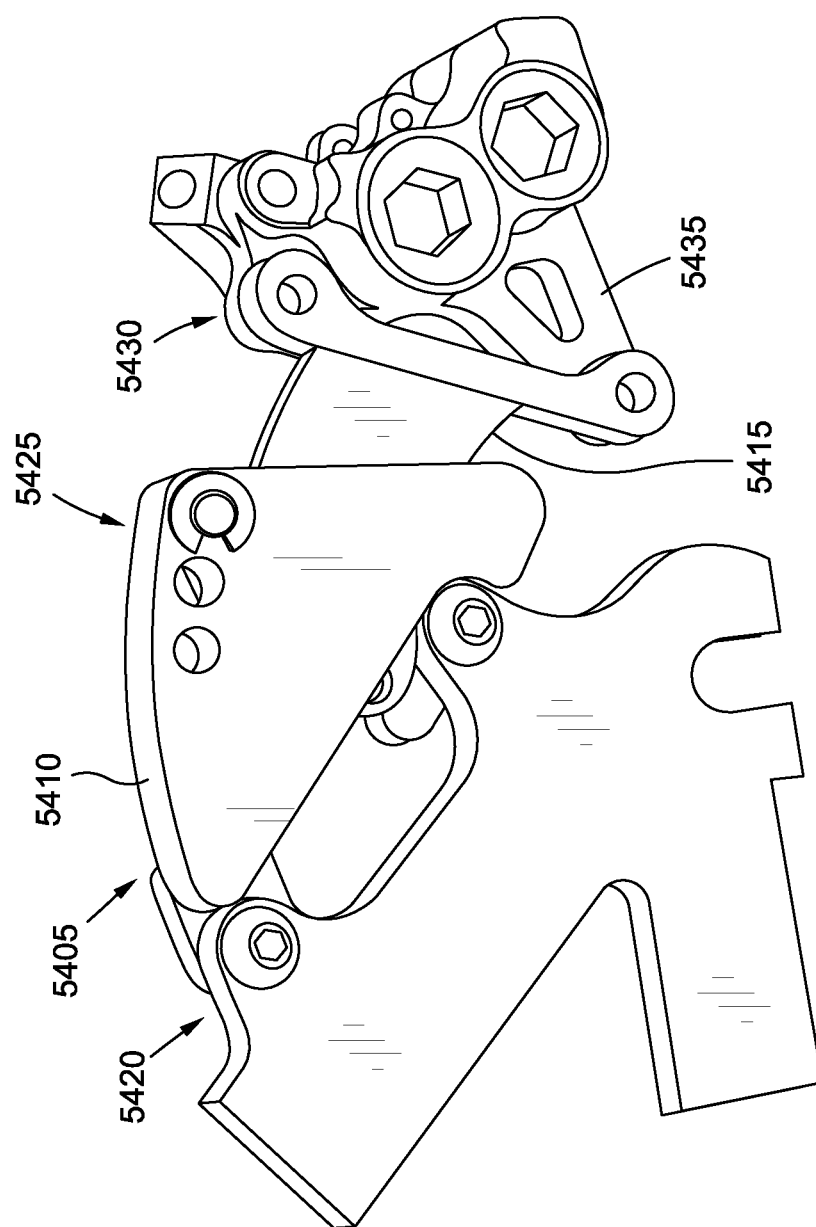
FIG. 52 shows a side view of a rear disc brake caliper used with another embodiment of the inventive braking system.

FIG. 52 shows a side view of a rear disc braking system that may be referred to as a floating caliper braking assembly. In this specific embodiment, an assembly 5405 includes a first structure 5410 and a second structure 5415. The first structure includes a set of mounts 5420 to attach the assembly to a bicycle frame and adjustable settings 5425. The second structure includes a set of mounts 5430 for attaching a disc brake caliper 5435.

In this specific embodiment, the actuation of the rear brake causes the second structure to move relative to the first structure. The movement may include a translation, rotation, or both. An end of the front brake cable may be secured to a portion of the second structure so that the front brake may be actuated. In a specific embodiment, the second structure on which the caliper is attached moves into a guide that may be on the first structure. For example, the guide may include a channel, track, or groove on the first structure through which a portion of the second structure passes. The shape of the channel helps to direct the movement of the caliper. The channel may be curved or curvilinear. There may be a stop on the first structure, second structure, or both that limits the movement.

Figure 53:
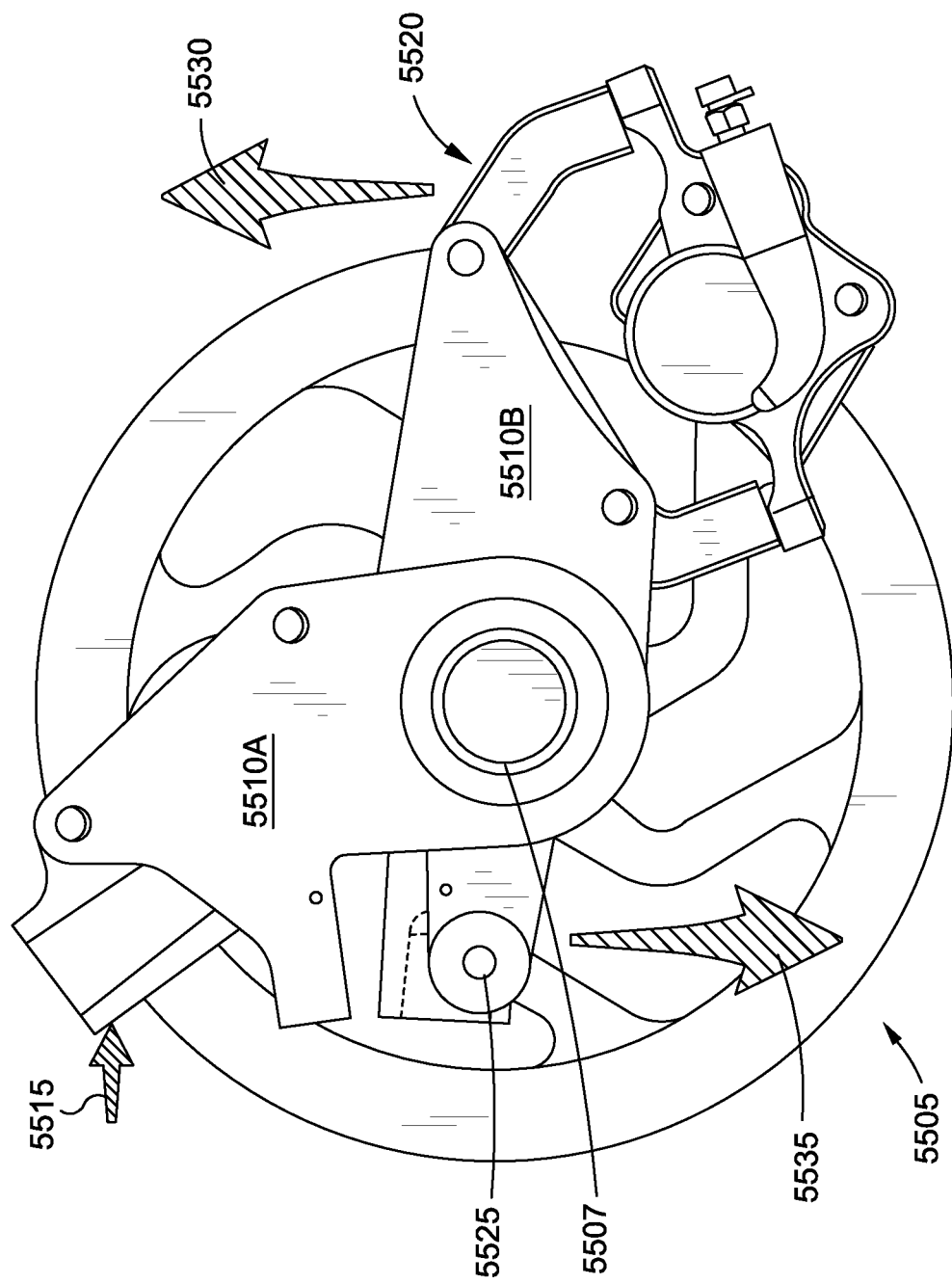
FIG. 53 shows a side view of a rear disc braking system used with another embodiment of the inventive braking system.

FIG. 53 shows a side view of a rear disc braking system in another specific embodiment. As shown in the example of FIG. 53, a braking system 5505 includes a first structure 5510A and a second structure 5510B that moves relative to the first structure. The second structure may be rotatably connected 5507 to the first structure. The first structure includes a set of holes for attaching the system to a seat stay 5515 of the bicycle frame.

The second structure includes a set of mounts 5520 and a front brake cable attachment point 5525. Mounts 5520 allow for attaching a disc brake caliper. The front brake cable attachment point may include a slot and a hole. An end of the front brake cable may be received in the hole. For example, the end of the cable may terminate as a lug, nipple, or barrel that can be inserted into the hole. A portion of the cable can then pass through the slot.

When the rear brake is actuated, an end of the second structure having the disc brake caliper moves in a direction as indicated by an arrow 5530. An opposite end of the second structure having the attached front brake cable end moves in a direction as indicated by an arrow 5535. The movement of the second structure pulls the front brake cable to actuate the front brake.

Figure 54:
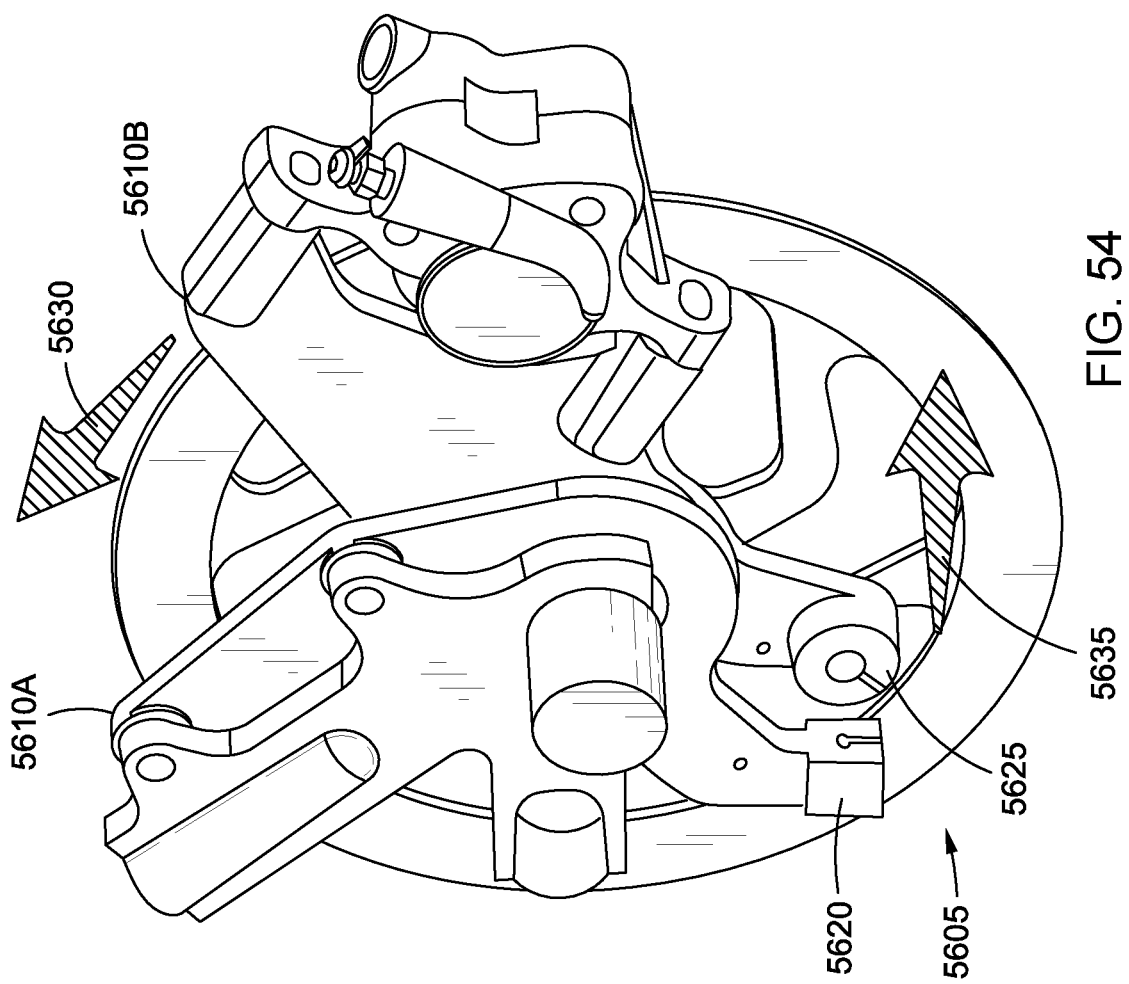
FIG. 54 shows a perspective view of a rear disc braking system used with another embodiment of the inventive braking system.

FIG. 54 shows a perspective view of a rear disc braking system in another specific embodiment. As shown in the example of FIG. 54, a braking system 5605 includes a first structure 5610A and a second structure 5610B that moves relative to the first structure. This braking system is similar to the braking system shown in FIG. 53. In this specific embodiment, however, the braking system is mounted on the inside of the rear bicycle triangle whereas in FIG. 53, the braking system is mounted on the outside of the rear bicycle triangle.

The first structure includes a front brake cable housing stop 5620 having a socket and first slot. The second structure includes a front brake cable attachment point 5625 having a hole and a second slot. The socket receives an end of the front brake cable housing and the front brake cable passes through the first slot, through the second slot, and terminates in the hole provided by the front brake cable attachment point. Arrows 5630 and 5635 indicate the movement of the second structure when the rear disc brake is actuated to pull the front brake cable and actuate the front brake.

Figure 55:
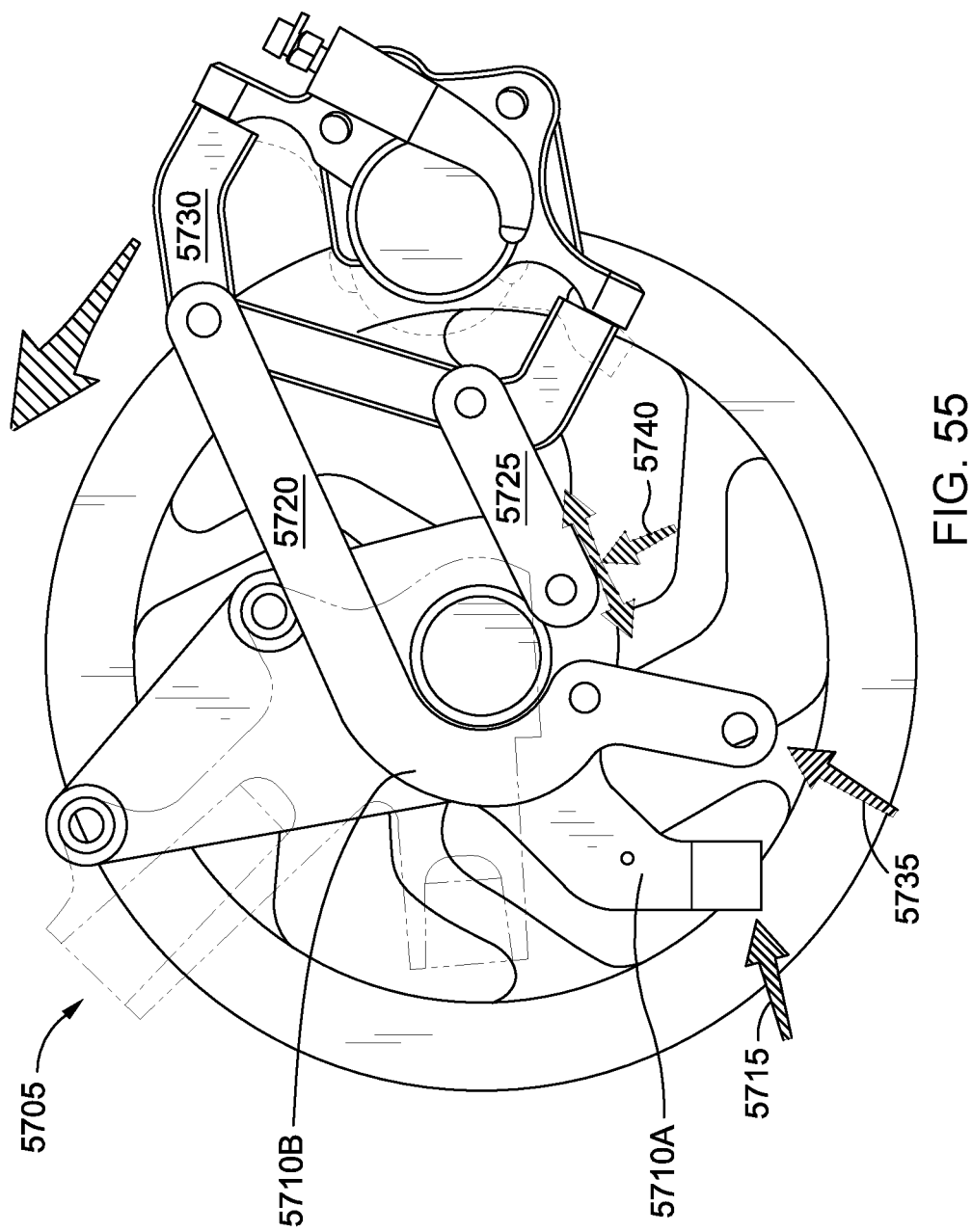
FIG. 55 shows a side view of a rear disc braking system used with another embodiment of the inventive braking system.

FIG. 55 shows a side view of a rear disc braking system in another specific embodiment. As shown in the example of FIG. 55, a braking system 5705 includes a first structure 5710A and a second structure 5710B. The first structure is connected to the bicycle frame. The first structure includes a front brake cable housing stop 5715 to secure the cable housing.

The second structure includes a linkage including a first link 5720, a second link 5725, and a third link 5730. An end of the first link includes a front brake cable attachment point 5735 from which the cable may be pulled. There is a joint on the first link that connects the first link to the first structure. An opposite end of the first link includes a joint that connects to the third link to which the disc brake caliper is attached. The first link includes a curved portion that at least partially curves around a central axis of the rear hub. The second link includes a joint that connects to the third link. An opposite end of the second link may include a joint connecting to the first structure. The joint may include a slot 5740 that allows some lateral caliper movement. In a specific embodiment, the slot is on the second link. In another specific embodiment, the slot is on the first structure.

It should be appreciated that the various braking designs shown in the figures are merely examples of particular implementations of the braking system. In other implementations, other similar and equivalent elements and functions may be used or substituted in place of what is shown. For example, for the floating caliper design as described in the discussion accompanying FIG. 52 above, the channel is formed within the first structure, but one of ordinary skill in the art will recognize that the channel may instead be formed within the second structure. In this specific embodiment, the first structure may include a tab that protrudes into the channel on the second structure to direct the movement of the caliper. A rotating mechanism or sliding mechanism may include bearings, bushings, pulleys, or combinations of these.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. A bicycle comprising:
   a frame;
   a front wheel configured to be rotatably coupled to the frame;
   a front caliper brake assembly configured to slow a rotation of the front wheel;
   a rear wheel configured to be rotatably coupled to the frame, the rear wheel comprising a braking surface; and
   a rear brake caliper assembly configured to slow a rotation of the rear wheel, the rear brake caliper assembly comprising:
      a first caliper brake arm and a second caliper brake arm;
      a first brake pad coupled to the first caliper brake arm and a second brake pad coupled to the second caliper brake arm, the first brake pad disposed on a first side of the braking surface, and the second brake pad disposed on a second side of the braking surface and configured to be coupled to a cable to activate the front caliper brake assembly, wherein the first brake pad and the second brake pad are configured to be pressed against the braking surface of the rear wheel; and a rear brake hand lever configured to be actuated to operate the rear brake caliper assembly;

wherein the rear brake hand lever is configured to be actuated to press the first brake pad and the second brake pad against the braking surface such that the rotation of the rear wheel is slowed and the second brake pad moves relative to the second caliper brake arm with a rotation of the braking surface to tension the cable to activate the front caliper brake assembly to slow the rotation of the front wheel.

2. The bicycle of claim 1, further comprising a guide coupled to the second caliper brake arm.

3. The bicycle of claim 2, wherein the second brake pad is configured to slidably interface with the guide such that the second brake pad moves relative to the guide with the rotation of the braking surface.

4. The bicycle of claim 2, wherein the second brake pad comprises a slide portion.

5. The bicycle of claim 4, wherein the guide comprises a groove configured to receive the slide portion of the second brake pad.

6. The bicycle of claim 5, wherein the slide portion is configured to slide within the groove as the second brake pad moves with the rotation of the braking surface.

7. The bicycle of claim 4, wherein the slide portion is integral with the second brake pad.

8. The bicycle of claim 7, wherein the slide portion protrudes from a side of the second brake pad that is opposite the braking surface.

9. The bicycle of claim 4, wherein the slide portion comprises a hole configured to receive the cable.

10. A vehicle configured to be pedaled to move, the vehicle comprising:
a frame with pedals;
a front wheel configured to be rotatably coupled to the frame;
a front brake assembly configured to slow a rotation of the front wheel;
a rear wheel configured to be rotatably coupled to the frame, the rear wheel comprising a braking surface; and
a rear brake assembly configured to slow a rotation of the rear wheel, the rear brake assembly comprising:
a first brake pad coupled and a second brake pad, the first brake pad disposed on a first side of the braking surface, and the second brake pad disposed on a second side of the braking surface and configured to be coupled to a cable to activate the front brake assembly, wherein the first brake pad and the second brake pad are configured to be pressed against the braking surface of the rear wheel; and
a rear brake hand lever configured to be actuated to operate the rear brake assembly;
wherein the rear brake hand lever is configured to be actuated to press the first brake pad and the second brake pad against the braking surface such that the rotation of the rear wheel is slowed and the second brake pad moves relative to the first brake pad with a rotation of the braking surface to tension the cable to activate the front brake assembly to slow the rotation of the front wheel.

11. The vehicle of claim 10, further comprising a guide disposed on the second side of the braking surface.

12. The vehicle of claim 11, wherein the second brake pad is configured to slidably interface with the guide such that the second brake pad moves relative to the guide with the rotation of the braking surface.

13. The vehicle of claim 11, wherein the second brake pad comprises a slide portion.

14. The vehicle of claim 13, wherein the guide comprises a groove configured to receive the slide portion of the second brake pad.

15. The vehicle of claim 14, wherein the slide portion is configured to slide within the groove as the second brake pad moves with the rotation of the braking surface.

16. The vehicle of claim 13, wherein the slide portion protrudes from a side of the second brake pad that is opposite the braking surface.

17. The vehicle of claim 13, wherein the slide portion comprises a hole configured to receive the cable.

18. A two-wheeled vehicle configured to be pedaled, the two-wheeled vehicle comprising:
a frame with pedals;
a front wheel configured to be rotatably coupled to the frame;
a front brake assembly configured to slow a rotation of the front wheel;
a rear wheel configured to be rotatably coupled to the frame, the rear wheel comprising a braking surface; and
a rear brake assembly configured to slow a rotation of the rear wheel, the rear brake assembly comprising a first brake pad coupled and a second brake pad, the first brake pad disposed on a first side of the braking surface, and the second brake pad disposed on a second side of the braking surface and configured to be coupled to a cable to activate the front brake assembly, wherein the first brake pad and the second brake pad are configured to be pressed against the braking surface of the rear wheel;
wherein the first brake pad and the second brake pad are configured to press against the braking surface such that the rotation of the rear wheel is slowed and the second brake pad moves relative to the first brake pad with a rotation of the braking surface to tension the cable to activate the front brake assembly to slow the rotation of the front wheel.

19. The two-wheeled vehicle of claim 18, further comprising a guide with a groove, wherein the second brake pad comprises a slide portion configured to be disposed in the groove, the slide portion protruding from a side of the second brake pad that is opposite the braking surface.

20. The two-wheeled vehicle of claim 19, wherein the slide portion comprises a hole configured to receive the cable.

* * * * *